(12) United States Patent
Nishida et al.

(10) Patent No.: US 9,329,443 B2
(45) Date of Patent: May 3, 2016

(54) LIQUID CRYSTAL DISPLAY DEVICE HAVING FIRST AND SECOND DIELECTRIC FILMS WITH DIFFERENT THICKNESSES

(75) Inventors: Masakazu Nishida, Nagano-ken (JP); Shohei Yoshida, Shimosuma-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1002 days.

(21) Appl. No.: 13/072,975

(22) Filed: Mar. 28, 2011

(65) Prior Publication Data

US 2011/0234930 A1    Sep. 29, 2011

(30) Foreign Application Priority Data

Mar. 29, 2010  (JP) .................................. 2010-074992
Mar. 30, 2010  (JP) .................................. 2010-077499

(51) Int. Cl.
*G02F 1/1343* (2006.01)
*G02F 1/1333* (2006.01)
*G02F 1/1337* (2006.01)
*G09G 3/36* (2006.01)
*G09G 5/42* (2006.01)
*G09G 1/06* (2006.01)

(52) U.S. Cl.
CPC ........ *G02F 1/134336* (2013.01); *G09G 3/3655* (2013.01); *G02F 1/1337* (2013.01); *G02F 1/133345* (2013.01); *G02F 2001/133397* (2013.01); *G09G 2300/0426* (2013.01); *G09G 2310/06* (2013.01); *G09G 2320/0247* (2013.01); *G09G 2320/0257* (2013.01)

(58) Field of Classification Search
USPC .......................................... 349/138
See application file for complete search history.

(56) References Cited

U.S. PATENT DOCUMENTS

| | | | |
|---|---|---|---|
| 6,771,245 B2 | 8/2004 | Kanbe et al. | |
| 2002/0089477 A1* | 7/2002 | Kanbe et al. ..................... | 345/87 |
| 2006/0250561 A1* | 11/2006 | Takeda et al. ................... | 349/141 |
| 2009/0174850 A1* | 7/2009 | Wang ............................. | 349/114 |
| 2010/0039596 A1* | 2/2010 | Shin et al. ....................... | 349/124 |

FOREIGN PATENT DOCUMENTS

| | | |
|---|---|---|
| JP | 264525 A | 3/1990 |
| JP | 2002189460 | 7/2002 |
| JP | 2007219356 | 8/2007 |

* cited by examiner

*Primary Examiner* — Lauren Nguyen
(74) *Attorney, Agent, or Firm* — Hauptman Ham, LLP

(57) ABSTRACT

In a liquid crystal device according to the embodiment of the invention, a high potential and a low potential relative to the counter electrode potential are alternately applied to the pixel electrode through the switching element. Here, the counter electrode potential is set to be lower than a reference potential, when the reference potential is an electric potential which is obtained by shifting an average electric potential between the high potential and the low potential by an average value between an amount of change in an electric potential of the pixel electrode, caused by a parasitic capacitance of the switching element when the high potential is being applied to the pixel electrode, and an amount of change in the electric potential of the pixel electrode caused by the parasitic capacitance when the low potential is being applied to the pixel electrode.

4 Claims, 25 Drawing Sheets

▲ THICKNESS OF DIELECTRIC FILM : THICKNESS OF DIELECTRIC FILM = 300 nm : 75 nm
ON ELEMENT SUBSTRATE SIDE : ON COUNTER SUBSTRATE SIDE

⟨HORIZONTAL SCANNING (FIRST FIELD)⟩

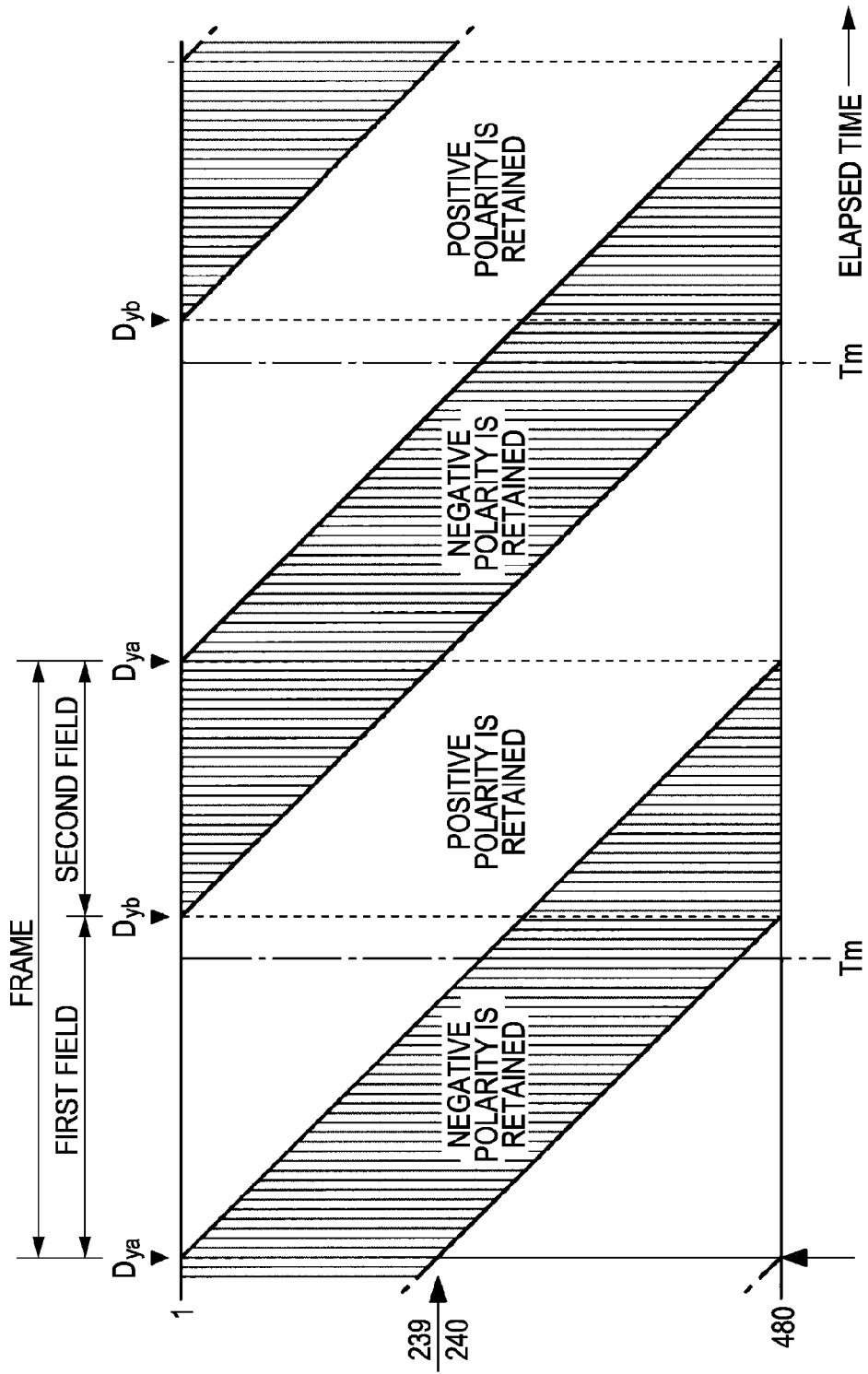

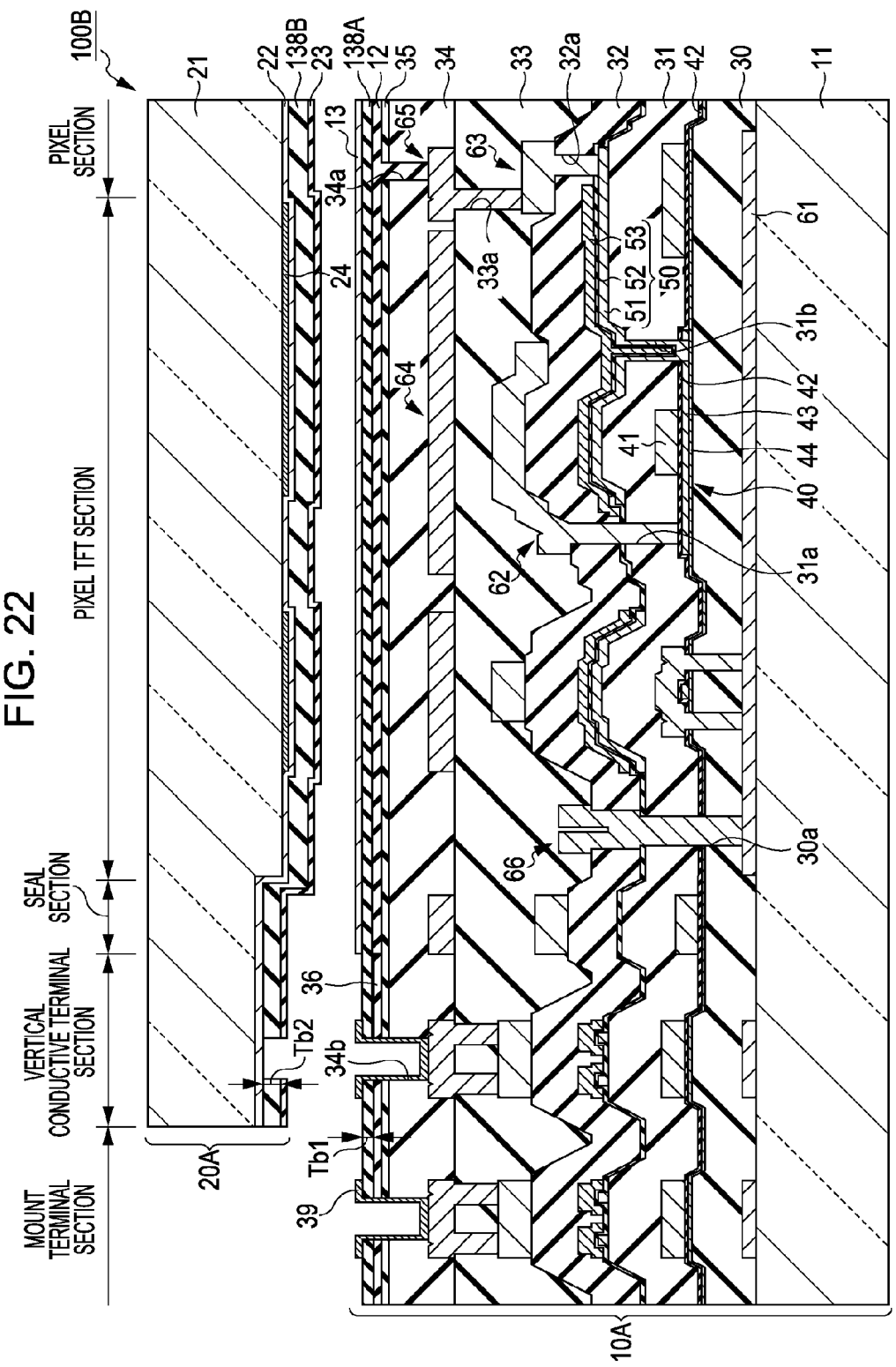

LIQUID CRYSTAL DISPLAY DEVICE HAVING FIRST AND SECOND DIELECTRIC FILMS WITH DIFFERENT THICKNESSES

CROSS REFERENCES TO RELATED APPLICATIONS

This application contains subject matter related to Japanese Patent Application No. 2010-074992 filed in the Japanese Patent Office on Mar. 29, 2010 and Japanese Patent Application No. 2010-077499 filed in the Japanese Patent Office on Mar. 30, 2010, the entire contents of which are incorporated herein by reference.

BACKGROUND

1. Technical Field

The present invention relates to a liquid crystal device, a driving method thereof, and an electronic apparatus.

2. Related Art

In the past, there have been known liquid crystal devices in which a liquid crystal layer is disposed between pixel electrodes and counter electrodes. Each pixel electrode is electrically connected to a switching element such as a thin film transistor (hereinafter referred to as a TFT). The switching element is controlled to be turned ON/OFF by the input of the scan signal transmitted from the scan line. In the ON state, the switching element applies a voltage, which is transmitted from the data line, to the pixel electrode. An electric field is applied between the pixel electrode and the counter electrode by the voltage, and the liquid crystal layer is driven by the electric field.

A normal liquid crystal device employs, for example, inversion drive (AC drive) which inverts the polarity of the driving voltage applied to each pixel electrode for each scan line, each data line, or each frame in an image signal. That is, the liquid crystal layer is driven by AC. In order to drive the liquid crystal layer through AC, for example, the counter electrode is maintained at a predetermined counter electrode potential, and the electric potential of the pixel electrode is changed between a high potential (positive polarity) and a low potential (negative polarity) relative to the counter electrode potential during the duration of two successive frames. In such a manner, the direction of the electric field applied to the liquid crystal layer is inverted, and thus it is possible to reduce bias of the electric charges of the liquid crystal layer.

When the bias of the electric charges is reduced, it is possible to reduce a DC voltage component which is applied to the liquid crystal layer by the bias of electric charges, and thus it is possible to suppress the occurrence of display defects. Specifically, since the balance between the amount of positive charge and the amount of negative charge is prevented from being broken by the DC voltage component, flicker in the display image, caused by change in transmittance of the liquid crystal device during positive and negative polarity durations, rarely occurs. Further, due to the DC voltage component, it becomes difficult to display normal patterns formed by normally applying an electric field to the liquid crystal layer (image persistence). However, the way of simply performing the inversion drive is not enough to completely solve the problem based on the application of the DC voltage component, and there are still display defects. That is, even when the inversion drive is performed, the DC voltage component is applied to the liquid crystal layer, and the bias of the electric charges occurs, and it is therefore necessary to cope with this.

However, it has been known that, when the liquid crystal device is driven in a state where the electric potential difference between the counter electrode potential and a high potential is made to be equivalent to the electric potential difference between the counter electrode potential and a low potential, the DC voltage component occurs. It can be inferred that the DC voltage component is caused by the following two phenomena.

The first phenomenon is a phenomenon (called a field-through, a pushdown, or a punch-through phenomenon) that causes change in the electric potential of the pixel electrode since electric charges of the channel area are distributed and the pixel electrode is charged therewith when the switching element is switched from the ON state to the OFF state. Specifically, the phenomenon is a phenomenon that lowers the voltage of the pixel electrode since the electric charges, which are accumulated in the parasitic capacitance and the storage capacitance, are redistributed at the time of turning off the switching element.

The second phenomenon is a phenomenon that causes the bias of electric charges since the electric characteristics are asymmetric on the pixel electrode side and the counter electrode side of the liquid crystal layer.

The problems due to the occurrence of the DC voltage component caused by the first phenomenon can be solved by measuring or estimating, in advance, the amount of change in the electric potential of the pixel electrode caused by the parasitic capacitance of the switching element and by setting the counter electrode potential so as to cancel the change in the amount of positive charge and the amount of negative charge caused by the amount of change in electric potential.

An exemplary technique for solving the problems due to the occurrence of the DC voltage component caused by the second phenomenon is disclosed in JP-A-2007-219356.

The liquid crystal device in JP-A-2007-219356 includes a tilted-homeotropic-alignment liquid crystal which is sandwiched between a first inorganic alignment film and a second inorganic alignment film, and a voltage applying member. The thickness of the second inorganic alignment film is more than the thickness of the first inorganic alignment film. The voltage applying member applies a predetermined voltage, which is for setting the first inorganic alignment film side to a first electric potential and setting the second inorganic alignment film side to a second electric potential which is lower than the first electric potential.

In the technique disclosed in JP-A-2007-219356, the electric potential is set to be different between the first inorganic alignment film side and the second inorganic alignment film side. Thereby, it is expected to obtain an effect that relaxes the bias of electric charges due to the thickness difference between the first inorganic alignment film side and the second inorganic alignment film side. However, the bias of electric charges may be caused from factors other than the thicknesses of the first inorganic alignment film and the second inorganic alignment film. Therefore, in terms of effectively reducing the DC voltage component in accordance with the configuration of the liquid crystal device, there is room for improvement in the technique disclosed in JP-A-2007-219356.

Further, there have been proposed methods of driving the liquid crystal device focusing on the above-mentioned two phenomena. For example, JP-A-2002-189460 discloses a technique of shifting the counter electrode potential as a reference of the polarity inversion in advance so as to correct the effect caused by the first phenomenon (the field-through phenomenon) and the second phenomenon (the change in voltage caused by the electrical characteristic difference between the element substrate and the counter substrate).

Specifically, in JP-A-2002-189460, the amount of change in voltage caused by the first phenomenon and the amount of change in voltage caused by the second phenomenon at the initial stage is measured on the basis of a predetermined measurement condition, and a value obtained by adding those is added as a regular correction voltage to the set potential ($V_{COM}$) of the counter electrode.

In the technique disclosed in JP-A-2002-189460, by applying the correction voltage, to which the amounts of change in voltage caused by the first and second phenomena are added, to the counter electrode potential, it is expected to suppress deterioration in display quality caused by the occurrence of the DC voltage component.

As it is, in a case where the correction voltage of the second phenomenon has a certain magnitude relative to the correction voltage of the first phenomenon, the counter electrode potential may be drastically shifted to the positive or negative side. In other words, when the correction voltage for the second phenomenon is large, an amplitude difference in positive and negative driving voltages increases. Hence, in some cases, display defects such as flicker may occur.

SUMMARY

An advantage of some aspects of the invention is to provide a liquid crystal device, a driving method thereof, and an electronic apparatus capable of improving display quality by suppressing occurrence of the display defects such as flicker.

In some aspects of the invention, in order to obtain the above-mentioned advantage, the following configurations are employed.

According to a first aspect of the invention, there is provided a liquid crystal device including: a pixel electrode; a switching element which is electrically connected to the pixel electrode; a counter electrode which is disposed to be opposed to the pixel electrode and to which a counter electrode potential is applied; a liquid crystal layer which is provided between the pixel electrode and the counter electrode; a first alignment film which is provided between the liquid crystal layer and the pixel electrode; a first dielectric layer which is provided between the first alignment film and the pixel electrode and is made of silicon oxide; a second alignment film which is provided between the liquid crystal layer and the counter electrode; and a second dielectric layer which is provided between the second alignment film and the counter electrode, is made of silicon oxide, and has a thickness less than that of the first dielectric layer. In the device, a high potential and a low potential relative to the counter electrode potential are alternately applied to the pixel electrode through the switching element. The counter electrode potential is set to be lower than a reference potential, when the reference potential is an electric potential which is obtained by shifting an average electric potential between the high potential and the low potential by an average value between an amount of change in an electric potential of the pixel electrode, caused by a parasitic capacitance of the switching element when the high potential is being applied to the pixel electrode, and an amount of change in the electric potential of the pixel electrode caused by the parasitic capacitance when the low potential is being applied to the pixel electrode.

In such a configuration, as described above, the first dielectric layer is provided between the pixel electrode and the first alignment film, and the second dielectric layer, which has the thickness less than that of the first dielectric layer, is provided between the counter electrode and the second alignment film. Thus, electric charges tend to be accumulated on the counter electrode side. In the aspect of the invention, the counter electrode potential is lower than the reference potential. Hence, as compared with the case of applying the reference potential to the counter electrode, there is an increase in the absolute value of the difference between the electric potential of the pixel electrode and the counter electrode potential at the time of applying the high potential to the pixel electrode. Likewise, there is a decrease in the absolute value of the difference between the electric potential of the pixel electrode and the counter electrode potential at the time of applying the low potential to the pixel electrode. Accordingly, it is possible to increase the electric charges, which move from the counter electrode side of the liquid crystal layer to the pixel electrode side thereof, and it is possible to decrease the electric charges which move from the pixel electrode side of the liquid crystal layer to the counter electrode side thereof. As a result, it is possible to move the electric charges so as to cancel the bias of electric charges caused by the thickness difference between the first dielectric layer and the second dielectric layer, and thus it is possible to reduce the bias of electric charges.

The reference potential is defined as an electric potential which is obtained by shifting an average electric potential between the high potential and the low potential by the average value between the amount of change in the electric potential of the pixel electrode, caused by the parasitic capacitance of the switching element when the high potential is being applied, and the amount of change in the electric potential of the pixel electrode caused by the parasitic capacitance when the low potential is being applied. Accordingly, when the reference potential is applied to the counter electrode, it is possible to avoid the bias of electric charges caused by the field-through. As described above, relative to the reference potential, the counter electrode potential is set. Therefore, it is possible to reduce both of the bias of electric charges, which is caused by the field-through, and the bias of electric charges which is caused by the thickness difference between the first dielectric layer and the second dielectric layer. In such a manner, in the liquid crystal device according to the aspect of the invention, the bias of electric charges is reduced, and thus the occurrence of flicker or the image persistence is suppressed.

According to a second aspect of the invention, there is provided a liquid crystal device including: a pixel electrode; a switching element which is electrically connected to the pixel electrode; a counter electrode which is disposed to be opposed to the pixel electrode and to which a counter electrode potential is applied; a liquid crystal layer which is provided between the pixel electrode and the counter electrode; a first alignment film which is provided between the liquid crystal layer and the pixel electrode; a first dielectric layer which is provided between the first alignment film and the pixel electrode and is made of silicon oxide; a second alignment film which is provided between the liquid crystal layer and the counter electrode; and a second dielectric layer which is provided between the second alignment film and the counter electrode, is made of silicon oxide, and has a thickness less than that of the first dielectric layer. In the device, a high potential and a low potential relative to the counter electrode potential are alternately applied to the pixel electrode through the switching element. The counter electrode potential is set to be higher than a reference potential, when the reference potential is an electric potential which is obtained by shifting an average electric potential between the high potential and the low potential by an average value between an amount of change in an electric potential of the pixel electrode, caused by a parasitic capacitance of the switching element when the high potential is being applied to the pixel electrode, and an amount of change in the electric potential of the pixel electrode caused by the parasitic capacitance when the low potential is being applied to the pixel electrode.

In such a configuration, as described above, the first dielectric layer is provided between the pixel electrode and the first alignment film, and the second dielectric layer, which has the thickness more than that of the first dielectric layer, is provided between the counter electrode and the second alignment film. Thus, electric charges tend to be accumulated on the pixel electrode side. In the aspect of the invention, the counter electrode potential is higher than the reference potential. Hence, as compared with the case of applying the reference potential to the counter electrode, there is a decrease in the absolute value of the difference between the electric potential of the pixel electrode and the counter electrode potential at the time of applying the high potential to the pixel electrode. Likewise, there is an increase in the absolute value of the difference between the electric potential of the pixel electrode and the counter electrode potential at the time of applying the low potential to the pixel electrode. Accordingly, it is possible to decrease the electric charges, which move from the counter electrode side of the liquid crystal layer to the pixel electrode side thereof, and it is possible to increase the electric charges which move from the pixel electrode side of the liquid crystal layer to the counter electrode side thereof. As a result, it is possible to move the electric charges so as to cancel the bias of electric charges caused by the thickness difference between the first dielectric layer and the second dielectric layer, and thus it is possible to reduce the bias of electric charges.

Further, relative to the reference potential, the counter electrode potential is set. Therefore, due to the same reason as the liquid crystal device according to the first aspect, it is possible to reduce both of the bias of electric charges, which is caused by the field-through, and the bias of electric charges which is caused by the thickness difference between the first dielectric layer and the second dielectric layer. In such a manner, in the liquid crystal device according to the aspect of the invention, the bias of electric charges is reduced, and thus the occurrence of flicker or the image persistence is suppressed.

According to a third aspect of the invention, there is provided a liquid crystal device including: an element substrate which has a plurality of scan lines and a plurality of data lines, and has a pixel electrode and a switching element provided to correspond to an intersection point between the scan line and the data line; a counter substrate which is disposed to be opposed to the element substrate and has a counter electrode; a liquid crystal layer which is sandwiched between the element substrate and the counter substrate; a first alignment film which is provided on a side of the element substrate close to the liquid crystal layer; a second alignment film which is provided on a side of the counter substrate close to the liquid crystal layer; a first dielectric film which is provided between the pixel electrode and the first alignment film, has a film thickness less than that of the liquid crystal layer, has a specific resistance higher than that of the liquid crystal layer, and is made of $SiO_2$; and a second dielectric film which is provided between the counter electrode and the second alignment film, has a film thickness less than that of the first dielectric film, has a specific resistance higher than that of the liquid crystal layer, and is made of $SiO_2$. In the device, a counter electrode potential, which is set to reduce flicker caused by a parasitic capacitance of the switching element, is applied to the counter electrode. In addition, a positive voltage and a negative voltage are alternately applied to the pixel electrode when the positive voltage is a high-potential voltage and the negative voltage is a low-potential voltage relative to the counter electrode potential as a reference. In predetermined durations such as a first duration during which the positive voltage is applied and a second duration during which the negative voltage is applied, the length of the first duration is set to be longer than the length of the second duration.

According to the liquid crystal device, the counter electrode potential is shifted and set in advance so as to reduce flicker caused by the parasitic capacitance of the switching element. Hence, the first phenomenon can be corrected. Further, the length of the first duration is set to be longer than the length of the second duration during the predetermined durations. Hence, the second phenomenon can also be corrected. The correction is based on the following fact which is found by the inventors. The first dielectric film is disposed between the first alignment film and the pixel electrode on the element substrate side, and the second dielectric film is disposed between the second alignment film and the counter electrode on the counter substrate side, thereby shifting the effective voltage waveform in the positive direction of the electric potential. Here, the first dielectric film has the film thickness less than that of the liquid crystal layer, has the specific resistance higher than that of the liquid crystal layer, and is made of silicon oxide ($SiO_2$). In addition, the second dielectric film has a film thickness less than that of the first dielectric film, has a specific resistance higher than that of the liquid crystal layer, and is made of silicon oxide ($SiO_2$). This fact is also seen from the results of experiments performed by the inventors. That is, the first dielectric film, which has the film thickness more than that of the second dielectric film between the second alignment film and the counter electrode on the counter substrate side, is disposed between the first alignment film and the pixel electrode on the element substrate side. In such a manner, as compared with the case where the film thickness of the first dielectric film is equal to that of the second dielectric film, it becomes apparent that $V_{COM}$ is shifted in the positive direction (the counter electrode potential after the shift is shifted in the positive direction from the counter electrode potential before the shift). As described above, the shift direction of the $V_{COM}$ shift is specified in advance. Therefore, as compared with the case where the shift direction is not specified as in the related art, it is possible to accurately correct the $V_{COM}$ shift. As a result, it is possible to provide a liquid crystal device capable of improving display quality by suppressing the occurrence of the display defects such as flicker.

According to a fourth aspect of the invention, there is provided a liquid crystal device including: an element substrate which has a plurality of scan lines and a plurality of data lines, and has a pixel electrode and a switching element provided to correspond to an intersection point between the scan line and the data line; a counter substrate which is disposed to be opposed to the element substrate and has a counter electrode; a liquid crystal layer which is sandwiched between the element substrate and the counter substrate; a first alignment film which is provided on a side of the element substrate close to the liquid crystal layer; a second alignment film which is provided on a side of the counter substrate close to the liquid crystal layer; a first dielectric film which is provided between the pixel electrode and the first alignment film, has a film thickness less than that of the liquid crystal layer, has a specific resistance higher than that of the liquid crystal layer, and is made of $SiO_2$; and a second dielectric film which is provided between the counter electrode and the second alignment film, has a film thickness more than that of the first dielectric film, has a specific resistance higher than that of the liquid crystal layer, and is made of SiO$_2$. In the device, a counter electrode potential, which is set to reduce flicker caused by a parasitic capacitance of the switching element, is applied to the counter electrode. In addition, a positive voltage and a negative voltage are alternately applied to the pixel electrode when the positive voltage is a high-potential voltage and the negative voltage is a low-potential voltage relative to the counter electrode potential as a reference. In predetermined durations such as a first duration during which the positive voltage is applied and a second duration during which the negative voltage is applied, the length of the first duration is set to be shorter than the length of the second duration.

According to the liquid crystal device, the counter electrode potential is shifted and set in advance so as to reduce flicker caused by the parasitic capacitance of the switching element. Hence, the first phenomenon can be corrected. Further, the length of the first duration is set to be shorter than the length of the second duration during the predetermined durations. Hence, the second phenomenon can also be corrected. The correction is based on the following fact which is found by the inventors. The first dielectric film is disposed between the first alignment film and the pixel electrode on the element substrate side, and the second dielectric film is disposed between the second alignment film and the counter electrode on the counter substrate side, thereby shifting the effective voltage waveform in the negative direction of the electric potential. Here, the first dielectric film has the film thickness less than that of the liquid crystal layer, has the specific resistance higher than that of the liquid crystal layer, and is made of silicon oxide (SiO$_2$). In addition, the second dielectric film has a film thickness more than that of the first dielectric film, has a specific resistance higher than that of the liquid crystal layer, and is made of silicon oxide (SiO$_2$). This fact is also seen from the results of experiments performed by the inventors. That is, the first dielectric film, which has the film thickness less than that of the second dielectric film between the second alignment film and the counter electrode on the counter substrate side, is disposed between the first alignment film and the pixel electrode on the element substrate side. In such a manner, as compared with the case where the film thickness of the first dielectric film is equal to that of the second dielectric film, it becomes apparent that V$_{COM}$ is shifted in the negative direction (the counter electrode potential after the shift is shifted in the negative direction from the counter electrode potential before the shift). As described above, the shift direction of the V$_{COM}$ shift is specified in advance. Therefore, as compared with the case where the shift direction is not specified as in the related art, it is possible to accurately correct the V$_{COM}$ shift. As a result, it is possible to provide a liquid crystal device capable of improving display quality by suppressing the occurrence of the display defects such as flicker.

In the liquid crystal devices according to the first and second aspects of the invention, it is preferable that both of the first dielectric layer and the second dielectric layer should have thicknesses less than that of the liquid crystal layer and should have specific resistances higher than that of the liquid crystal layer.

In such a manner, the electric field applied to the liquid crystal layer is hardly likely to interfere with the first dielectric layer and the second dielectric layer.

In the liquid crystal devices according to the first, second, third, and fourth aspects of the invention, it is preferable that the pixel electrode should be made of aluminum, and it is also preferable that the counter electrode should be made of indium tin oxide.

In such a manner, it is possible to embody the reflective liquid crystal device, and thus it is possible to achieve improvement in aperture ratio of each pixel, a decrease in thickness of the liquid crystal device, and the like.

Further, as compared with the case where the pixel electrode and the counter electrode are made of the same material (for example, ITO), it becomes apparent that V$_{COM}$ is shifted in the positive direction or the negative direction. Thus, asymmetry property in characteristics of the element substrate and the counter substrate becomes remarkable. This fact is also seen from the results of experiments performed by the inventors. For this reason, as compared with the case where the pixel electrode and the counter electrode are made of for example ITO, the DC voltage component, which is caused by the characteristic difference between the element substrate and the counter substrate holding the liquid crystal layer sandwiched therebetween, remarkably occurs. As a result, it is possible to improve display quality by suppressing the occurrence of the display defects such as flicker.

In the liquid crystal device according to the first aspect of the invention, it is preferable that, when the thickness of the first dielectric layer is 75 nm and the thickness of the second dielectric layer is 300 nm, a ratio of an absolute value of an electric potential difference between the low potential and the counter electrode potential to an electric potential difference between the high potential and the counter electrode potential should be set in a range of 43.5/56.5 or more to 46.5/53.5 or less.

In such a manner, it is possible to effectively reduce the bias of electric charges caused by the thickness difference between the first dielectric layer and the second dielectric layer.

In the liquid crystal device according to the second aspect of the invention, it is preferable that, when the thickness of the first dielectric layer is 300 nm and the thickness of the second dielectric layer is 75 nm, a ratio of an absolute value of an electric potential difference between the low potential and the counter electrode potential to an electric potential difference between the high potential and the counter electrode potential should be set in a range of 53.5/46.5 or more to 56.5/43.5 or less.

In such a manner, it is possible to effectively reduce the bias of electric charges caused by the thickness difference between the first dielectric layer and the second dielectric layer.

According to a fifth aspect of the invention, there is provided a method of driving a liquid crystal device. The liquid crystal device includes a pixel electrode, a switching element which is electrically connected to the pixel electrode, a counter electrode which is disposed to be opposed to the pixel electrode and to which a counter electrode potential is applied, a liquid crystal layer which is provided between the pixel electrode and the counter electrode, a first alignment film which is provided between the liquid crystal layer and the pixel electrode, a first dielectric layer which is provided between the first alignment film and the pixel electrode and is made of silicon oxide, a second alignment film which is provided between the liquid crystal layer and the counter electrode, and a second dielectric layer which is provided between the second alignment film and the counter electrode, is made of silicon oxide, and has a thickness less than that of the first dielectric layer. The driving method includes: applying alternately a high potential and a low potential relative to the counter electrode potential to the pixel electrode through the switching element; and setting the counter electrode potential such that the potential is lower than a reference potential, when the reference potential is an electric potential which is obtained by shifting an average electric potential between the high potential and the low potential by an average value between an amount of change in an electric potential of the pixel electrode, caused by a parasitic capacitance of the switching element when the high potential is being applied to the pixel electrode, and an amount of change in the electric potential of the pixel electrode caused by the parasitic capacitance when the low potential is being applied to the pixel electrode.

In such a configuration, the counter electrode potential is set as described above. Therefore, it is possible to reduce both of the bias of electric charges, which is caused by the field-through, and the bias of electric charges which is caused by the thickness difference between the first dielectric layer and the second dielectric layer.

According to a sixth aspect of the invention, there is provided a method of driving a liquid crystal device. The liquid crystal device includes an element substrate which has a plurality of scan lines and a plurality of data lines and has a pixel electrode and a switching element provided to correspond to an intersection point between the scan line and the data line, a counter substrate which is disposed to be opposed to the element substrate and has a counter electrode, a liquid crystal layer which is sandwiched between the element substrate and the counter substrate, a first alignment film which is provided on a side of the element substrate close to the liquid crystal layer a second alignment film which is provided on a side of the counter substrate close to the liquid crystal layer, a first dielectric film which is provided between the pixel electrode and the first alignment film, has a film thickness less than that of the liquid crystal layer, has a specific resistance higher than that of the liquid crystal layer, and is made of $SiO_2$, and a second dielectric film which is provided between the counter electrode and the second alignment film, has a film thickness less than that of the first dielectric film, has a specific resistance higher than that of the liquid crystal layer, and is made of $SiO_2$. The driving method includes: applying a counter electrode potential, which is set to reduce flicker caused by a parasitic capacitance of the switching element, to the counter electrode; applying alternately a positive voltage and a negative voltage to the pixel electrode when the positive voltage is a high-potential voltage and the negative voltage is a low-potential voltage relative to the counter electrode potential as a reference; and setting, in predetermined durations such as a first duration during which the positive voltage is applied and a second duration during which the negative voltage is applied, a length of the first duration such that the length is longer than a length of the second duration.

According to the method of driving the liquid crystal device according to the sixth aspect of the invention, the counter electrode potential is shifted and set in advance so as to reduce flicker caused by the parasitic capacitance of the switching element. Hence, the first phenomenon can be corrected. Further, the length of the first duration is set to be longer than the length of the second duration during the predetermined durations. Hence, the second phenomenon can also be corrected. The correction is based on the following fact which is found by the inventors. The first dielectric film is disposed between the first alignment film and the pixel electrode on the element substrate side, and the second dielectric film is disposed between the second alignment film and the counter electrode on the counter substrate side, thereby shifting the effective voltage waveform in the positive direction of the electric potential. Here, the first dielectric film has the film thickness less than that of the liquid crystal layer, has the specific resistance higher than that of the liquid crystal layer, and is made of silicon oxide ($SiO_2$). In addition, the second dielectric film has a film thickness less than that of the first dielectric film, has a specific resistance higher than that of the liquid crystal layer, and is made of silicon oxide ($SiO_2$). This fact is also seen from the results of experiments performed by the inventors. As a result, it is possible to improve display quality by suppressing the occurrence of the display defects such as flicker.

According to a seventh aspect of the invention, there is provided a method of driving a liquid crystal device. The liquid crystal device includes an element substrate which has a plurality of scan lines and a plurality of data lines and has a pixel electrode and a switching element provided to correspond to an intersection point between the scan line and the data line, a counter substrate which is disposed to be opposed to the element substrate and has a counter electrode, a liquid crystal layer which is sandwiched between the element substrate and the counter substrate, a first alignment film which is provided on a side of the element substrate close to the liquid crystal layer a second alignment film which is provided on a side of the counter substrate close to the liquid crystal layer, a first dielectric film which is provided between the pixel electrode and the first alignment film, has a film thickness less than that of the liquid crystal layer, has a specific resistance higher than that of the liquid crystal layer, and is made of $SiO_2$, and a second dielectric film which is provided between the counter electrode and the second alignment film, has a film thickness more than that of the first dielectric film, has a specific resistance higher than that of the liquid crystal layer, and is made of $SiO_2$. The driving method includes: applying a counter electrode potential, which is set to reduce flicker caused by a parasitic capacitance of the switching element, to the counter electrode; applying alternately a positive voltage and a negative voltage to the pixel electrode when the positive voltage is a high-potential voltage and the negative voltage is a low-potential voltage relative to the counter electrode potential as a reference; and setting, in predetermined durations such as a first duration during which the positive voltage is applied and a second duration during which the negative voltage is applied, a length of the first duration such that the length is shorter than a length of the second duration.

According to the method of driving the liquid crystal device according to the seventh aspect of the invention, the counter electrode potential is shifted and set in advance so as to reduce flicker caused by the parasitic capacitance of the switching element. Hence, the first phenomenon can be corrected. Further, the length of the first duration is set to be shorter than the length of the second duration during the predetermined durations. Hence, the second phenomenon can also be corrected. The correction is based on the following fact which is found by the inventors. The first dielectric film is disposed between the first alignment film and the pixel electrode on the element substrate side, and the second dielectric film is disposed between the second alignment film and the counter electrode on the counter substrate side, thereby shifting the effective voltage waveform in the negative direction of the electric potential. Here, the first dielectric film has the film thickness less than that of the liquid crystal layer, has the specific resistance higher than that of the liquid crystal layer, and is made of silicon oxide ($SiO_2$). In addition, the second dielectric film has a film thickness more than that of the first dielectric film, has a specific resistance higher than that of the liquid crystal layer, and is made of silicon oxide ($SiO_2$). This fact is also seen from the results of experiments performed by the inventors. As a result, it is possible to improve display quality by suppressing the occurrence of the display defects such as flicker.

Further, in the method of driving the liquid crystal device according to the sixth aspect of the invention, it is preferable that, when a ratio of the film thickness of the first dielectric film to the film thickness of the second dielectric film is 1/4, a ratio of the length of the first duration to the length of the second duration should be set in a range of 43.5/56.5 or more to 46.5/53.5 or less.

According to the method of driving the liquid crystal device, the ratio is an optimum time share ratio corresponding to the allowable limit of flicker. Therefore, it is possible to effectively perform the correction for the second phenomenon. In contrast, when the ratio of the length of the first duration to the length of the second duration is smaller than 43.5/56.5, the length of the first duration is too long, and thus it may be difficult to perform effective correction. Further, when the ratio of the length of the first duration to the length of the second duration is larger than 46.5/53.5, the length of the first duration is too short, and thus it may be difficult to perform effective correction.

Further, in the method of driving the liquid crystal device according to the seventh aspect of the invention, it is preferable that, when a ratio of the film thickness of the first dielectric film to the film thickness of the second dielectric film is 4/1, a ratio of the length of the first duration to the length of the second duration should be set in a range of 53.5/46.5 or more to 56.5/43.5 or less.

According to the method of driving the liquid crystal device, at the ratio, the ratio is an optimum time share ratio corresponding to the allowable limit of flicker. Therefore, it is possible to effectively perform the correction for the second phenomenon. In contrast, when the ratio of the length of the first duration to the length of the second duration is smaller than 53.5/46.5, the length of the first duration is too long, and thus it may be difficult to perform effective correction. Further, when the ratio of the length of the first duration to the length of the second duration is larger than 56.5/43.5, the length of the first duration is too short, and thus it may be difficult to perform effective correction.

According to an eighth aspect of the invention, there is provided an electronic apparatus including the above-mentioned liquid crystal device.

According to the electronic apparatus, it includes the above-mentioned liquid crystal device. Therefore, it is possible to provide an electronic apparatus capable of improving display quality by suppressing the occurrence of the display defects such as flicker.

BRIEF DESCRIPTION OF THE DRAWINGS

The invention will be described with reference to the accompanying drawings, wherein like numbers reference like elements.

FIG. 21 is a diagram illustrating writing states of respective rows with passage of time in the range of successive frames in the case where the designated value is "+1".

FIG. 22 is a sectional view illustrating a schematic configuration of a liquid crystal panel according a fourth embodiment.

DESCRIPTION OF EXEMPLARY EMBODIMENTS

Figure 1:
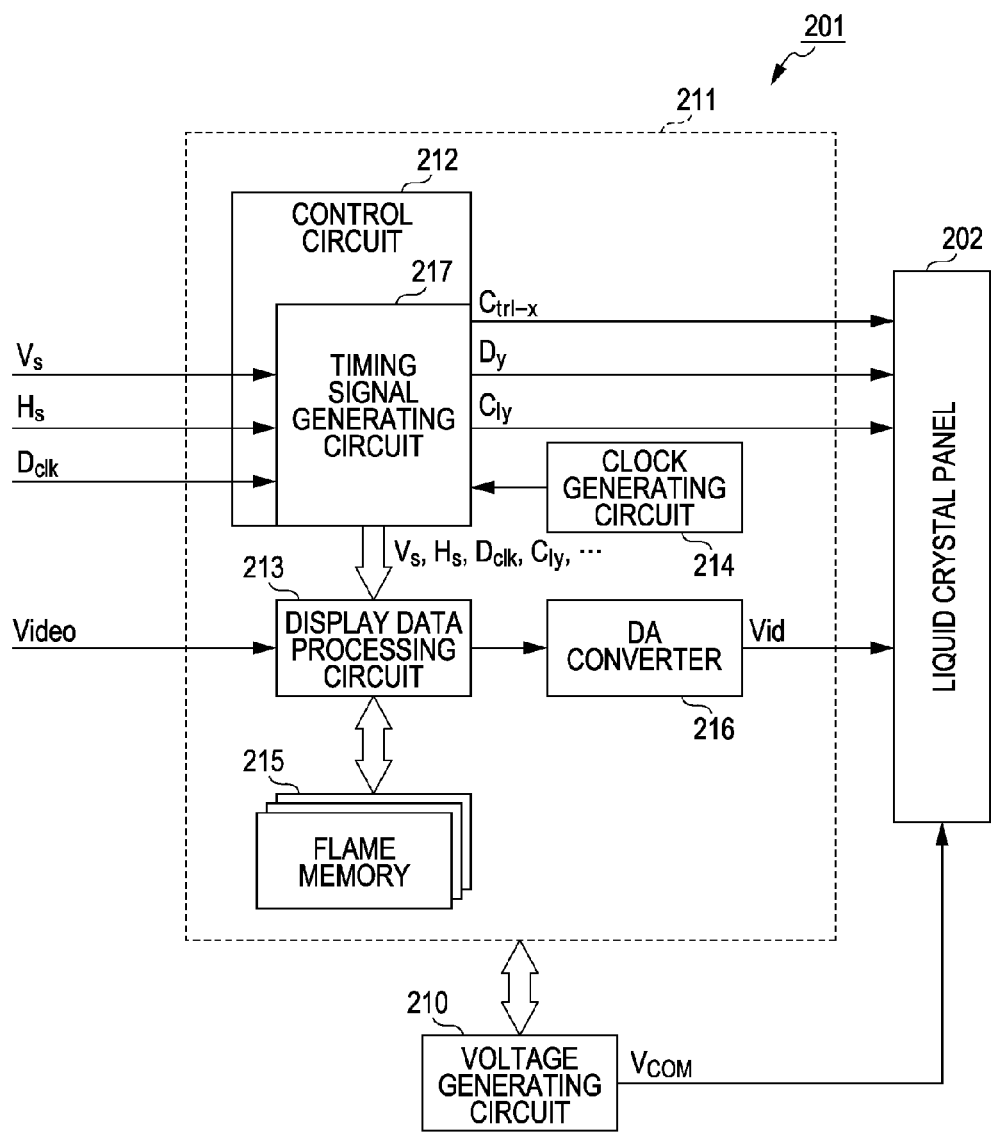
FIG. 1 is a block diagram illustrating a schematic configuration of a liquid crystal device according to an embodiment of the invention.

Hereinafter, embodiments of the invention will be described with reference to the accompanying drawings. In the drawings used in the description, in order to clearly show the features, the dimensions and scales of the structures in the drawings may be different from those in practice. Further, the common elements in the embodiment are represented by the same reference numerals and signs, and a detailed description thereof may be omitted. Furthermore, the technical scope of the invention is not limited to the following embodiments. Various modifications thereof are possible without departing from the scope of the invention.

First Embodiment

Figure 2:
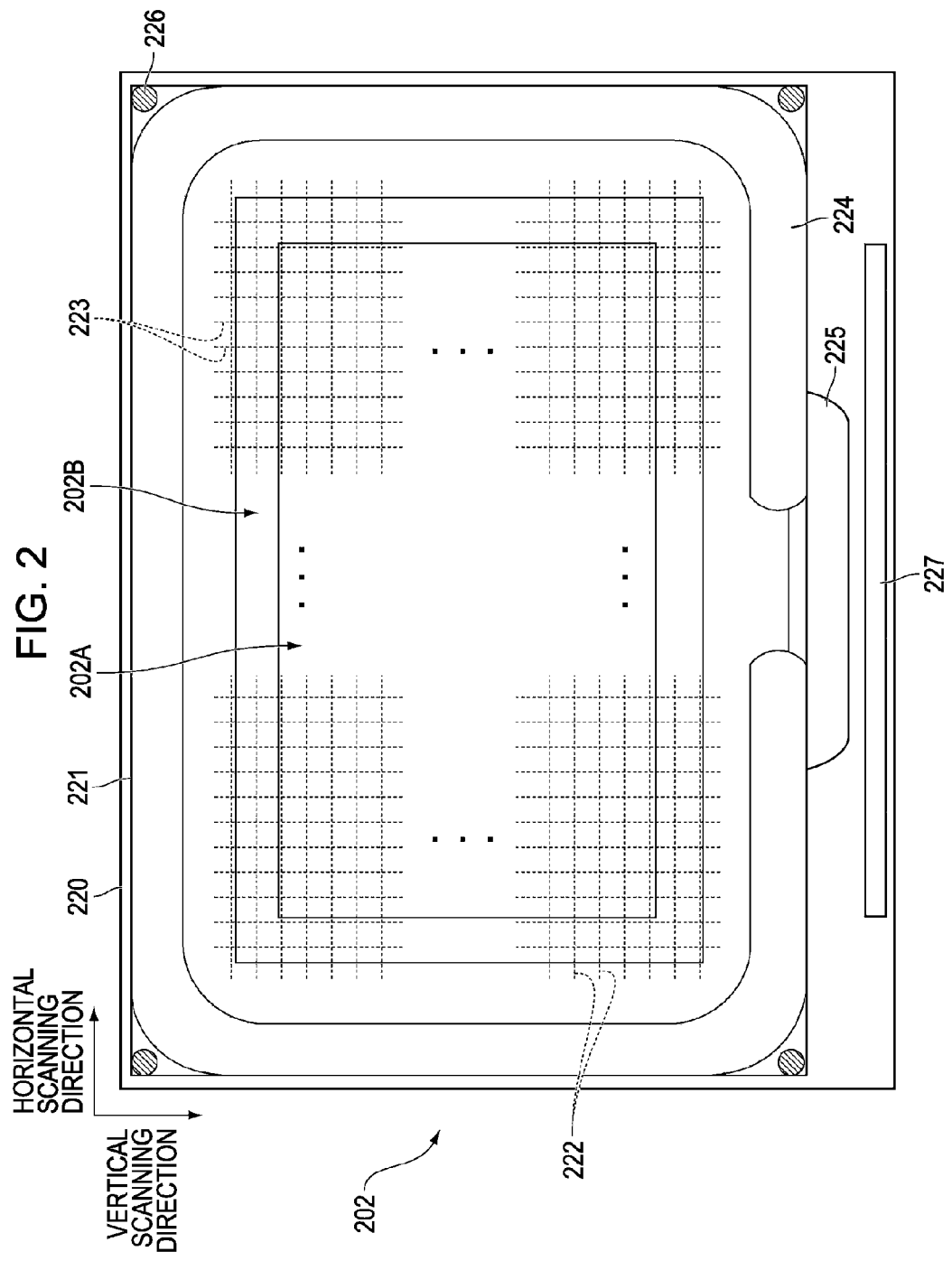
FIG. 2 is a plan view illustrating a schematic configuration of a liquid crystal panel.
Figure 3:
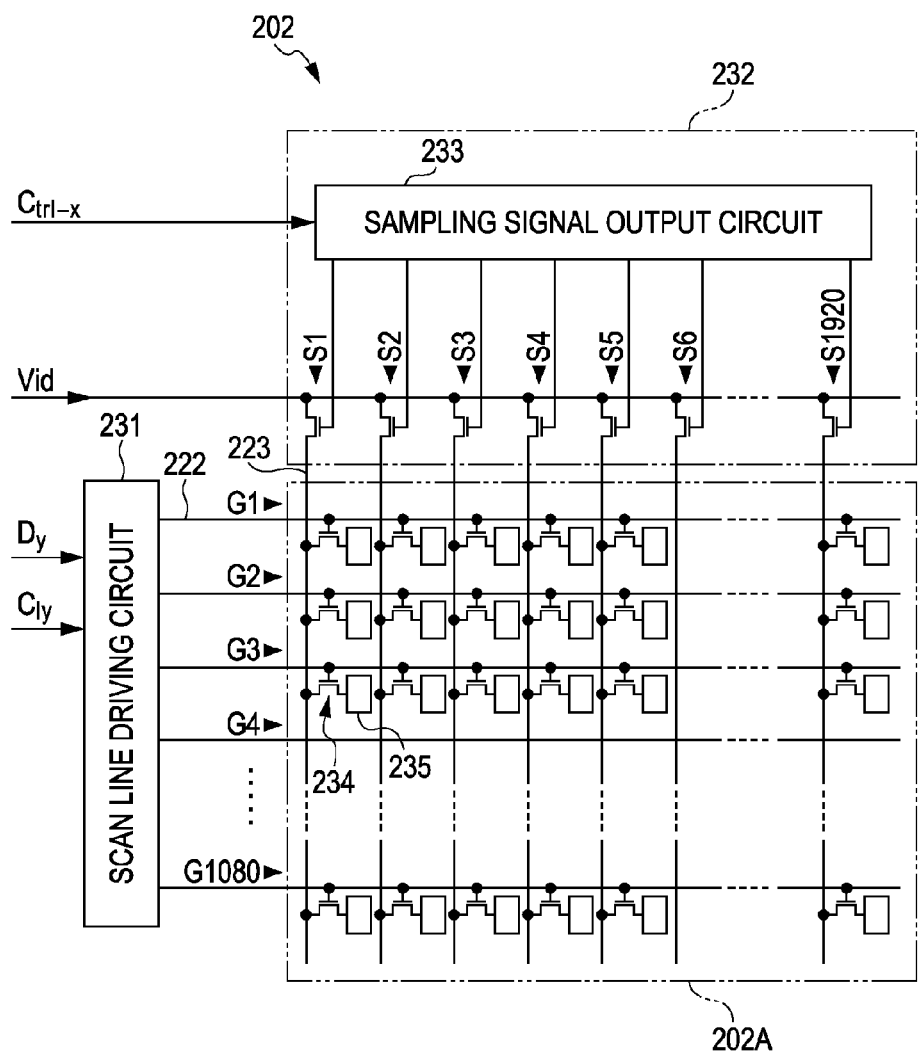
FIG. 3 is a diagram illustrating a circuit configuration of the liquid crystal panel.

FIG. 1 is a block diagram illustrating a schematic configuration of a liquid crystal device according to an embodiment of the invention. FIG. 2 is a plan view illustrating a schematic configuration of a liquid crystal panel. FIG. 3 is a diagram illustrating a circuit configuration of the liquid crystal panel.

The liquid crystal device 201 shown in FIG. 1 includes a liquid crystal panel 202, a voltage generating circuit 210, and a processing circuit 211. The liquid crystal panel 202 is an active matrix reflective liquid crystal panel, and a detailed configuration will be described later.

The voltage generating circuit 210 includes a DC/DC converter and the like. The voltage generating circuit 210 is controlled by the processing circuit 211, and operates as follows. The voltage generating circuit 210 generates multi-level DC voltages used in the respective section of the liquid crystal device 201. The voltage generating circuit 210 generates a counter electrode potential $V_{COM}$ which is applied to the counter electrode of the liquid crystal panel 202, and supplies the potential to the liquid crystal panel 202. In the voltage generating circuit 210, an electric power necessary to generate the various voltages is supplied from, for example, an internal or external power supply of the liquid crystal device 201.

The processing circuit 211 is constituted by a circuit module which controls the operations and the like of the liquid crystal panel 202 in accordance with the output of a data signal Vid. The processing circuit 211 is connected to the liquid crystal panel 202 through, for example, an FPC (Flexible Printed Circuit) substrate.

The processing circuit 211 includes a control circuit 212, a display data processing circuit 213, a clock generating circuit 214, a frame memory 215, and a DA converter 216. A timing signal generating circuit 217 is built in the control circuit 212, and the clock generating circuit 214 is attached to the timing signal generating circuit 217. The control circuit 212 controls the timing signal generating circuit 217, the display data processing circuit 213, and the voltage generating circuit 210.

The clock generating circuit 214 generates a clock signal which serves as a reference of the control operations of the respective sections, and outputs the signal to the timing signal generating circuit 217. The timing signal generating circuit 217 generates various control signals for controlling the liquid crystal panel 202 in synchronization with a vertical synchronization signal $V_s$, a horizontal synchronization signal $H_s$, and a dot clock signal $D_{clk}$ supplied from an external apparatus (not shown). The timing signal generating circuit 217 inputs a control signal $C_{trl-x}$, a trigger signal $D_y$, and a clock signal $C_{1y}$, which are generated as the control signals, to the liquid crystal panel 202.

The frame memory 215 and the DA converter 216 are attached to the display data processing circuit 213. The display data processing circuit 213 is controlled by the control circuit 212, and operates as follows. The display data processing circuit 213 stores a display data Video, which is supplied from the external apparatus, in the frame memory 215. The display data processing circuit 213 reads the display data Video from the frame memory 215 in synchronization with the driving of the liquid crystal panel 202, and converts the display data Video into an analog data signal Vid (a driving voltage) through the DA converter 216. Furthermore, the display data Video defines the gray scale of each pixel in the liquid crystal panel 202. Thus, the display data corresponding to 201 frames is supplied at the time of supplying the vertical synchronization signal $V_s$, and simultaneously the display data corresponding to a single row is supplied at the time of supplying the horizontal synchronization signal $H_s$.

The vertical synchronization signal $V_s$ in the embodiment has a frequency of 120 Hz (a period of 8.33 milliseconds). However, the applicable scope of the invention is not limited to the frequency of the vertical synchronization signal $V_s$. The dot clock signal $D_{clk}$ defines the duration during which the display data Video corresponding to one pixel is supplied. That is, the control circuit 212 controls the respective sections in synchronization with the supply of the display data Video.

As shown in FIG. 2, the liquid crystal panel 202 has an element substrate 220 and a counter substrate 221. A display area 202A is provided on the central portion of the liquid crystal panel 202. A black display area 202B is provided on the peripheral portion of the display area 202A. A plurality of pixels is arranged in a square lattice shape in the display area 202A. Here, the description is given under the assumption that 1920×1080 pixels are arranged in the display area 202A. However, the applicable scope of the invention is not limited to the number of pixels of the liquid crystal panel 202. In the following description, a direction in which 1920 pixels are lined up is referred to as a horizontal scanning direction, and a direction in which 1080 pixels are lined up is referred to as a vertical scanning direction.

A plurality of scan lines 222, which is parallel with the horizontal scanning direction, is provided on the element substrate 220. A plurality of data lines 223, which is parallel with the vertical scanning direction, is provided on the element substrate 220. The scan lines 222 and the data lines 223 are respectively provided on mutually different layers in the element substrate 220, and are configured not to be electrically connected to each other. Each area surrounded by the scan lines 222 and the data lines 223 is defined as a single pixel. The pixel described herein is the minimum unit of a modulation element for modulating light, and sometimes the pixel is called a sub-pixel when the pixel displays a color image by using additive color mixing of two or more basic colors. A switching element corresponding one-to-one with each pixel is provided in the vicinity of each intersection point between the scan lines 222 and the data lines 223. The switching element is constituted by TFT.

The first seal material 224 and the second seal material 225 are provided on the peripheral portion of the black display area 202B so as to surround the black display area 202B. The counter substrate 221 is bonded to the element substrate 220 through a first seal material 224. The first seal material 224 has an opening, and a second seal material 225 is provided to block the opening. A liquid crystal layer which is omitted in the drawing is injected in the area surrounded by the first seal material 224 between the element substrate 220 and the counter substrate 221. By blocking the opening of the first seal material 224 through the second seal material 225 after injecting the liquid crystal layer to the area, the liquid crystal layer is sealed between the element substrate 220 and the counter substrate 221.

An inter-substrate conductive terminal section 226 is provided, outside the display area 202A, in the area in which the element substrate 220 and the counter substrate 221 overlaps with each other, here, in the vicinity of four corners of the counter substrate 221. The counter electrode potential $V_{COM}$ generated by the voltage generating circuit 210 is supplied to the element substrate 220, and is supplied to the counter substrate 221 through the inter-substrate conductive terminal section 226.

A scan line driving circuit (omitted in the drawing) and a data line driving circuit (omitted in the drawing) are provided outside the display area 202A. The plurality of scan lines 222 are electrically connected to the scan line driving circuit. The plurality of data lines 223 are electrically connected to the data line driving circuit. A connection terminal section 227 is provided in the peripheral portion of the element substrate 220. The plurality of connection terminals which is omitted in the drawing is provided in the connection terminal section 227. One end of each connection terminal is electrically connected to the scan line driving circuit or the data line driving circuit through route wiring and the like. The other end of each connection terminal is electrically connected to the processing circuit 211 through the FPC substrate. The scan line driving circuit and the data line driving circuit are mounted on a mount terminal section provided on the element substrate 220.

As shown in FIG. 3, the scan line driving circuit 231 receives inputs of the trigger signal $D_y$ and the clock signal $C_{1y}$, which are generated by the timing signal generating circuit 217. The trigger signal $D_y$ is a signal for defining the timing of starting each frame. The clock signal $C_{1y}$ is a signal for defining the timing of supplying the scan signal to each scan line in the duration of each frame. The scan line driving circuit 231 supplies scan signals G1 to G1080 to the plurality of scan lines 222 in a line-sequential manner on the basis of the trigger signal $D_y$ and clock signal $C_{1y}$. When the scan line 222 is supplied with the scan signal, the switching element 234 connected to the scan line 222 is turned on.

The data line driving circuit 232 is constituted by the sampling signal output circuit 233 and n-channel-type TFTs provided to respectively correspond to the data lines 223. The data line driving circuit 232 supplies gray-scale data for defining the gray scales of the pixels to the pixels connected to the selected scan line 222. The data signal Vid is input, as serial data including gray-scale data for each pixel connected to for example the single scan line 222, to the data line driving circuit 232.

The sampling signal output circuit 233 receives an input of the control signal $C_{trl-x}$ which is generated by the timing signal generating circuit 217. The sampling signal output circuit 233 supplies, in accordance with the control signal $C_{trl-x}$, the gray-scale data for the respective pixels constituting the serial data as parallel data to the data lines 223 at the timing defined by the control signal $C_{trl-x}$. For example, when the gray-scale data is intended to be written in the pixel of the i-th row and the j-th column, at the time of supplying the scan signal to the scan line 222 of the i-th row, the data line driving circuit 232 supplies the gray-scale data to the pixel of the i-th row and the j-th column through the data line 223 of the j-th column. The switching element 234 attached to the pixel of the i-th row and the j-th column is turned on in response to the scan signal, and the gray-scale data is written in the pixel electrode 235 through the switching element 234.

Figure 4:
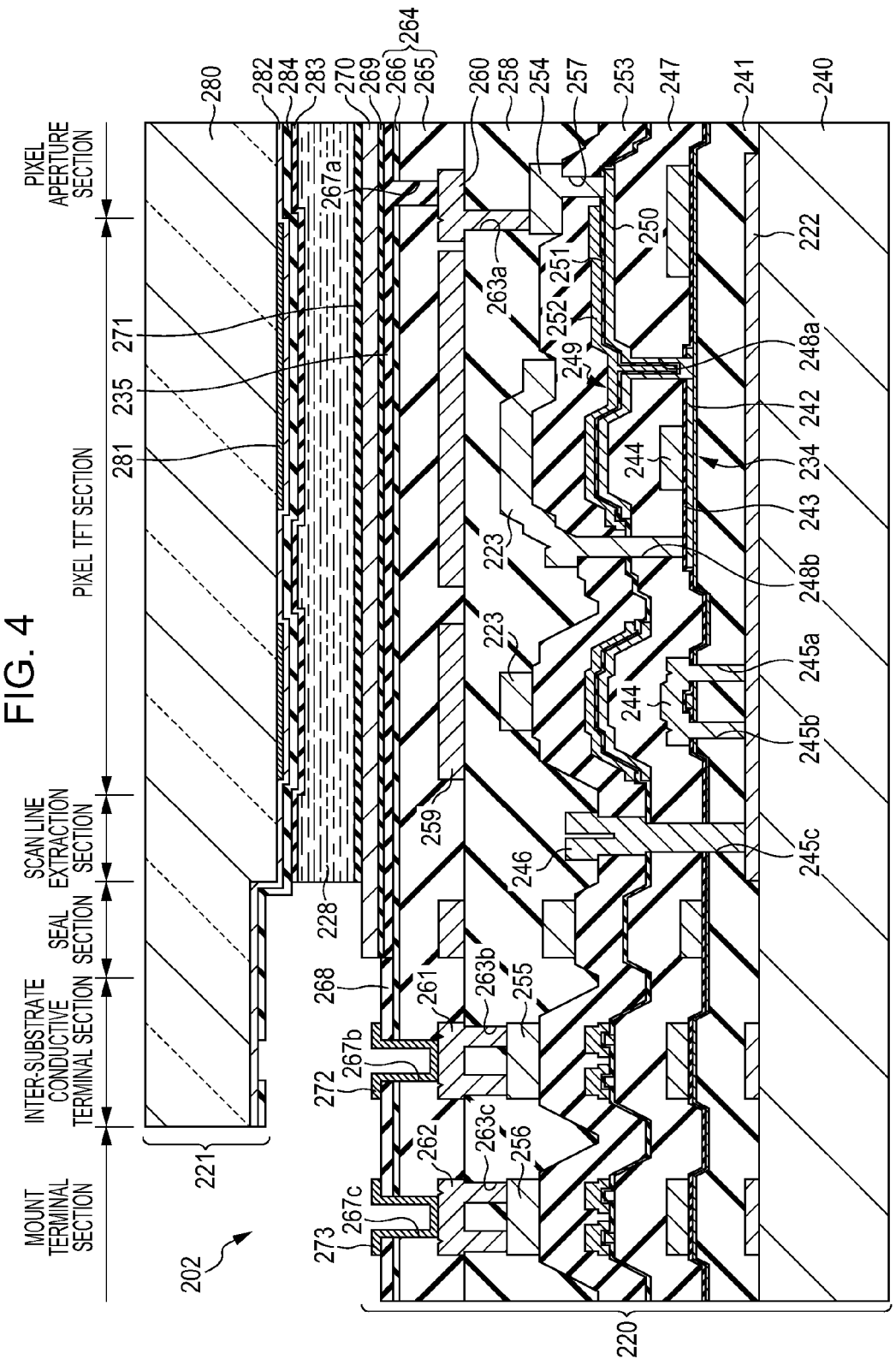
FIG. 4 is a diagram schematically illustrating a sectional structure of the liquid crystal panel of a first embodiment in an enlarged manner.

FIG. 4 is a diagram schematically illustrating a sectional structure of the liquid crystal panel in an enlarged manner. For convenience of description, FIG. 4 schematically shows sectional structures of respective sections in one sectional view. The respective sections are a pixel aperture section, a pixel TFT section, a scan line extraction section, an inter-substrate conductive terminal section, and a mount terminal section. Further, FIG. 4 collectively shows, as the pixel TFT section, the sectional structure including the lengthwise section of the channel of the switching element and the sectional structure intersecting the lengthwise direction of the channel.

As shown in FIG. 4, the liquid crystal panel 202 includes the element substrate 220 and the counter substrate 221 that is disposed to be opposed to the element substrate 220, and a liquid crystal layer 228 sandwiched therebetween. The liquid crystal layer 228 is a VA-mode liquid crystal layer formed of, for example, a liquid crystal material of which the dielectric anisotropy is negative. The thickness of the liquid crystal layer 228 is, for example, 1600 nm or more and 2000 nm or less. In the embodiment, the light, which is emitted from the light source and the like, is incident to the liquid crystal layer 228 through the counter substrate 221, is reflected on the surface layer of the element substrate 220, and exits from the same side as the light incident side of the liquid crystal panel 202. In the following description of the sectional structure of the liquid crystal panel 202, the thicknesses of various components are sizes in the thickness direction of the liquid crystal layer 228.

The element substrate 220 has a laminated structure. In the structure, the element substrate main body 240 is a base, and on the element substrate main body 240, the following layers are laminated: a plurality of wiring layers including various wires such as the scan lines 222, the data lines 223, and the capacitance lines 259; an element layer including the switching elements 234; and an electrode layer including a pixel electrodes 235.

The element substrate main body 240 is formed by a glass substrate, a sapphire substrate, a silicon substrate, or the like. The scan lines 222 are provided on the element substrate main body 240. The scan lines 222 are made of, for example, tungsten silicide (WSi). The thickness of the scan lines 222 is, for example, 180 nm or more and 220 nm or less. The scan lines 222 have a light blocking effect, and are thus provided on the area which overlaps with the substantially entire switching element 234, in plan view, as viewed in the thickness direction of the liquid crystal layer 228. Thereby, the light is hardly likely to be incident to the switching element 234 from the scan line 222 side.

A first interlayer insulation film 241, which is made of for example silicon oxide, is provided on the substantially entire surface of the element substrate main body 240 including the upside of the scan lines 222. The first interlayer insulation film 241 is formed by, for example, the CVD method or the like using tetraethoxysilane (hereinafter referred to as TEOS) in a raw gas. The thickness of the first interlayer insulation film 241 is, for example, 380 nm or more and 420 nm or less.

The switching elements 234 are provided in the pixel TFT section on the first interlayer insulation film 241. Each switching element 234 includes a semiconductor layer 242, a gate insulation film 243, and a gate electrode 244. The semiconductor layer 242 is made of, for example, polysilicon, and includes a high-density impurity area, a low-density impurity area, and the channel area. The high-density impurity area is provided on both sides of the channel area in the lengthwise direction of the channel, and thus one side of the high-density impurity area is a source area, and the other side thereof is a drain area. The semiconductor layer 242 is an N-channel-type semiconductor layer in which electrons serves as carriers in the ON state of the switching element 234. The thickness of the semiconductor layer 242 is, for example, about 40 nm.

The gate insulation film 243 is provided on the semiconductor layer 242. The gate insulation film 243 is made of, for example, silicon oxide, and is formed by the thermal oxidation method or the like. The thickness of the gate insulation film 243 is, for example, 43 nm or more and 56 nm or less.

The gate electrode 244 is made of, for example, conductive polysilicon, and is formed on the area which overlaps with the channel area, in plan view, as viewed in the thickness direction of the liquid crystal layer 228. The thickness of the gate electrode 244 is, for example, 15 nm or more and 105 nm or less.

First contact holes 245a to 245c are provided to lead to the scan lines 222 by penetrating through the first interlayer insulation film 241 and the gate insulation film 243. A part of the gate electrode 244 is buried inside the first contact holes 245a and 245b, and is electrically connected to the scan line 222. The first contact hole 245c is provided on the scan line extraction section, and a conductive portion 246 for connecting the scan line 222 to the scan line driving circuit 231 is buried inside the first contact hole 245c.

A second interlayer insulation film 247 is provided on the substantially entire surface of the element substrate main body 240 including the upside of the switching element 234. The second interlayer insulation film 247 is made of, for example, silicon oxide similarly to the first interlayer insulation film 241, and is formed by the CVD method or the like. The thickness of the second interlayer insulation film 247 is, for example, 280 nm or more and 320 nm or less.

Second contact holes 248a and 248b are formed to lead to the high-density impurity area of the semiconductor layer 242 by penetrating through the second interlayer insulation film 247. A storage capacitance 249 is provided on the second interlayer insulation film 247 of the pixel TFT section. The storage capacitance 249 includes a lower capacitive electrode 250, a capacitance insulation film 251, and an upper capacitive electrode 252.

A part of the lower capacitive electrode 250 is buried inside the second contact hole 248a, and is electrically connected to the high-density impurity area (the drain area) of the semiconductor layer 242. Further, a part of the lower capacitive electrode 250 is electrically connected to the pixel electrode 235. The lower capacitive electrode 250 is made of, for example, conductive polysilicon, and the thickness thereof is, for example, 95 nm or more and 105 nm or less.

The upper capacitive electrode 252 is disposed to be opposed to the lower capacitive electrode 250 with the capacitance insulation film 251 interposed therebetween. The upper capacitive electrode 252 is constituted by three-layer structure film. In the film, for example, the following layers are laminated in order from the lower layer: a titan nitride layer (for example, the thickness thereof is 47 nm or more and 53 nm or less); an aluminum layer (for example, the thickness thereof is 142 nm or more and 158 nm or less); and a titan nitride layer (for example, the thickness thereof is 97 nm or more and 103 nm or less). The electric potential of the upper capacitive electrode 252 is maintained at, for example, the counter electrode potential $V_{COM}$ when the liquid crystal layer 228 is driven.

The upper capacitive electrode 252 has a light blocking effect, and is provided in the area which overlaps with the substantially entire switching element 234, in plan view, as viewed in the thickness direction of the liquid crystal layer 228. Thereby, the light is hardly likely to be incident to the switching element 234 from the liquid crystal layer 228 side.

When the driving voltage is applied to the pixel electrode 235, the storage capacitance 249 is charged together with the pixel electrode 235. Thereby, a ratio of an amount of electric charge reduced by the leak in the switching element 234 to an amount of electric charge retained in the pixel electrode 235 decreases. Therefore, it is possible to reduce an effect of the leak.

The capacitance insulation film 251 is made of, for example, silicon oxide, and is formed by the thermal oxidation method or the like. The thickness of the capacitance insulation film 251 is, for example, 3 nm or more and 5 nm or less. From the viewpoint of increasing the capacitance of the storage capacitance 249, it is preferable that the thickness of the capacitance insulation film 251 should be set to be thin within a range in which it is possible to secure the reliability of the film.

A third interlayer insulation film 253 is provided on the substantially entire surface of the element substrate main body 240 including the upside of the storage capacitance 249. The third interlayer insulation film 253 is constituted by a silicon oxide film (hereinafter referred to as a P-TEOS film) formed by a plasma CVD method using TEOS in a raw gas. The thickness of the third interlayer insulation film 253 is, for example, 380 nm or more and 420 nm or less.

The data lines 223, relay electrodes 254 for the pixel electrodes, relay electrodes 255 for the inter-substrate conductive terminal, and relay electrodes 256 for the mount terminal are provided on the third interlayer insulation film 253. Each data line 223 of the embodiment is constituted by a four-layer structure film. In the film, the following layers are laminated in order from the lower layer: a titan layer (for example, the thickness is 19 nm or more and 21 nm or less); a titan nitride layer (for example, the thickness is 47 nm or more and 53 nm or less); an aluminum layer (for example, the thickness is 332 nm or more and 368 nm or less); and a titan nitride layer (for example, the thickness is 142 nm or more and 158 nm or less). The second contact hole 248b penetrates through the third interlayer insulation film 253. A part of the data line 223 is buried inside the second contact hole 248b, and is electrically connected to one side (the source area) of the high-density impurity area of the semiconductor layer 242. The data line 223 is routed, as necessary, on the third interlayer insulation film 253, and is electrically connected to the relay electrode 256 for the mount terminal.

A third contact hole 257 is provided to penetrate through the third interlayer insulation film 253 and lead to the lower capacitive electrode 250. A part of the relay electrode 254 for the pixel electrode is buried inside the third contact hole 257, and is electrically connected to the lower capacitive electrode 250.

The first contact hole 245c penetrates through the second interlayer insulation film 247 and the third interlayer insulation film 253. The conductive portion 246 buried in the first contact hole 245c routes a wiring on the third interlayer insulation film 253 as necessary, and is electrically connected to the relay electrode for the mount terminal. The conductive portion 246 is connected to a relay electrode different from the relay electrode 256 which is electrically connected to the data line 223.

The relay electrode 255 for the inter-substrate conductive terminal is provided, for example, in the inter-substrate conductive terminal section on the third interlayer insulation film 253. The conductive portions 246, the relay electrodes 254 to 256, and the data lines 223 are integrally formed by forming the four-layer structure film and thereafter patterning the film.

A fourth interlayer insulation film 258 is provided on the substantially entire surface of the upside of the element substrate main body 240 including the upsides of the data lines 223 and the upsides of the relay electrodes 254 to 256. The fourth interlayer insulation film 258 is constituted by, for example, the P-TEOS film. The upside of the fourth interlayer insulation film 258 is planarized by the CMP method or the like. The fourth interlayer insulation film 258 is formed to have a thickness by which the upside of the film can be planarized. The thickness of the fourth interlayer insulation film 258 is partially different in accordance with the unevenness of the substrate. However, the thickness is about 600 nm at the minimum, and is about 2500 nm at the maximum.

The capacitance lines 259, second relay electrodes 260 for the pixel electrodes, second relay electrodes 261 for the inter-substrate conductive terminal, and second relay electrodes 262 for the mount terminal are provided on the fourth interlayer insulation film 258. The capacitance line 259 is routed on the fourth interlayer insulation film 258, and is electrically connected to the second relay electrode 261 for the inter-substrate conductive terminal. Further, the capacitance line 259 is electrically connected to the upper capacitive electrode 252 of the storage capacitance 249 through a multi-layer wiring which is omitted in the drawing. The capacitance line 259 is constituted by a two-layer structure film. In the film, for example, the following layers are laminated in order from the lower layer: an aluminum layer (for example, the thickness is 315 nm or more and 385 nm or less); and a titan nitride layer (for example, the thickness is 135 nm or more and 165 nm or less).

Fourth contact holes 263a to 263c are formed to penetrate through the fourth interlayer insulation film 258. The fourth contact hole 263a leads to the relay electrode 254 for the pixel electrode. A part of the second relay electrode 260 for the pixel electrode is buried inside the fourth contact hole 263a, and is electrically connected to the relay electrode 254 for the pixel electrode.

The fourth contact hole 263b leads to the relay electrode 255 for the inter-substrate conductive terminal. A part of the second relay electrode 261 for the inter-substrate conductive terminal is buried inside the fourth contact hole 263b, and is electrically connected to the relay electrode 255 for the inter-substrate conductive terminal.

The fourth contact hole 263c leads to the relay electrode 256 for the mount terminal. A part of the second relay electrode 262 for the mount terminal is buried inside the fourth contact hole 263c, and is electrically connected to the relay electrode 256 for the mount terminal. The capacitance line 259 and the second relay electrodes 260 to 262 are integrally formed by forming the two-layer structure film and thereafter patterning the film.

A fifth interlayer insulation film 264 is provided on the substantially entire surface of the upside of the element substrate main body 240 including the upsides of the capacitance lines 259 and the upsides of the second relay electrodes 260 to 262. The fifth interlayer insulation film 264 is constituted by, for example, a two-layer structure film on which a P-TEOS film 265 and a boron-silicate glass film 266 are laminated in order from the lower layer. Instead of the boron-silicate glass film 266, silicate glass films such as NSG (nondoped silicate glass), PSG (phospho silicate glass), and BPSG (boron phosphate silicate glass) may be used. The P-TEOS film 265 is, similarly to the fourth interlayer insulation film 258, formed to have a thickness by which the upside of the film can be planarized. The thickness of the P-TEOS film 265 is partially different in accordance with the unevenness of the substrate. However, the thickness is about 600 nm at the minimum, and is about 1100 nm at the maximum. The thickness of the boron-silicate glass film is, for example, 55 nm or more and 95 nm or less.

The pixel electrodes 235 are provided on the fifth interlayer insulation film 264. Each pixel electrode 235 has an island shape, and is provided for each pixel. The pixel electrode 235 is made of, for example, aluminum, and the thickness thereof is, for example, 180 nm or more and 220 nm or less. Fifth contact holes 267a to 267c are formed to penetrate through the fifth interlayer insulation film 264. The fifth contact hole 267a leads to the second relay electrode 260 for the pixel electrode. A part of the pixel electrode 235 is buried inside the fifth contact hole 267a, and is electrically connected to the second relay electrode 260 for the pixel electrode.

A planarization film 268 is provided in the peripheral portion of the pixel electrode 235. In the display area 202A, the planarization film 268 is formed to fill the gaps of the plurality of pixel electrodes 235. The planarization film 268 is constituted by, for example, the P-TEOS film, and the thickness thereof is, for example, 180 nm or more and 220 nm or less.

An enhanced-reflection film 269 is provided in the range of the upside of the pixel electrode 235 to the upside of the planarization film 268 in the display area 202A. The enhanced-reflection film 269 is constituted by, for example, a two layer structure film on which a P-TEOS film and a silicon nitride film formed by the plasma CVD method are laminated in order from the lower layer. The thickness of the P-TEOS film is, for example, 67 nm or more and 83 nm or less, and the thickness of the silicon nitride film is, for example, 58 nm or more and 72 nm or less.

A first dielectric layer 270 is formed on the enhanced-reflection film 269. The first dielectric layer 270 has a thickness less than that of the liquid crystal layer 228, and the thickness thereof is, for example, 240 nm or more and 300 nm or less. The first dielectric layer 270 is made of silicon oxide of which the specific resistance is higher than that of the liquid crystal layer 228. The first dielectric layer 270 has a thickness less than that of the liquid crystal layer 228, and has a specific resistance higher than that of the liquid crystal layer 228. Hence, the electric field applied to the liquid crystal layer 228 is hardly likely to interfere with the first dielectric layer 270. The first dielectric layer 270 of the embodiment is constituted by the P-TEOS film of which the thickness is about 300 nm, and thus has a film quality which is denser than that of a first alignment film 271 described below. Further, the thickness thereof is more than that of a second dielectric layer 284 to be described later.

The first alignment film 271 is provided on the first dielectric layer 270. The first alignment film 271 regulates the alignment state of the liquid crystal layer 228 to which an electric field is not applied. The first alignment film 271 is formed by a film on which the alignment process is performed. The first alignment film 271 of the embodiment is made of silicon oxide, and is formed by, for example, the oblique evaporation method or the oblique sputtering method. The thickness of the first alignment film 271 is, for example, 40 nm or more and 80 nm or less.

An inter-substrate conductive terminal 272 is provided on the planarization film 268 in the inter-substrate conductive terminal section. The inter-substrate conductive terminal 272 is made of, for example, indium tin oxide (ITO), and the thickness thereof is, for example, 135 nm or more and 165 nm or less. The fifth contact hole 267b penetrates through the first dielectric layer 270, the enhanced-reflection film 269, and the planarization film 268, and leads to the second relay electrode 261 for the inter-substrate conductive terminal. A part of the inter-substrate conductive terminal 272 is buried inside the fifth contact hole 267b, and is electrically connected to the second relay electrode 261 for the inter-substrate conductive terminal.

A mount terminal 273 is provided on the dielectric layer in the mount terminal section. The mount terminal 273 is electrically connected to the terminal of the scan line driving circuit 231 or the data line driving circuit 232. The mount terminal 273 is made of, for example, an indium tin oxide film, and the thickness thereof is, for example, 135 nm or more and 165 nm or less. The fifth contact hole 267c penetrates through the planarization film 268, and leads to the second relay electrode 262 for the mount terminal. A part of the mount terminal 273 is buried inside the fifth contact hole 267c, and is electrically connected to the second relay electrode 262 for the mount terminal.

The counter substrate 221 includes a counter substrate main body 280, which has a transparency, as a base substrate. A light blocking film 281 is formed on the counter substrate main body 280. The light blocking film 281 is provided in the area which overlaps with the substantially entire switching element 234, in plan view, as viewed in the thickness direction of the liquid crystal layer 228.

Counter electrodes 282 are provided on the substantially entire surface of the counter substrate main body 280 including the upside of the light blocking film 281. Each counter electrode 282 is made of, for example, a transparent conductive material such as indium tin oxide. The thickness of the counter electrode 282 is, for example, 120 nm or more and 160 nm or less. The counter electrode 282 is electrically connected to the inter-substrate conductive terminal 272 through a conductive member, which is omitted in the drawing, in the inter-substrate conductive terminal section.

A second dielectric layer 284 is provided on the counter electrode 282. The thickness of the second dielectric layer 284 is less than that of the liquid crystal layer 228, and is less than that of the first dielectric layer 270. The thickness of the second dielectric layer 284 is, for example, 60 nm or more and 90 nm or less. The second dielectric layer 284 is made of silicon oxide which has a higher specific resistance than the liquid crystal layer 228. The second dielectric layer 284 has a thickness less than that of the liquid crystal layer 228, and has a specific resistance higher than that of the liquid crystal layer 228. Hence, the electric field applied to the liquid crystal layer 228 is hardly likely to interfere with the second dielectric layer 284. The second dielectric layer 284 of the embodiment is constituted by the P-TEOS film of which the thickness is about 75 nm, and thus has a film quality which is denser than that of a second alignment film 283 described below.

The second alignment film 283 is provided on the second dielectric layer 284. The second alignment film 283, together with the first alignment film 271, regulates the alignment state of the liquid crystal layer 228 to which an electric field is not applied. The first alignment film 271 and the second alignment film 283 of the embodiment are homeotropic alignment films. Similarly to the first alignment film 271, the second alignment film 283 of the embodiment is made of silicon oxide, and is formed by, for example, the oblique evaporation method or the oblique sputtering method. The thickness of the second alignment film 283 is, for example, 40 nm or more and 80 nm or less.

Next, referring to FIGS. 5A and 5B, a description will be given of the electric potential (the driving voltage) applied to the pixel electrode 235, and the electric potential (the counter electrode potential) applied to the counter electrode 282. Further, on the basis of the configuration of the liquid crystal device 201, a method of driving the liquid crystal device according to the embodiment of the invention will also be described collectively.

Figure 5A:
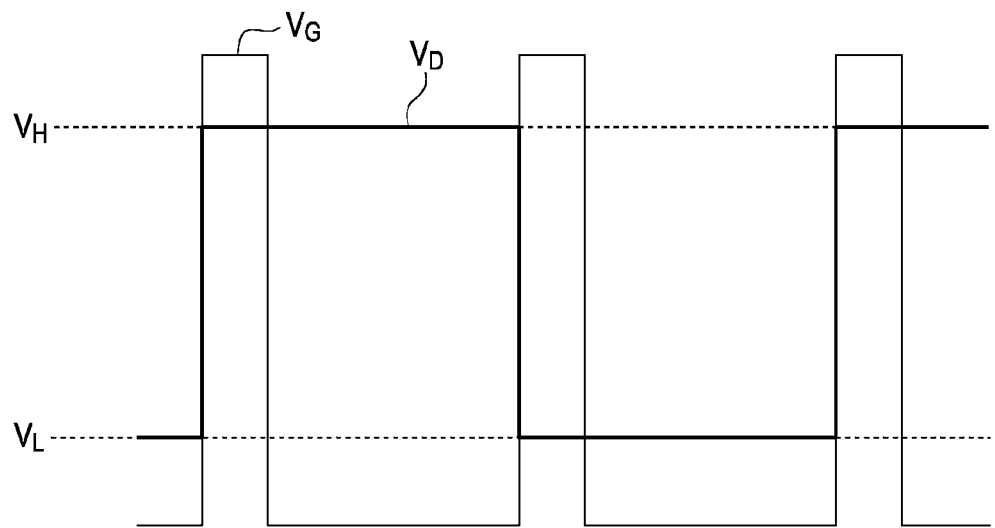
FIG. 5A is an explanatory diagram of a driving voltage.
Figure 5B:
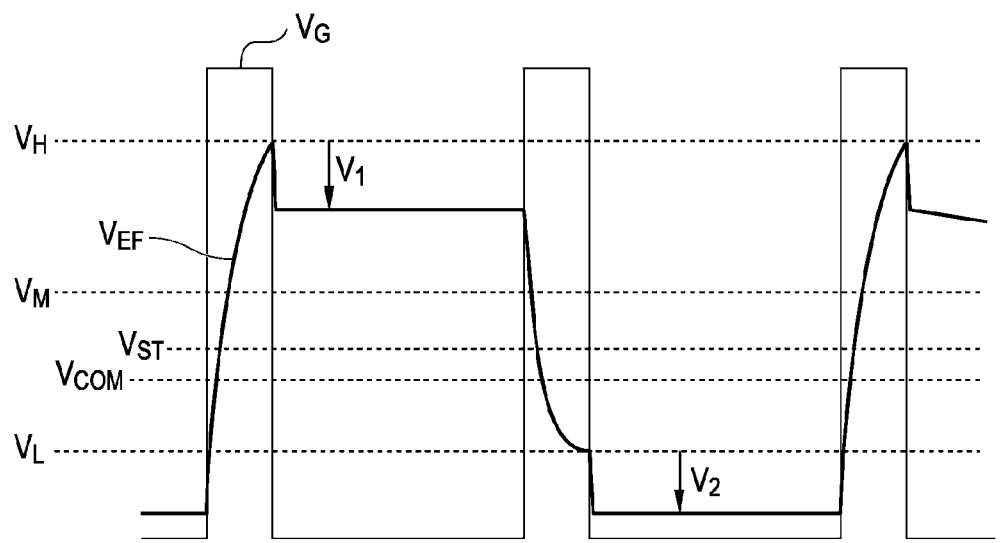
FIG. 5B is an explanatory diagram of a counter electrode potential.

FIG. 5A is a chart illustrating a gate voltage and a driving voltage, and FIG. 5B is a chart illustrating an effective voltage. Furthermore, in FIGS. 5A and 5B, the horizontal axis represents the passage of time from the start of the driving, and the vertical axis represents the electric potential. FIG. 5B shows a waveform of the effective voltage in which the effect of leak is omitted.

As shown in FIG. 5A, when a predetermined gray scale is displayed, the driving voltage $V_D$ applied to the pixel electrode 235 is alternately switched, in synchronization with the rising edge of the gate voltage $V_G$, between the high potential $V_H$ (for example, 12V) and the low potential $V_L$ (for example, 2V). The high potential $V_H$ and the low potential $V_L$ are switched, for example, for each frame.

As shown in FIG. 5B, when the gate voltage $V_G$ rises, the switching element 234 is turned on, and the pixel electrode 235 is charged. The electric potential of the pixel electrode 235, that is, the effective voltage $V_{EF}$ applied to the liquid crystal layer 228 rises up to approximately the high potential $V_H$.

When the switching element 234 is turned off, due to so-called field-through phenomenon (first phenomenon), the effective voltage $V_{EF}$ is lowered. Specifically, electric charges accumulated in the parasitic capacitances of the gate electrode 244 of the switching element 234, the channel area, and the like are distributed to the source area and the drain area, and flows in the pixel electrode 235, thereby causing the voltage drop $V_1$. In practice, sometimes voltage drop may be caused by leak during the duration the switching element 234 is turned off.

Next, when the gate voltage $V_G$ rises, the driving voltage $V_D$ reaches the low potential $V_L$, the pixel electrode 235 is discharged, and the effective voltage $V_{EF}$ drops to the low potential $V_L$. Then, when the switching element 234 is turned off, the field-through causes the voltage drop $V_2$. In practice, sometimes voltage rise may be caused by leak during the duration the switching element 234 is turned off.

In the normal liquid crystal device, the counter electrode is maintained at a predetermined electric potential, and the liquid crystal layer 228 is driven by AC. The predetermined electric potential is set in advance, in consideration of the change of the effective voltage $V_{EF}$ caused by the field-through and the leak, so as to achieve a balance between the positive polarity (high potential) side and the negative polarity (low potential) side relative to the predetermined electric potential of the effective voltage $V_{EF}$.

The predetermined electric potential, in which the field-through is considered, is set as an electric potential (the reference potential $V_{ST}$) which is obtained by shifting the average electric potential $V_M$ between the high potential $V_H$ and the low potential $V_L$ by an average value between the absolute value (the voltage drop $V_1$) of the amount of change of the effective voltage $V_{EF}$ at the time of applying the high potential $V_H$ and the absolute value (the voltage drop $V_2$) of the amount of change of the effective voltage $V_{EF}$ at the time of applying the low potential $V_L$. The reference potential $V_{ST}$ is represented by the following Expression (1). Typically, the voltage drop $V_2$ and the voltage drop $V_1$ are substantially equal to each other, and the reference potential $V_{ST}$ is set as an electric potential which is lower by the voltage drop $V_1$ than the average electric potential $V_M$.

$$V_M - V_{ST} = (V_1 + V_2)/2 \qquad \text{Expression (1)}$$

In order to obtain such a reference potential $V_{ST}$, for example, the effective voltage $V_{EF}$ is measured when a predetermined gray scale is continuously displayed throughout a plurality of frames. Then, the reference potential $V_{ST}$ is obtained by searching for a reference potential at which the time average value $V^+$ of the positive potential during the duration of one frame becomes equal to the time average value $V^-$ of the negative potential during the duration of one frame. The time average value $V^+$ of the positive potential is represented by the following Expression (2), and the time average value $V^-$ of the negative potential is represented by the following Expression (3). In Expressions (2) and (3), T represents the length of the duration of one frame.

$$V^+ = \int_0^T (V_{EF} - V_{ST}) dt \qquad \text{Expression (2)}$$

$$V^- = \int_0^T (V_{ST} - V_{EF}) dt \qquad \text{Expression (3)}$$

When the counter electrode potential is set to the reference potential $V_{ST}$, it seems that it is possible to achieve electric balance between positive and negative polarities. As it is, due to the structural difference between the element substrate 220 and the counter substrate 221, the bias of electric charges remains in the liquid crystal layer 228. In the embodiment of the invention, when the first dielectric layer 270 is provided between the pixel electrode 235 and the first alignment film 271 and the second dielectric layer 284 with a thickness less than that of the first dielectric layer 270 is provided between the counter electrode 282 and the second alignment film 283, the counter electrode potential $V_{COM}$ is set to be lower than the reference potential $V_{ST}$. Thereby, it is possible to cancel asymmetry property of the electric characteristics caused by the thickness difference between the first dielectric layer 270 and the second dielectric layer 284, and thus it is possible to reduce the bias of electric charges.

Figure 6:
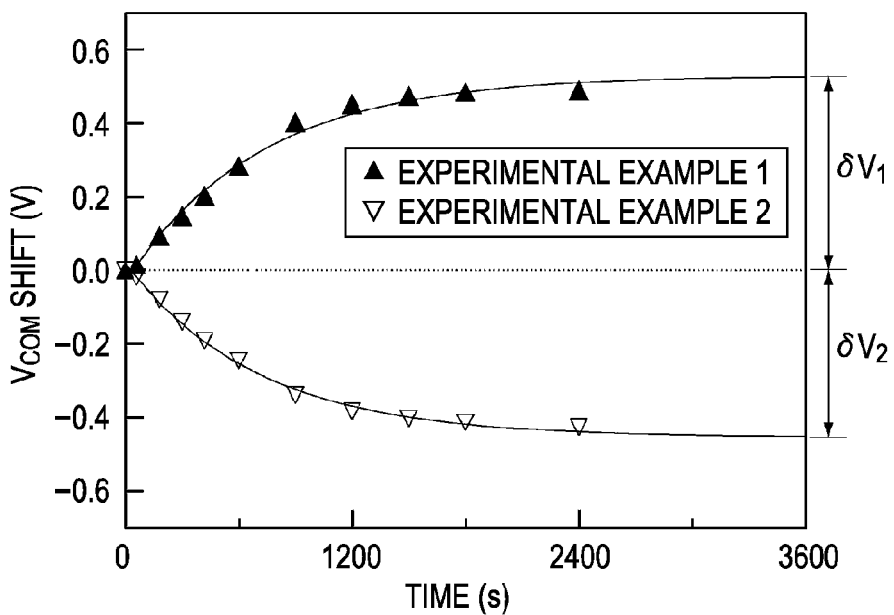
FIG. 6 is a graph illustrating comparison between temporal changes of optimum reference potentials in cases where the thickness ratio of a first dielectric layer to a second dielectric layer is set to be different.

FIG. 6 is a graph illustrating comparison between temporal changes of optimum reference potentials in cases where the thickness ratio of a first dielectric layer to a second dielectric layer is set to be different. In the graph of FIG. 6, data of Experimental Example 1 and data of Experimental Example 2 are plotted. Experimental Example 1 is data for the first liquid crystal device 1, and Experimental Example 2 is data for the second liquid crystal device. In Experimental Example 1, a ratio of the thickness (75 nm) of the second dielectric layer 284 to the thickness (300 nm) of the first dielectric layer 270 is equal to 1/4. The second liquid crystal device has the same configuration as the first liquid crystal device 1 except that the ratio of the thickness (300 nm) of the second dielectric layer to the thickness (75 nm) of the first dielectric layer is equal to 4/1.

At the time of the experiment, the counter electrode potential was set to the reference potential (hereinafter referred to as an initial reference potential $V_{STA}$) in the respective liquid crystal devices, and the respective liquid crystal devices were continuously made to display a predetermined gray scale. Then, the temporal changes of the effective voltages $V_{EF}$ of the respective liquid crystal devices were measured, and on the basis of the measurement result, the reference potential (hereinafter referred to as an optimum reference potential $V_{STB}$) in a case where the electric balance between positive and negative polarity is optimized for each time point was obtained. Then, for each liquid crystal device, the amount of electric potential change (V) from the initial reference potential $V_{STA}$ to the optimum reference potential $V_{STB}$ was obtained at each time point after the start of the driving. The amount of electric potential change is referred to as a $V_{COM}$ shift in the following description. The $V_{COM}$ shift is represented by the following Expression (4).

$$V_{COM}\text{shift} = V_{STA} - V_{STB} \qquad (4)$$

In the graph of FIG. 6, the horizontal axis represents the passage of time from the start of the driving, and the vertical axis represents the $V_{COM}$ shift at each point. As can be seen from the graph of FIG. 6, the $V_{COM}$ shift (Experimental Example 2) of the second liquid crystal device decreases with time, and is converged to approximately −0.5V after 3600 seconds later. The $V_{COM}$ shift (Experimental Example 1) of the first liquid crystal device 1 increases with time, contrary to the Experimental Example 1, and is converged to approximately 0.5V after 3600 seconds later. From this, it can be inferred that, if the first and second dielectric layers have the same thickness, the $V_{COM}$ shift is equal to approximately 0. In other words, in the first liquid crystal device, the first dielectric layer is thicker than the second dielectric layer, and thus it would appear that the $V_{COM}$ shift is changed in the positive direction. Further, in the second liquid crystal device, the first dielectric layer is thinner than the second dielectric layer, and thus it would appear that the $V_{COM}$ shift is changed in the negative direction. In the first liquid crystal device 1, the optimum reference potential $V_{STB}$ after the convergence becomes lower than the initial reference potential $V_{STA}$. Therefore, by setting the counter electrode potential $V_{COM}$ such that it is lower than the initial reference potential $V_{STA}$, the value of the $V_{COM}$ shift becomes approximate to the value (approximately 0) which is obtained when the first dielectric layer and the second dielectric layer have the same thickness. This means that it is possible to reduce the effect of the thickness difference between the first dielectric layer 70 and the second dielectric layer 84 on the bias of electric charges of the liquid crystal layer 28.

Such a finding is advantageous in that the optimum counter electrode potential $V_{COM}$ is searched in terms of reducing the bias of electric charges. Specifically, when the optimum counter electrode potential is intended to be determined, similarly to Experimental Example 1 mentioned above, by continuously displaying the predetermined gray scale on the liquid crystal device 1, the converged value of the $V_{COM}$ shift after passage of the predetermined drive time is obtained. Then, while the counter electrode potential is changed into a plurality of levels, each converged value of the $V_{COM}$ shift corresponding to the counter electrode potential of each level is obtained. Thereby, it is possible to obtain a correspondence relationship between the counter electrode potential and the $V_{COM}$ shift. Therefore, it is possible to obtain the counter electrode potential, which is obtained when the absolute value of the $V_{COM}$ shift is at the minimum, as an optimum value. In order to obtain the optimum counter electrode potential in such a method, it is necessary to find the converged value of the $V_{COM}$ shift at each counter electrode potential. In order to obtain a converged value for one condition, it is necessary to drive the liquid crystal device for about 10 minutes to several hours. Therefore, normally effort and time are necessary for the measurement. On the basis of the finding, as will be described later, it is possible to reduce the number of times the converged value of the $V_{COM}$ shift is obtained. As a result, it is possible to reduce effort and time necessary to obtain the optimum value of the counter electrode potential.

Figure 7:
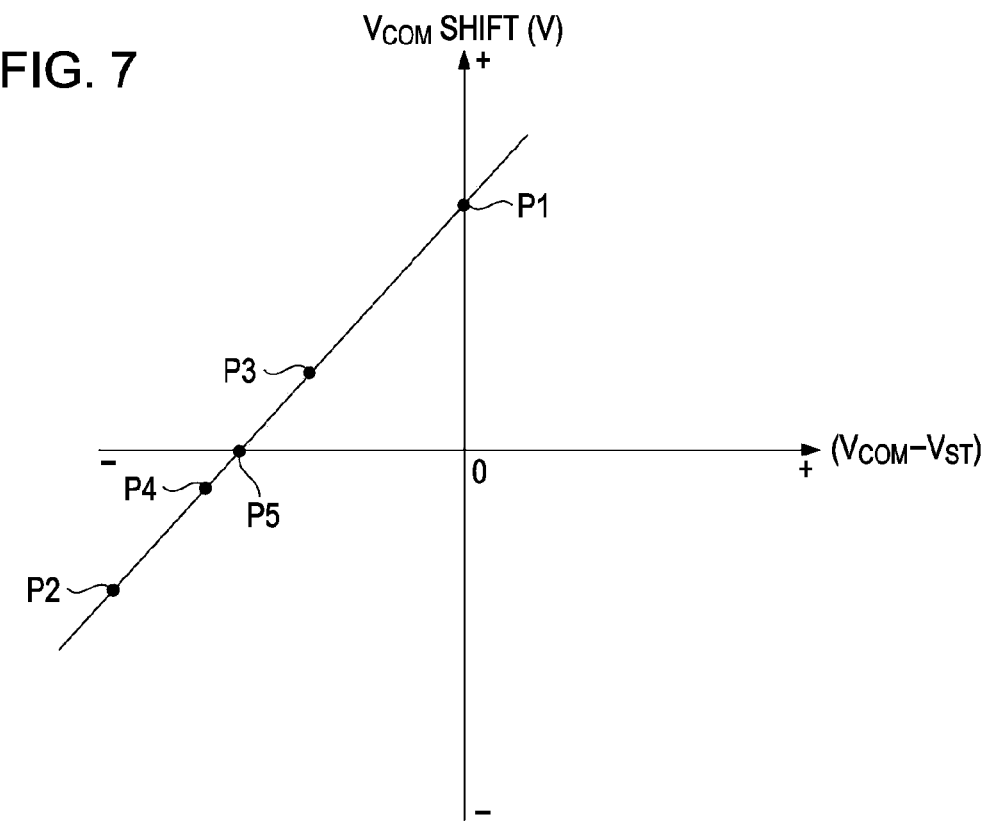
FIG. 7 is an explanatory diagram illustrating a method of determining the counter electrode potential in the first embodiment.

FIG. 7 is an explanatory diagram illustrating an exemplary method of determining the counter electrode potential.

In FIG. 7, the horizontal axis represents the difference ($V_{COM} - V_{ST}$) between the counter electrode potential and the reference potential, and the vertical axis represents the converged value of the $V_{COM}$ shift after passage of the predetermined drive time. In FIG. 7, the reference sign P1 represents a first measurement point, the reference sign P2 represents a second measurement point, the reference sign P3 represents a third measurement point, the reference sign P4 represents a fourth measurement point, and the reference sign P5 represents a fifth measurement point. Here, a description is given of an example in which five measurements are performed, but there is no limit in the number of measurements.

As shown in FIG. 7, the first measurement point P1 is set in the area in which ($V_{COM}-V_{ST}$) is 0 or less. From the above-mentioned finding, it can be inferred that, in the configuration where the thickness of the first dielectric layer 270 is more than that of the second dielectric layer 284, the $V_{COM}$ shift becomes the minimum in the area where $V_{COM}$ is lower than $V_{ST}$. Therefore, it is possible to omit the search for the area where ($V_{COM}-V_{ST}$) is positive.

Generally, when ($V_{COM}-V_{ST}$) increases, the $V_{COM}$ shift also increases. Therefore, when the first measurement result is negative, it can be inferred that the $V_{COM}$ shift is at the minimum in the area in which ($V_{COM}-V_{ST}$) is larger than that at the measurement point P1. Thus, it is possible to omit the search for the range in which ($V_{COM}-V_{ST}$) is smaller than that at the measurement point P1. Here, it is preferable to set the second measurement point P2 in the area in which ($V_{COM}-V_{ST}$) is larger than that at the measurement point P1 and ($V_{COM}-V_{ST}$) is negative.

Further, when the first measurement result is positive, it is preferable to set the second measurement point P2 in the area in which ($V_{COM}-V_{ST}$) is smaller than that at the measurement point P1. As described above, from the above-mentioned finding, it is possible to determine the positive and negative directions of changing the parameter ($V_{COM}-V_{ST}$) on the basis of the first measurement result. Accordingly, since it is possible to reduce the number of measurements, it is possible to reduce effort and time necessary for the measurement.

In the present example, the measurement result at the measurement point P1 is positive, the measurement point P2 is set in the area in which ($V_{COM}-V_{ST}$) is small enough to expect that the $V_{COM}$ shift becomes negative. Subsequently, by using the measurement results of the measurement point P1 and the measurement point P2, the slope of the $V_{COM}$ shift with respect to ($V_{COM}-V_{ST}$) is obtained. By using the slope, it is possible to estimate the value of ($V_{COM}-V_{ST}$) at which the $V_{COM}$ shift is equal to approximately 0. On the basis of the estimation result, the measurement point P3 is set between the measurement points P1 and P2.

Hereinbelow, likewise, on the basis of the measurement results obtained until the previous time, by narrowing the search range while estimating the value of ($V_{COM}-V_{ST}$) at which the $V_{COM}$ shift is equal to approximately 0, it is possible to obtain the value of ($V_{COM}-V_{ST}$) at which the $V_{COM}$ shift is equal to approximately 0. The reference potential $V_{ST}$ can be obtained for example by measuring the amount of effective voltage lowered by the field-through, thereby finding the optimum value of the counter electrode potential $V_{COM}$ at which the $V_{COM}$ shift is equal to approximately 0.

Furthermore, the optimum value of the counter electrode potential $V_{COM}$ may be estimated from the measurement values of the $V_{COM}$ shift. Here, it is assumed that the counter electrode potential $V_{COM}$ is set to make the difference ($V_{ST}-V_{COM}$) between the reference potential $V_{ST}$ and the counter electrode potential $V_{COM}$ equal to x % of the peak-to-peak amplitude ($V_H-V_L$) of driving voltages $V_D$. When a voltage is applied to the liquid crystal layer 228, the amount of electric charges, which move within the liquid crystal layer 228 dur-ing the unit time, correspond to current flowing in the liquid crystal layer 228. Therefore, when the electric potential of the pixel electrode 235 is positive, the amount of electric charges $q_+$ which move from the counter substrate 221 side to the element substrate 220 side is represented by the following Expression (5). Further, when the electric potential of the pixel electrode 235 is negative, the amount of electric charges $q_-$ which move from the element substrate 220 side to the counter substrate 221 side, is represented by the following Expression (6). In Expressions (5) and (6), R represents the resistance value of the liquid crystal layer 228.

$$q_+ = \int_0^T (1+x) \cdot i \, dt = \frac{1+x}{R} \int_0^T V_{EF} \, dt \quad \text{Expression (5)}$$

$$q_- = \int_0^T (1-x) \cdot i \, dt = \frac{1-x}{R} \int_0^T V_{EF} \, dt \quad \text{Expression (6)}$$

When the amount of electric charges $q_+$ is equal to the amount of electric charges $q_-$, theoretically the bias of electric charges is eliminated. When the condition in which the amount of electric charges $q_+$ is equal to the amount of electric charges $q_-$ is used in Expressions (5) and (6), it is possible to obtain the relational expression represented as the following Expression (7). In Expression (7), $\delta V$ is a value ($\delta V_1$ in FIG. 6) obtained by subtracting the converged value of the $V_{COM}$ shift in the configuration, in which the first and second dielectric layers have the same thickness, from the converged value of the $V_{COM}$ shift in the configuration in which the thickness of the first dielectric layer 270 is more than the thickness of the second dielectric layer 284. In Expression (7), E is a peak amplitude of the driving voltage $V_D$ shown in FIG. 5, and is represented as ($V_H-V_L$)/2.

$$x = \delta V/2E \quad \text{Expression (7)}$$

In Experimental Example 1 shown in FIG. 6, $\delta V_1$ is 0.5V, E is 5V, and thus x is 0.05. Accordingly, ($V_{ST}-V_{COM}$) is x·($V_H-V_L$), and is thus equal to 0.5V. Specifically, it would appear that, in order to cancel the bias of electric charges caused by the thickness difference between the first dielectric layer 270 and the second dielectric layer 284, it is preferable that the counter electrode potential $V_{COM}$ should be set to be lower by 0.5V than the reference potential $V_{ST}$. It has been known that the allowable range of the $V_{COM}$ shift for suppressing occurrence of flicker and image persistence is ±0.15V on an experimental basis. Thus, it is preferable that ($V_{ST}-V_{COM}$) should be set in the range of 0.35V or more to 0.65V or less. That is, when the thickness of the first dielectric layer 270 is 300 nm and the thickness of the second dielectric layer 284 is 75 nm, a ratio ($V_L-V_{COM}$)/($V_H-V_{COM}$) of the negative voltage to the positive voltage is set in a range of 43.5/56.5 or more and 46.5/53.5 or less, and then it is possible to practically suppress occurrence of flicker and image persistence.

In the liquid crystal device 201 configured as described above, the counter electrode potential $V_{COM}$ is lower than the reference potential $V_{ST}$. Hence, it is possible to reduce both of the bias of electric charges caused by the field-through and the bias of electric charges caused by the thickness difference between the first dielectric layer 270 and the second dielectric layer 284. Accordingly, the modulation effect of the liquid crystal layer 228 is prevented from being changed by the bias of electric charges during the duration in which the positive and negative potentials are applied, and thus it is possible to suppress occurrence of flicker of an image. Further, the modulation effect of the liquid crystal layer 228 is fixed by the bias of electric charges, and thus it is possible to avoid occurrence of displaying of fixed patterns (image persistence).

Further, according to the method of driving the liquid crystal device of the embodiment of the invention, due to the above-mentioned reason, the counter electrode potential $V_{COM}$ is lower than the reference potential $V_{ST}$. Hence, it is possible to reduce both of the bias of electric charges caused by the field-through and the bias of electric charges caused by the thickness difference between the first dielectric layer 70 and the second dielectric layer 84.

Second Embodiment

Figure 8:
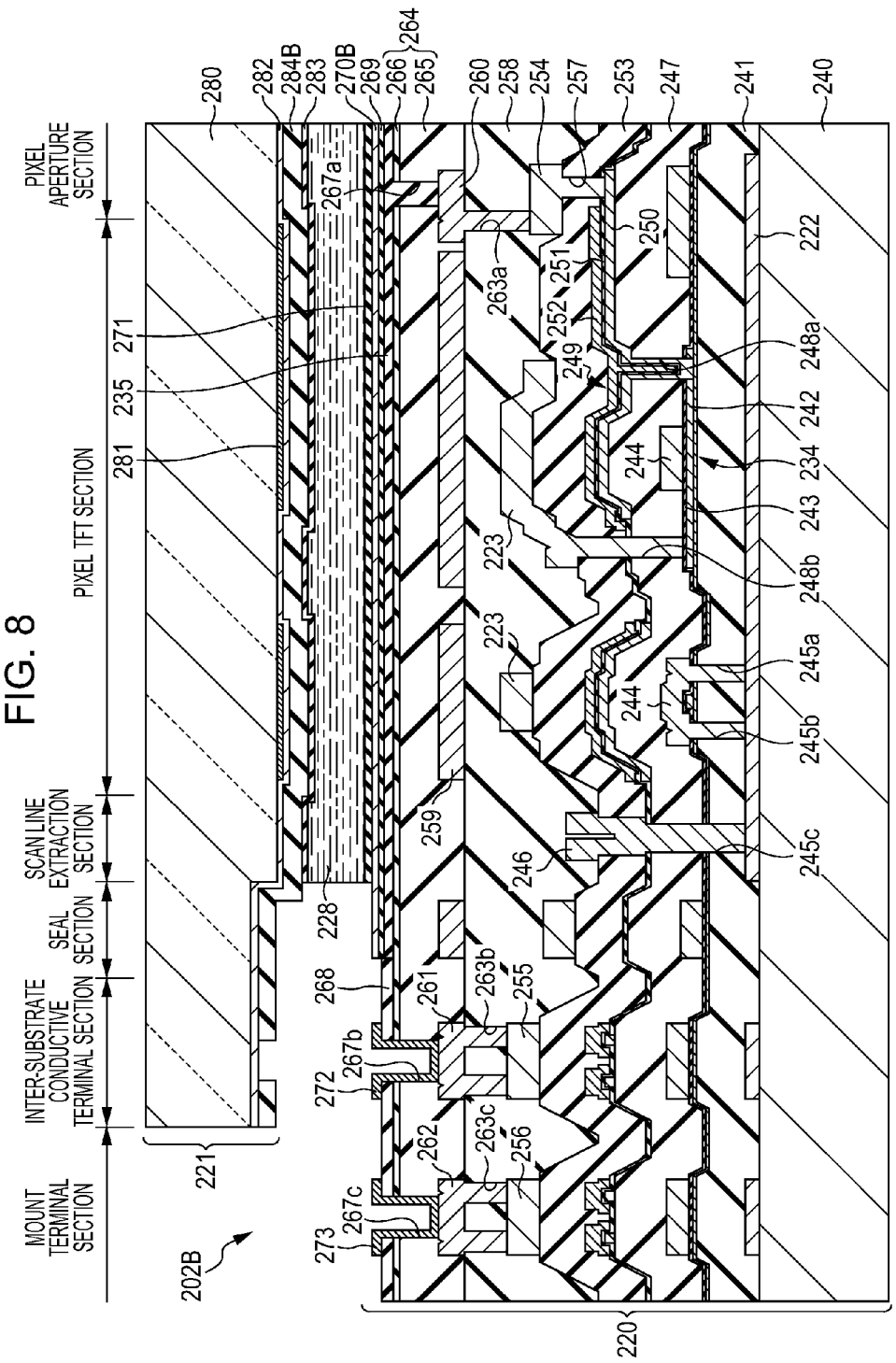
FIG. 8 is a diagram schematically illustrating a sectional structure of the liquid crystal panel of a second embodiment in an enlarged manner.
Figure 9:
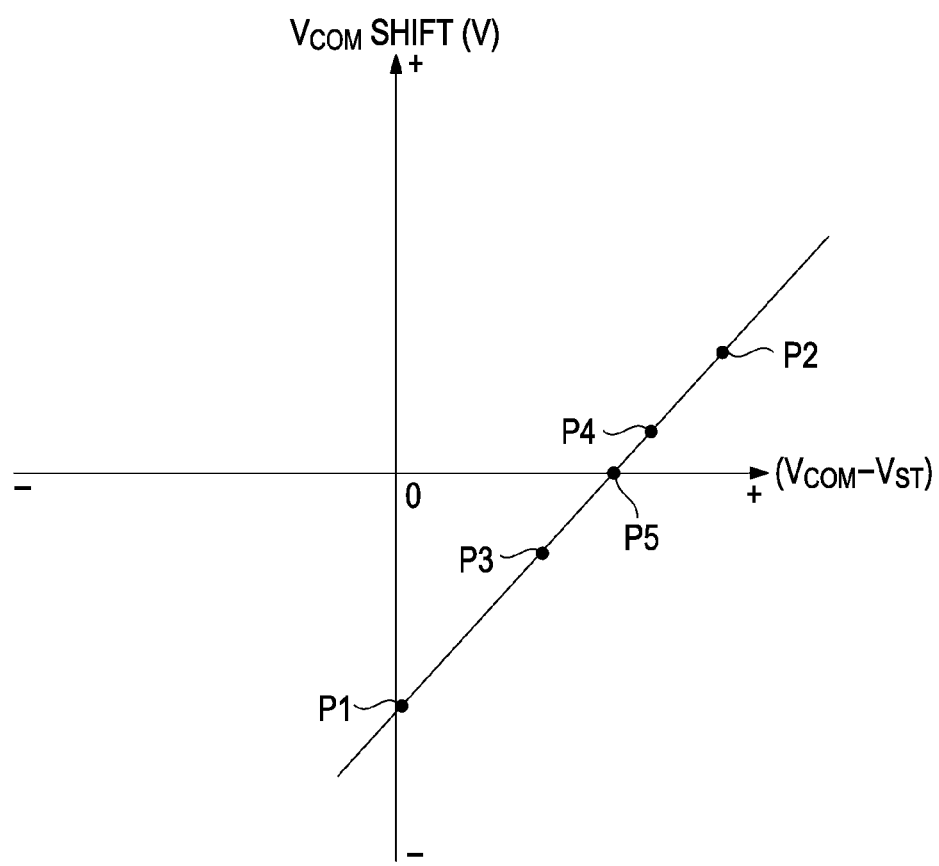
FIG. 9 is an explanatory diagram illustrating a method of determining the counter electrode potential in the second embodiment.

Next, referring to FIGS. 8 and 9, a second liquid crystal device according to a second embodiment of the invention will be described. FIG. 8 is a diagram schematically illustrating a sectional structure of the liquid crystal panel of the second embodiment in an enlarged manner. FIG. 9 is an explanatory diagram illustrating a method of determining the counter electrode potential in the second embodiment.

The liquid crystal panel 202B shown in FIG. 8 has the same configuration as the liquid crystal panel 202 of the first embodiment except that the thickness of the first dielectric layer 270B is less than the that of the second dielectric layer 284B. The thickness of the first dielectric layer 270B is, for example, 60 nm or more and 90 nm or less, and the thickness of the second dielectric layer 284B is, for example, 240 nm or more and 360 nm or less. In the embodiment, both of the first dielectric layer 270B and the second dielectric layer 284B are formed of P-TEOS films. In addition, the thickness of the first dielectric layer 270B is 75 nm, and the thickness of the second dielectric layer 284B is 300 nm.

As shown in FIG. 6, in the liquid crystal device of the second embodiment, the first dielectric layer 270B is thinner than the second dielectric layer 284B, and thus it would appear that the $V_{COM}$ shift is changed in the negative direction. In the second liquid crystal device, the optimum reference potential $V_{STB}$ after the convergence becomes lower than the initial reference potential $V_{STA}$. Therefore, by setting the counter electrode potential $V_{COM}$ such that it is lower than the initial reference potential $V_{STA}$, the value of the $V_{COM}$ shift becomes approximate to the value (approximately 0) which is obtained when the first dielectric layer and the second dielectric layer have the same thickness. This means that it is possible to reduce the effect of the thickness difference between the first dielectric layer 270B and the second dielectric layer 284B on the bias of electric charges of the liquid crystal layer 228.

In the second embodiment, when the counter electrode potential is intended to be determined, as shown in FIG. 9, the first measurement point P1 is set in the area in which ($V_{COM}-V_{ST}$) is 0 or more. In the configuration where the thickness of the first dielectric layer 270B is less than that of the second dielectric layer 284B, the $V_{COM}$ shift becomes the minimum in the area where $V_{COM}$ is higher than $V_{ST}$. Therefore, it is possible to omit the search for the area where ($V_{COM}-V_{ST}$) is negative.

Generally, when ($V_{COM}-V_{ST}$) increases, the $V_{COM}$ shift also increases. Therefore, when the first measurement result is negative, it can be inferred that the $V_{COM}$ shift is at the minimum in the area in which ($V_{COM}-V_{ST}$) is larger than that at the measurement point P1. Thus, it is possible to omit the search for the range in which ($V_{COM}-V_{ST}$) is smaller than that at the measurement point P1.

Further, when the first measurement result is positive, it is preferable to set the second measurement point P2 in the area in which ($V_{COM}-V_{ST}$) is smaller than that at the measurement point P1 and ($V_{COM}-V_{ST}$) is positive. As described above, from the above-mentioned finding, it is possible to determine the positive and negative directions of changing the parameter ($V_{COM}-V_{ST}$) on the basis of the first measurement result. Accordingly, since it is possible to reduce the number of measurements, it is possible to reduce effort and time necessary for the measurement.

In the present example, the measurement result at the measurement point P1 is negative, the measurement point P2 is set in the area (the area in which it is expect that the $V_{COM}$ shift becomes positive) in which ($V_{COM}-V_{ST}$) is sufficiently large. Subsequently, by using the measurement results of the measurement point P1 and the measurement point P2, the slope of the $V_{COM}$ shift with respect to ($V_{COM}-V_{ST}$) is obtained. By using the slope, it is possible to estimate the value of ($V_{COM}-V_{ST}$) at which the $V_{COM}$ shift is equal to approximately 0. On the basis of the estimation result, the measurement point P3 is set between the measurement points P1 and P2.

Hereinbelow, likewise, on the basis of the measurement results obtained until the previous time, by narrowing the search range while estimating the value of ($V_{COM}-V_{ST}$) at which the $V_{COM}$ shift is equal to approximately 0, it is possible to obtain the value of ($V_{COM}-V_{ST}$) at which the $V_{COM}$ shift is equal to approximately 0. The reference potential $V_{ST}$ can be obtained for example by measuring the amount of effective voltage lowered by the field-through, thereby finding the optimum value of the counter electrode potential $V_{COM}$ at which the $V_{COM}$ shift is equal to approximately 0.

Further, similarly to the description of the first embodiment, the optimum value of the counter electrode potential $V_{ox}$, may be estimated from the measurement values of the $V_{COM}$ shift. In Experimental Example 2 shown in FIG. 6, $\delta V_2$ is −0.5V, E is 5V, and thus x is −0.05. Accordingly, ($V_{ST}-V_{COM}$) is equal to −0.5V. Specifically, it would appear that, in order to cancel the bias of electric charges caused by the thickness difference between the first dielectric layer 270B and the second dielectric layer 284B, it is preferable that the counter electrode potential $V_{COM}$ should be set to be higher by 0.5V than the reference potential $V_{ST}$. Considering the allowable range of the $V_{COM}$ shift for suppressing occurrence of flicker and image persistence, it is preferable that ($V_{ST}-V_{COM}$) should be set in the range of −0.65V or more and −0.35V or less. That is, when the thickness of the first dielectric layer 270B is 75 nm and the thickness of the second dielectric layer 284B is 300 nm, a ratio ($V_L-V_{COM}$)/($V_H-V_{COM}$) of the negative voltage to the positive voltage is set in a range of 53.5/46.5 or more and 56.5/43.5 or less, and then it is possible to practically suppress occurrence of flicker and image persistence.

Third Embodiment

Figure 10:
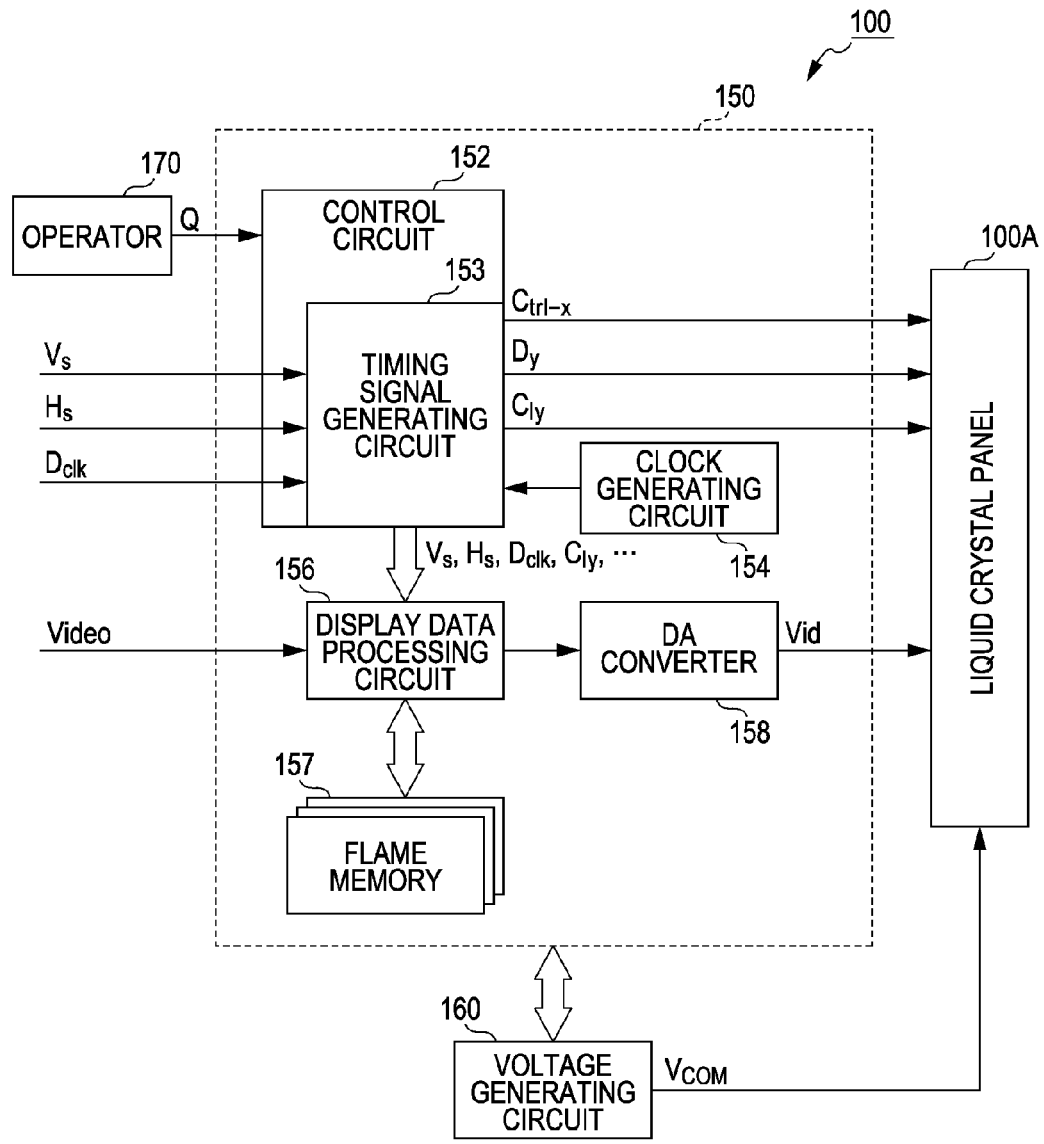
FIG. 10 is a block diagram illustrating a schematic configuration of a liquid crystal device according to a third embodiment of the invention.

FIG. 10 is a block diagram illustrating a schematic configuration of a liquid crystal device 100 according to a third embodiment of the invention. The liquid crystal device 100 is formed of a liquid crystal panel 100A, a processing circuit 150, a voltage generating circuit 160, and an operator 170. The liquid crystal panel 100A, the processing circuit 150, and the voltage generating circuit 160 are the same as those of the first embodiment.

The operator 170 is operated by, for example, a user or the like, and the designated value Q corresponding to the operation is output, for example, in the range of "0" to "+10". Specifically, when the operator 170 is mounted in the electronic apparatus, the operator is provided to be operable through an operation section such as an operation panel thereof or a remote control thereof. Furthermore, on the basis of the designated value Q, the timing of outputting the second start pulse $D_{yb}$ is shifted back and forth as will be described later.

Figure 11:
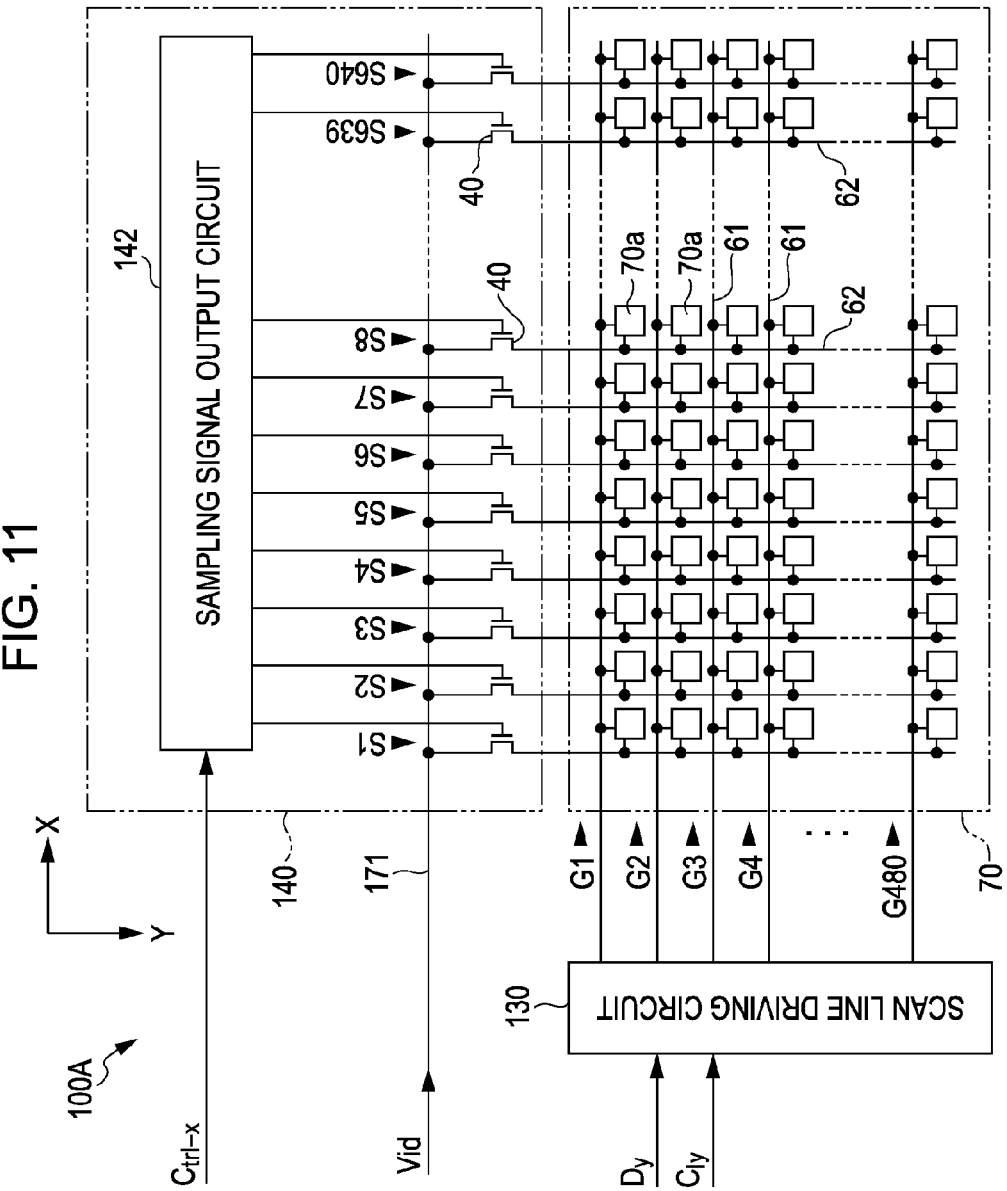
FIG. 11 is a diagram illustrating a schematic configuration of a liquid crystal panel according to the third embodiment.
Figure 12:
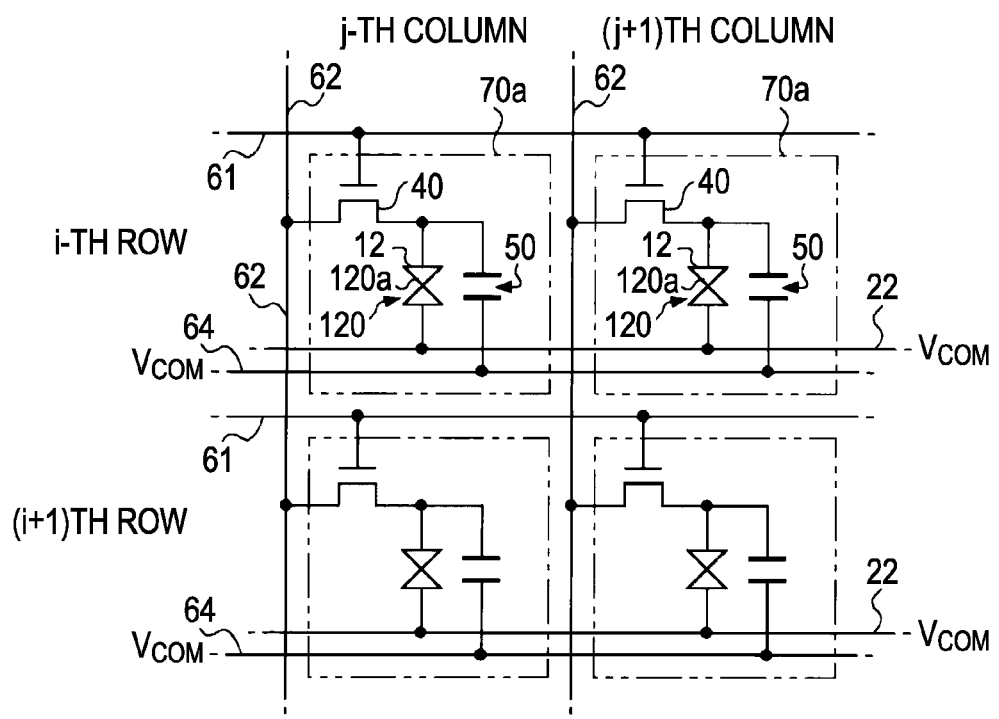
FIG. 12 is an equivalent circuit diagram of pixels.

FIG. 11 is a diagram illustrating a schematic configuration of the liquid crystal panel 100A according to the third embodiment. FIG. 12 is an equivalent circuit diagram of pixels.

As shown in FIG. 11, the liquid crystal panel 100A is configured to have a scan line driving circuit 130 and a data line driving circuit 140 built around the display area 70. In the display area 70, the scan lines 61 of 480 rows are provided to extend in the row (X) direction. Further, in the display area 70, the data lines 62 of 640 columns are provided to extend in the column (Y) direction. The respective data lines 62 and the respective scan lines 61 are disposed to be electrically insulated from each other. Further, a plurality of pixels 70a is formed to correspond to the intersection positions between the scan lines 61 of 480 rows and the data lines 62 of 640 columns. Specifically, the plurality of pixels 70a is arranged in a matrix with vertical 480 rows×horizontal 640 columns.

Furthermore, in the embodiment, in practice, the plurality of pixels 70a is arranged in matrix with vertical 1080 rows× horizontal 1920 columns, and has a FHD (full HD) resolution, but for convenience of description, the resolution is set as VGA (Video Graphics Array). Further, the resolution is not limited to this, and may be set as, for example, XGA (eXtended Graphics Array), SXGA (Super-XGA), or the like.

FIG. 12 shows a configuration of 2×2 pixels, that is, a total of 4 pixels corresponding to the intersection between i-th row and (i+1)th row, which is adjacent to the i-th row at a distance of one row on the lower side, and j-th column and (j+1)th column which is adjacent to the j-th column at a distance of one column on the right side. Furthermore, i and (i+1) represent rows in which the pixels are arranged, and here, those are integers of 1 or more and 480 or less. Furthermore, j and (j+1) represent columns in which the pixels are arranged, and here, those are integers of 1 or more and 640 or less. In the vicinity of each intersection point between the scan lines 61 and the data lines 62, a switching element 40 corresponding one-to-one with each pixel 70a is provided. The switching element is constituted by a thin film transistor (hereinafter referred to as TFT). Specifically, each of the plurality of pixels 70a includes an n-channel-type TFT 40 and a liquid crystal capacitance 120.

Here, the respective pixels 70a have the same configuration, and thus the pixel, which is positioned of the i-th row and the j-th column, is described as a representative example. A gate electrode 41 of the TFT 40 in the pixel of the i-th row and the j-th column is connected to the scan line 61 of the i-th row. On the other hand, the source electrode of the TFT 40 is connected to the data line 62 of the j-th column, and the drain electrode thereof is connected to a pixel electrode 12 which is one end of the liquid crystal capacitance 120. Further, the other end of the liquid crystal capacitance 120 is connected to a counter electrode 22. The counter electrode 22 is common throughout all the pixels, and the counter electrode potential $V_{COM}$, which is constant in time, is applied thereto. Furthermore, although will be described later in detail, the counter electrode potential $V_{COM}$ is set to a value which is shifted from a reference value by a correction voltage for compensating for the DC voltage component in the above-mentioned first phenomenon.

The liquid crystal panel 100A is configured such that a pair of substrates of an element substrate 10 and a counter substrate 20 is bonded to each other with a regular gap maintained and liquid crystal is sealed in the gap. On the element substrate 10, the scan lines 61, the data lines 62, the TFTs 40, and the pixel electrodes 12 are formed together with the scan line driving circuit 130 and the data line driving circuit 140. On the other hand, the counter electrode 22 is formed on the counter substrate 20. In addition, the electrode formation surfaces thereof are bonded with the regular gap maintained so as to be opposed to each other. Hence, the liquid crystal capacitance 120 is formed by the configuration in which the pixel electrodes 12 and the counter electrode 22 sandwiches the liquid crystal 120a.

Furthermore, in the embodiment, when the effective value of voltage retained in the liquid crystal capacitance 120 is approximate to zero, the transmittance of light, which passes through the liquid crystal capacitance 120, is at the minimum, thereby performing black display. On the other hand, as the effective value of voltage retained in the liquid crystal capacitance 120 increases, the amount of light which passes therethrough increases, thereby finally performing maximum white display in terms of transmittance. That is, it is assumed that the liquid crystal panel 100A is set in the normally-black mode.

In this configuration, the TFT 40 may be turned on (electrically conducted) by applying a selection voltage to the scan line 61, and the data signal Vid of the voltage corresponding to the gray scale (luminance) may be supplied to the pixel electrode 12 through the data line 62 and the TFT 40 turned on. In this case, it is possible to retain the effective value of the voltage corresponding to the gray scale in the liquid crystal capacitance 120 corresponding to the intersection position between the scan line 61, to which the selection voltage is applied, and the data line 62 to which the data signal Vid is supplied.

Furthermore, when a non-selection voltage is applied to the scan line 61, the TFT 40 is turned off (not conducted), the off resistance at this time is not ideally infinite. Hence, a large amount of electric charges, which are accumulated in the liquid crystal capacitance 120, leak out. In order to reduce this off leak, a storage capacitance 50 is formed for each pixel. One end of each storage capacitance 50 is connected to the pixel electrode 12 (the drain of the TFT 40). On the other hand, the other end of each storage capacitance 50 is commonly connected to a capacitance line 64 throughout all the pixels. The capacitance line 64 is maintained at the temporally constant electric potential, for example, the counter electrode potential which is the same as that of the counter electrode 22.

The scan line driving circuit 130 supplies scan signals G1, G2, G3, . . . , and G480 to the scan lines 61 of 1, 2, 3, . . . , and 480 rows. The scan line driving circuit 130 sets the scan signals for the selected scan lines 61 to a H level corresponding to a voltage, and sets the scan signals for the other scan lines 61 to a L level corresponding to the non-selection voltage (the grounding potential).

The data line driving circuit 140 is constituted of a sampling signal output circuit 142 and the n-channel-type TFTs 40 provided to respectively correspond to the data lines 62. The data line driving circuit 140 supplies each pixel 70a in the selected scan line 61 with the data signal Vid (the driving voltage) which defines the gray scale of the pixel.

Figure 13:
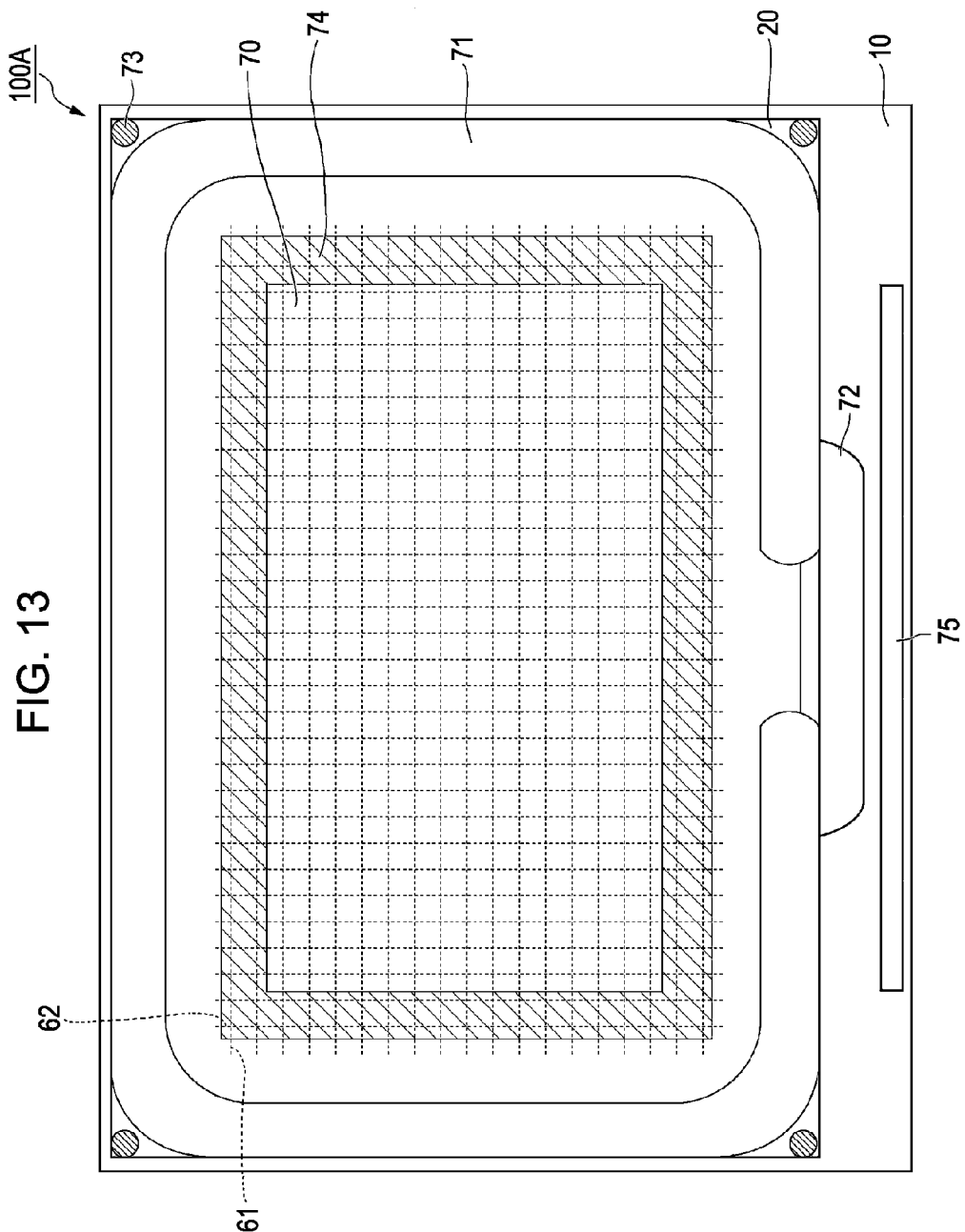
FIG. 13 is a plan view of the liquid crystal panel, in which an element substrate and respective components formed thereon are viewed from a counter substrate side, according to the third embodiment.
Figure 14:
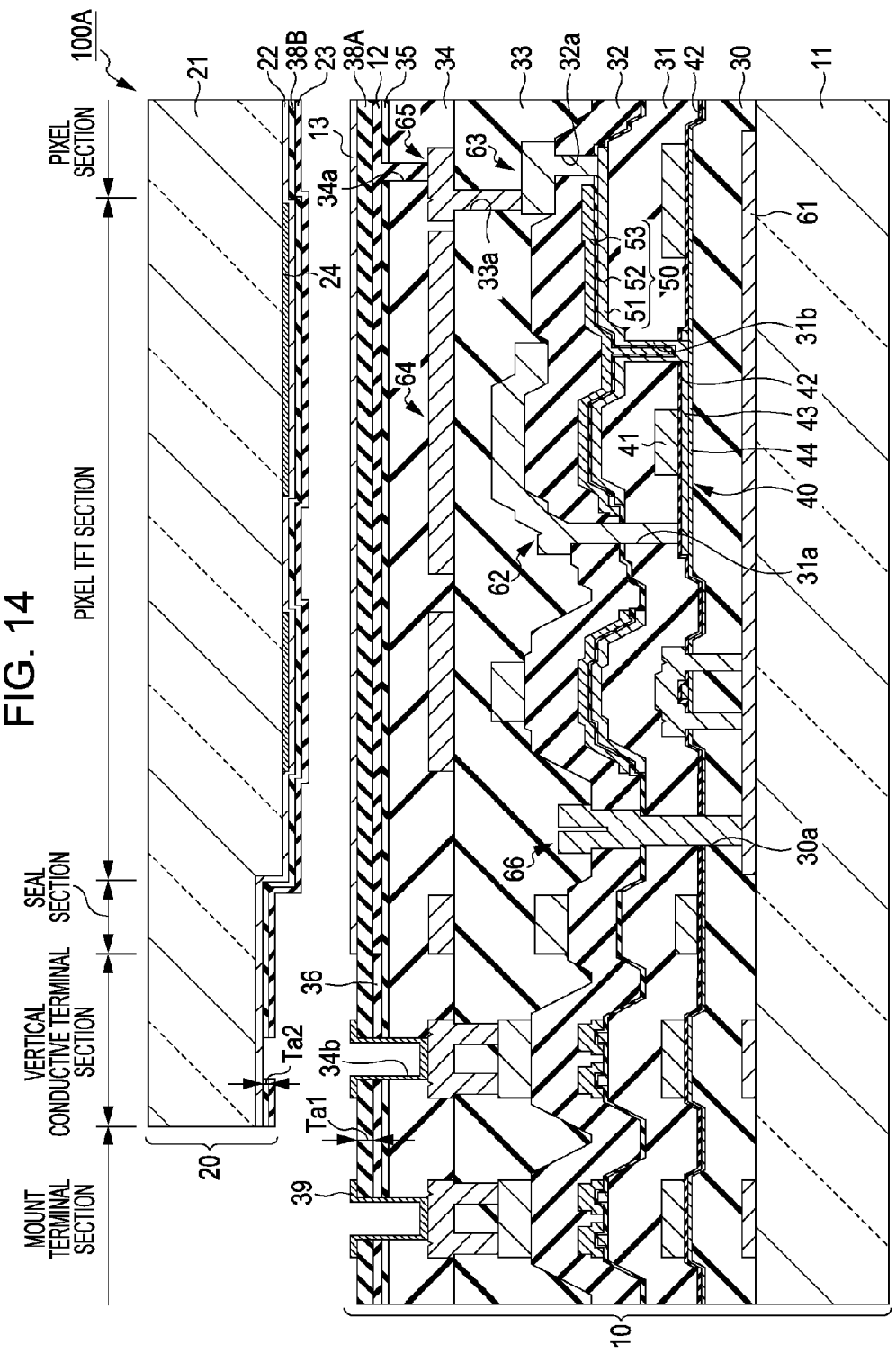
FIG. 14 is a sectional view illustrating a schematic configuration of the liquid crystal panel according the third embodiment.

FIG. 13 is a plan view of the liquid crystal panel 100A, in which an element substrate 10 and respective components formed thereon are viewed from a counter substrate 20 side, according to the third embodiment. FIG. 14 is a sectional view illustrating a schematic configuration of the liquid crystal panel 100A according to the third embodiment. Further, in FIG. 13, for convenience of description, various driving circuits such as the scan line driving circuit 130 and the data line driving circuit 140 are omitted. Furthermore, in FIG. 14, for convenience of description, the liquid crystal layer and the seal material 71 are omitted. In addition, in FIG. 14, the reference sign Ta1 represents a film thickness of a first alignment base film (the first dielectric film) 38A, and the reference sign Ta2 represents a film thickness of a second alignment base film (the second dielectric film) 38B.

As shown in FIG. 13, the display area 70 is formed on the central portion of the element substrate 10. A frame-shaped light blocking area 74 is provided on the peripheral portion of the display area 70, and a seal material 71 is arranged to surround the light blocking area 74. The element substrate 10 and the counter substrate 20 are bonded to each other through such a seal material 71, and the liquid crystal layer (not shown in the drawing) is sealed in an area surrounded by both substrates and the seal material 71. Then, the liquid crystal filling opening provided in the seal material 71 is sealed by the sealing portion 72.

Although not shown in the drawing, the scan line driving circuit 130, which supplies the scan signals to the scan lines 61, and the data line driving circuit 140, which supplies image signals to the data lines 62, are mounted outside the seal material 71. A plurality of connection terminals 75, which is connected to the external circuit, is provided on the end portion of the element substrate 10. Although not shown in the drawing, a wiring which extends from the driving circuit is formed on the connection terminal 75. Inter-substrate conductive sections 73, which electrically connect the counter substrate 20 to the element substrate 10, are provided at the four corners of the seal material 71. Each inter-substrate conductive section 73 is also electrically connected to the connection terminal 75 through a wiring.

As shown in FIG. 14, the liquid crystal panel 100A includes the element substrate 10, the counter substrate 20 which is disposed to be opposed thereto, and a liquid crystal layer which is sandwiched therebetween.

The element substrate 10 includes a substrate main body 11 which is made of a transparent material such as glass or quartz, the TFTs 40 and the pixel electrodes 12 which are formed inside the substrate main body 11 (on the liquid crystal layer side), and the first alignment base film 38A and a first alignment film 13 which cover the pixel electrode 12.

The counter substrate 20 includes a substrate main body 21 which is made of a transparent material such as glass or quartz, a light blocking film 24 which are formed inside the substrate main body 21 (on the liquid crystal layer side), a counter electrode 22 which hovers the light blocking film 24, and the second alignment base film 38B and a second alignment film 23 which covers the counter electrode 22.

The pixel electrodes 12 are provided on the element substrate 10, and the first alignment film 13 is provided thereon. Each pixel electrode 12 is made of, for example, a conductive film such as aluminum (Al).

The counter electrode 22 is provided over the entire surface of the counter substrate 20, and the second alignment film 23 is provided thereon. The counter electrode 22 is made of, for example, a transparent conductive film such as an ITO film. The thickness of the counter electrode 22 is, for example, 120 nm or more and 160 nm or less. Further, the film thickness of the second alignment film 23 is, for example, 40 nm or more and 80 nm or less.

As described above, the liquid crystal is sealed in the above-mentioned space surrounded by the seal material 71 between the element substrate 10 and the counter substrate 20 disposed to be opposed to each other, thereby forming the liquid crystal layer. The liquid crystal layer is in a predetermined alignment state by the alignment films without an electric filed applied from the pixel electrode 12. Further-more, the liquid crystal of the liquid crystal layer may be a twisted nematic liquid crystal or a liquid crystal for homeotropic alignment.

The element substrate 10 has a laminated structure which is formed thereon and has various components including the pixel electrode 12 and the first alignment film 13. The laminated structure is formed of, in ascending order: a first layer that includes the scan lines 61; a second layer that includes the TFTs 40 including the gate electrodes 41 and the like; a third layer that includes the storage capacitances 50; a fourth layer that includes the data lines 62; a fifth layer that includes the capacitance lines 64 and the like; a sixth layer (the top layer) that includes the pixel electrodes 12 and the alignment film (the first alignment film 13) and the like.

A base insulation film 30 is provided between the first layer and the second layer. A first interlayer insulation film 31 is provided between the second layer and the third layer. A second interlayer insulation film 32 is provided between the third layer and the fourth layer. A third interlayer insulation film 33 is provided between the fourth layer and the fifth layer. A fourth interlayer insulation film 34 and a fifth interlayer insulation film 35 are provided between the fifth layer and the sixth layer. By using such insulation films, the above-mentioned respective components are prevented from being shorted. Further, the various insulation films is provided with, for example, contact holes which are electrically connected to the data lines 62 and high-density source areas in the semiconductor layer 44 of the TFTs 40. Hereinafter, such components will be described in ascending order.

In the first layer, the scan lines 61 made of, for example, tungsten silicide (WSi) are provided. The film thickness (the thickness in the Z direction which is the thickness direction of the liquid crystal panel 100A) of each scan line 61 is, for example, 180 nm or more and 220 nm or less. The scan line 61 has a light blocking effect, and is thus formed to bury the area in which no pixel electrode 12 is formed. Hence, the scan line 61 has a function of blocking light which is likely to be incident to the TFT 40 from the lower side thereof.

In the second layer, the TFTs 40 including the gate electrodes 41 are provided. The TFT 40 has an LDD (Lightly Doped Drain) structure. The TFT 40 includes the following components: the above-mentioned gate electrode 41; a channel area of the semiconductor layer 44 which is made of for example a conductive polysilicon film and in which a channel is formed by the electric field applied from the gate electrode 41; a gate insulation film 42 which includes a thermally oxidized gate insulation film 43 insulating the gate electrode 41 and the semiconductor layer 44; a low-density source area and a low-density drain area and a high-density source area and a high-density drain area in the semiconductor layer 44. Furthermore, the film thickness of the gate electrode 41 is, for example, 15 nm or more and 105 nm or less. The film thickness of semiconductor layer 44 is, for example, about 40 nm. The film thickness of the thermally oxidized gate insulation film 43 is, for example, 28 nm or more and 35 nm or less. The film thickness of the gate insulation film 42 is, for example, 43 nm or more and 56 nm or less.

The base insulation film 30 made of, for example, tetraethoxysilane (TEOS) is provided on the scan lines 61 and below the TFT 40. The film thickness of the base insulation film 30 is, for example, 380 nm or more and 420 nm or less. The base insulation film 30 has a function of insulating the TFTs 40 from the scan lines 61 between the layers. Further, the base insulation film 30 is formed on the entire surface of the element substrate 10.

In the third layer, the storage capacitances 50 are provided. Each storage capacitance 50 is formed such that a lower capacitive electrode 51 and an upper capacitive electrode 53 is disposed to be opposed to each other with a capacitance insulation film 52 interposed therebetween. Here, the lower capacitive electrode 51 is a pixel-potential-side capacitive electrode which is connected to the pixel electrode 12 and the high-density drain area of the TFT 40, and the upper capacitive electrode 53 is a fixed-potential-side capacitive electrode. By using the storage capacitance 50, it is possible to remarkably increase a potential retention characteristic in the pixel electrode 12.

The lower capacitive electrode 51 is made of, for example, a conductive polysilicon film, and functions as the pixel-potential-side capacitive electrode. The film thickness of the lower capacitive electrode 51 is, for example, 95 nm or more and 105 nm or less. Further, the lower capacitive electrode 51 has not only a function of the pixel-potential-side capacitive electrode, but also a function of interconnecting the pixel electrode 12 and the high-density drain area of the TFT 40.

The upper capacitive electrode 53 has three-layer structure including: for example, a layer (for example, the film thickness thereof is 47 nm or more and 53 nm or less) made of titan nitride (TiN); a layer (for example, the film thickness thereof is 142 nm or more and 158 nm or less) made of aluminum (Al); and a layer (for example, the film thickness thereof is 97 nm or more and 103 nm or less) made of titan nitride (TiN). The upper capacitive electrode 53 functions as the fixed-potential-side capacitive electrode of the storage capacitance 50. In addition, the upper capacitive electrode 53 has the same shape as the lower capacitive electrode 51, and is formed as an electrode which has an island shape similarly to the lower capacitive electrode 51. In order to set the upper capacitive electrode 53 to a fixed potential, the upper capacitive electrode 53 is electrically connected to the capacitance line 64 which has the fixed potential. Further, the upper capacitive electrode 53 has a function of blocking light which is likely to be incident to the TFT 40 from the upper side thereof.

The capacitance insulation film 52 is made of, for example, an HTO (High Temperature Oxide) film. The film thickness of the capacitance insulation film 52 is, for example, 3 nm or more and 5 nm or less. Furthermore, it is preferable that the capacitance insulation film 52 should be thin enough to obtain film reliability in terms of increasing the storage capacitance 50. Further, the capacitance insulation film 52 may have a two-layer structure, a three-layer structure, or a laminated structure having layers more than that.

The first interlayer insulation film 31 made of, for example, tetraethoxysilane (TEOS) is formed on the TFT 40, the gate electrode 41, and the relay electrode, and below the storage capacitance 50. The film thickness of the first interlayer insulation film 31 is, for example, 280 nm or more and 320 nm or less.

In the first interlayer insulation film 31, contact holes 31a, each of which electrically connects the high-density source area of the TFT 40 to the data line 62 to be describe later, are formed by penetrating through the second interlayer insulation film 32 to be described later. Further, in the first interlayer insulation film 31, contact holes 31b, each of which electrically connects the high-density drain area of the TFT 40 to the lower capacitive electrode 51 constituting the storage capacitance 50, are formed.

In the fourth layer, the data lines 62 are provided. The data line 62 is formed as a film having a four-layer structure. The four-layer structure includes, for example in order from the lower layer: a layer (for example, the film thickness thereof is 19 nm or more and 21 nm or less) made of titan (Ti); a layer (for example, the film thickness thereof is 47 nm or more and 53 nm or less) made of titan nitride (TiN); a layer (for example, the film thickness thereof is 332 nm or more and 368 nm or less) made of aluminum (Al); and a layer (for example, the film thickness thereof is 142 nm or more and 158 nm or less) made of titan nitride (TiN).

Further, in the fourth layer, an interface layer (not shown in the drawing) for capacitance line, a first relay electrode 63, and a double contact portion 66 are formed as the same film as the data line 62. In plan view, those are not formed to have a planar shape continuous to the data line 62, but are patterned to be separated from one another. Since the interface layer for capacitance line, the first relay electrode 63, and the double contact portion 66 are formed as the same film as the data line 62, and those have a four-layer structure. The structure includes, in order from the lower layer: a layer made of Ti; a layer made of TiN; a layer made of Al; and a layer made of TiN. The double contact portion 66 is provided outside the display area 70, and is routed through a wiring which is not shown in the drawing. Then, the contact portion is extracted on the surface layer of the element substrate 10, and is connected to the scan line driving circuit 130.

The second interlayer insulation film 32 is formed on the storage capacitances 50 and below the data lines 62, and is formed as a silicate glass film such as NSG, PSG, BSG, and BPSG, a silicon nitride film, a silicon oxide film, or preferably a film (hereinafter referred to as P-TEOS) which is formed by the plasma CVD method using the TEOS gas. The film thickness of the second interlayer insulation film 32 is, for example, 380 nm or more and 420 nm or less. In the second interlayer insulation film 32, the contact holes 31a each of which electrically connects the high-density source area of the TFT 40 to the data line 62, and the contact holes (not shown in the drawing) each of which electrically connects the interface layer for capacitance line to the upper capacitive electrode 53 of the storage capacitance 50.

In the fifth layer, the capacitance lines 64 are formed. The capacitance line 64 has two-layer structure. The structure includes, for example in order from the lower layer: a layer (for example, the film thickness thereof is 315 nm or more and 385 nm or less) made of aluminum (Al); and a layer (for example, the film thickness thereof is 135 nm or more and 165 nm or less) made of titan nitride (TiN). The capacitance lines 64 are formed on the third interlayer insulation film 33. The surface of the third interlayer insulation film 33 is planarized by applying a planarization process such as the CMP (Chemical Mechanical Polishing) process.

Further, in fifth layer, second relay electrodes 65 are formed as the same film as the capacitance lines 64. Each second relay electrode 65 has a function of electrically interconnecting the first relay electrode 63 and the pixel electrode 12 through a contact hole 33a to be described later. Furthermore, the capacitance line 64 and the second relay electrode 65 are not continuously formed to have a planar shape, but are patterned to be separated from one another. The second relay electrode 65 has a two-layer structure. The structure includes, similarly to the capacitance line 64, a layer made of Al as the lower layer, and a layer made of TiN as the upper layer. As described, the capacitance line 64 and the second relay electrode 65 include aluminum which is relatively excellent in light reflection, and include titan nitride which is relatively excellent in light absorption. Thus, those are able to function as light blocking layers. Consequently, it is possible to block the propagation of light which is incident to the semiconductor layer 44 of TFT 40 from the upper side thereof.

The third interlayer insulation film 33 made of for example P-TEOS is formed on the data lines 62 and below the capacitance line 64 and the like. The film thickness of the third interlayer insulation film 33 is, for example, 570 nm or more and 630 nm or less. In the third interlayer insulation film 33, the contact holes (not shown in the drawing) each of which electrically connects the capacitance line 64 to the interface layer for capacitance line, and the contact holes 33a each of which electrically connects the second relay electrode 65 to the first relay electrode 63.

Finally, in the sixth layer, as described above, the pixel electrodes 12 are formed in a matrix. Each pixel electrode 12 is made of, for example, aluminum (Al), the film thickness thereof is, for example, 180 nm or more and 220 nm or less.

Further, a planarization film 36 made of for example P-TEOS is formed in the peripheral area as the same film as the above-mentioned pixel electrode 12. The film thickness of the planarization film 36 is, for example, 180 nm or more and 220 nm or less.

The first alignment base film 38A (the first dielectric film) is formed on the pixel electrodes 12 and the planarization film 36. The first alignment base film 38A has a film thickness less than that of the liquid crystal layer, and is a dielectric film which has a specific resistance higher than that of the liquid crystal layer and is made of silicon oxide ($SiO_2$). The film thickness Ta1 of the first alignment base film 38A is, for example, 240 nm or more and 360 nm or less (300 nm in the embodiment). Further, the first alignment film 13 is formed on the first alignment base film 38A. The film thickness of the first alignment film 13 is, for example, 40 nm or more and 80 nm or less.

An electrode pad 39 made of for example an ITO film is formed on the first alignment base film 38A in the peripheral area (for example, the mount terminal section and the vertical conductive terminal section) other than the element section. The film thickness of the electrode pad 39 is, for example, 135 nm or more and 165 nm or less. A part of the electrode pad 39 is embedded in the contact hole 34b which is provided to penetrate through the fourth interlayer insulation film 34, the fifth interlayer insulation film 35, the planarization film 36, and the first alignment base film 38A, and is electrically connected to the capacitance line 64.

In addition, below the pixel electrode 12 and the planarization film 36, the following films are formed, for example in order from the lower layer: the fourth interlayer insulation film 34 (for example, the film thickness thereof is 350 nm or more and 850 nm) made of P-TEOS; and the fifth interlayer insulation film 35 (for example, the film thickness thereof is 55 nm or more and 95 nm or less) made of silicate glass such as BSG or NSG. The contact holes 34a for electrically connecting the pixel electrode 12 and the second relay electrode 65 are formed through the fourth interlayer insulation film 34 and the fifth interlayer insulation film 35.

The pixel electrode 12 and the TFT 40 are electrically connected through the contact hole 34a, the second relay electrode 65, the contact hole 33a, the first relay electrode 63, the contact hole 32a, the lower capacitive electrode 51, and the contact hole 31b. Furthermore, the surface of the fifth interlayer insulation film 35 is planarized by applying a planarization process such as the CMP process as described above. Thereby, it is possible to decrease alignment errors of the liquid crystal layer caused by the difference in level due to various wirings, elements, and the like which are present on the lower side thereof.

On the other hand, on the counter substrate 20 side, the second alignment base film 38B (the second dielectric film) is formed between the counter electrode 22 and the second alignment film 23. The second alignment base film 38B has a film thickness less than that of the first alignment base film 38A, and is a dielectric film which has a specific resistance higher than that of the liquid crystal layer and is made of silicon oxide ($SiO_2$). The film thickness Ta2 of the second alignment base film 38B is, for example, 60 nm or more and 90 nm or less (75 nm in the embodiment) (Ta2<Ta1).

However, in the liquid crystal device in the related art, in order to suppress display defects such as flicker and image persistence of a display image, for example, there is employed the inversion drive (AC drive) of inverting the polarity of the driving voltage applied to each pixel electrode for each scan line or data line or for each frame in the image signal.

This is for canceling flicker and the like by suppressing the application of the DC voltage component to the liquid crystal layer through the inversion drive and suppressing the bias of electric charges between the substrates. However, even when the inversion drive is simply performed, the DC voltage component is applied to the liquid crystal layer, and the bias of electric charges occurs, whereby display defects still occurs. As the causes of occurrence of the display defects, the following two phenomena have been known.

The first phenomenon is, as described above, the voltage drop due to the field-through phenomenon (called pushdown or punch-through). The voltage drop can be corrected by compensating for the DC voltage corresponding to the amount of a decrease in voltage.

In contrast, the second phenomenon is the bias of electric charges caused by the electric characteristic difference between the element substrate and the counter substrate. In order to compensate for this, it is necessary to apply extra current and voltage to such an extent that the bias of electric charges is eliminated.

Figure 15A:
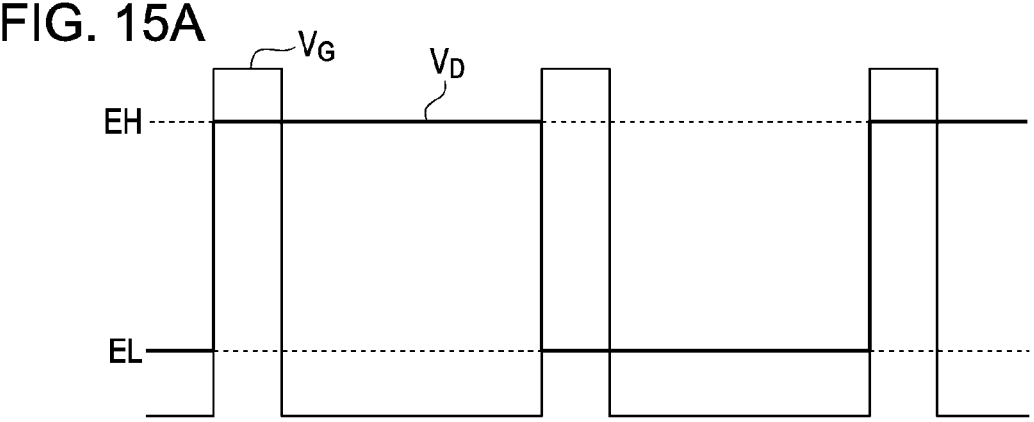
FIG. 15A is a chart illustrating a gate voltage and driving voltage waveforms in the third embodiment.
Figure 15B:
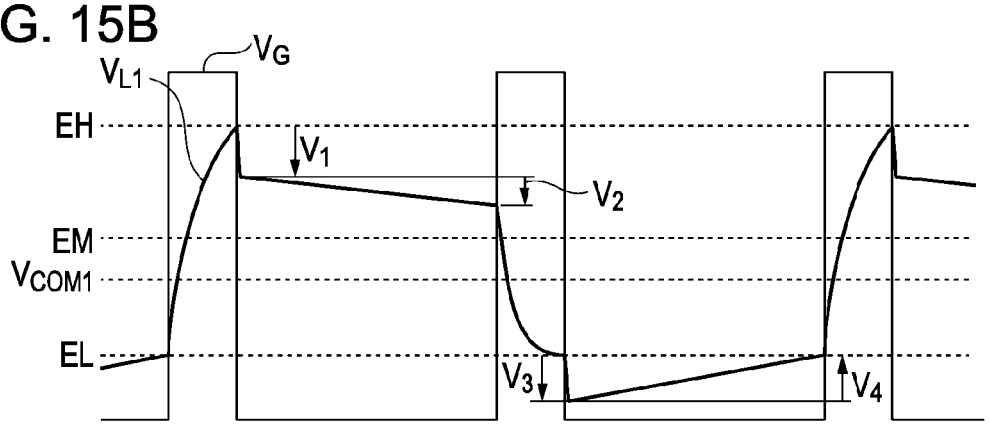
FIG. 15B is a chart illustrating an effective voltage waveform of the liquid crystal layer.
Figure 15C:
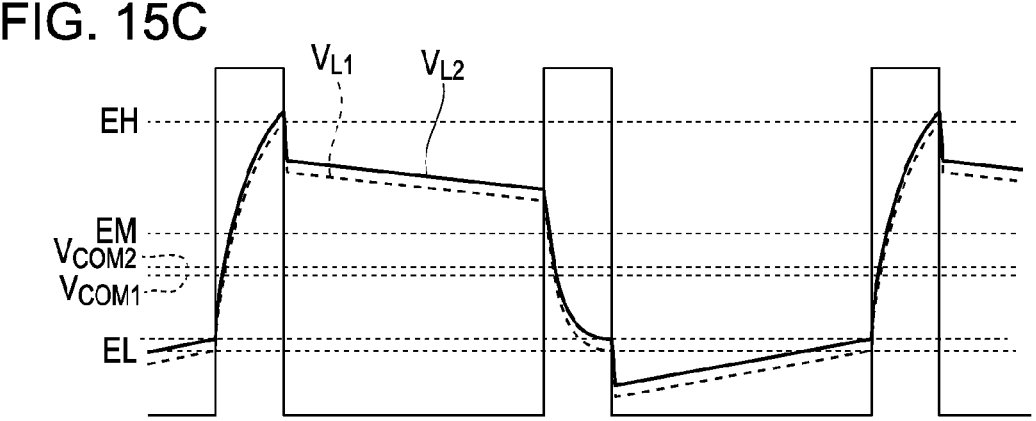
FIG. 15C is a chart illustrating the effective voltage waveform of the liquid crystal layer after a certain drive time passes from the time of FIG. 15B.

Here, referring to FIGS. 15A to 15C, the first phenomenon and the second phenomenon will be described. FIG. 15A is a chart illustrating the gate voltage and the driving voltage waveforms. FIG. 15B is a chart illustrating an effective voltage waveform of the liquid crystal layer. FIG. 15C is a chart illustrating the effective voltage waveform of the liquid crystal layer after a certain drive time passes from the time of FIG. 15B. Furthermore, in FIGS. 15A to 15C, the horizontal axis represents the passage of time, and the vertical axis represents the electric potential.

As shown in FIG. 15A, the electric potential of the driving voltage waveform $V_D$ is alternately switched, in synchronization with the rising edge of the gate voltage $V_G$, between the high potential EH (for example, 12V) and the low potential EL (for example, 2V).

As shown in FIG. 15B, when the gate voltage $V_G$ rises, the switching element is turned on, and the pixel electrode 12 is charged. The electric potential of the effective voltage waveform $V_{L1}$ of the liquid crystal layer rises from approximately the low potential EL to the high potential EH.

However, when the switching element is constituted by a thin film transistor, the switching element is turned off, a punch-through voltage may occur. That is, the electric charges accumulated in the capacitances of the gate electrode 41 of the switching element, the channel area, and the like flows in the pixel electrode 12, thereby causing the voltage drop $V_1$ (the punch-through voltage). Further, in the off state of the switching element, the leak current flows in the channel area, whereby the voltage drop $V_2$ may occur. Thereby, at the next rising edge of the gate voltage, the electric potential of the effective voltage waveform $V_{L1}$ becomes lower by the amount of the voltage drops $V_1$ and $V_2$ than the high potential EH.

Next, when the gate voltage $V_G$ rises, the driving voltage waveform $V_D$ reaches the low potential, and the pixel electrode 12 is discharged. Then, the electric potential of the effective voltage waveform $V_{L1}$ of the liquid crystal layer is lowered up to the low potential EL. Then, when the switching element is turned off, the voltage drop $V_3$ is caused by the punch-through voltage, and the voltage rise is caused by the leak current.

The electric potential of the counter electrode 22 is maintained at the counter electrode potential $V_{COM1}$. The counter electrode potential $V_{COM1}$ is set in advance so as to achieve the balance between the high potential side and the low potential side relative to the counter electrode potential $V_{COM1}$ of the effective voltage waveform $V_{L1}$. The counter electrode potential $V_{COM1}$ is set in consideration of the voltage drops $V_1$ to $V_3$ and the voltage rise $V_4$, and is generally different from the medium potential EM (for example, 7V) between the high potential EH and the low potential EL. For example, the absolute time integration value of the difference between the effective voltage waveform $V_{L1}$ and the counter electrode potential $V_{COM1}$ is optimized such that the value is substantially the same between the duration in which the driving voltage waveform $V_D$ is the high potential EH and the duration in which it is the low potential EL, and the optimized value is set as the counter electrode potential $V_{COM1}$.

As shown in FIG. 15C, the effective voltage waveform $V_{L2}$, which is obtained after the liquid crystal layer is driven only for a certain amount of duration, is shifted by a large amount from the effective voltage waveform $V_{L1}$ which is obtained right after the start of the driving. Furthermore, in some cases, the effective voltage waveform $V_{L2}$ may be shifted in either one of the positive and negative directions in the electric potential. However, FIG. 15C shows a state in which the waveform is shifted in the positive direction. For the shifted effective voltage waveform $V_{L2}$, the counter electrode potential $V_{COM2}$, which is optimized to achieve the balance between positive and negative, is considered. The counter electrode potential $V_{COM2}$ after the shift is shifted in the positive direction from the counter electrode potential $V_{COM1}$ before the shift.

Here, in the related art, it is uncertain whether the effective voltage waveform $V_{L2}$ is shifted in the positive direction or the negative direction. That is, it is uncertain whether the counter electrode potential $V_{COM2}$ after shift is shifted from the counter electrode potential $V_{COM1}$ before the shift in the positive direction or the negative direction.

However, the inventors found the following fact. The first alignment base film (the first dielectric film) 38A, which has a film thickness less than that of the liquid crystal layer and is made of silicon oxide ($SiO_2$) having a specific resistance higher than that of the liquid crystal layer, is disposed between the first alignment film 13 and the pixel electrode 12 on the element substrate 10 side, and the second alignment base film (the second dielectric film) 38B, which has a film thickness less than that of the first dielectric film 38A and is made of silicon oxide ($SiO_2$) having a specific resistance higher than that of the liquid crystal layer, is disposed between the second alignment film 23 and the counter electrode 22 on the counter substrate 20 side, whereby the effective voltage waveform $V_{L2}$, which is optimized to achieve the balance between positive and negative, is shifted in the positive direction of the electric potential ($V_{COM}$ is shifted in the positive direction). This fact is also seen from the results of experiments performed by the inventors.

Figure 16:
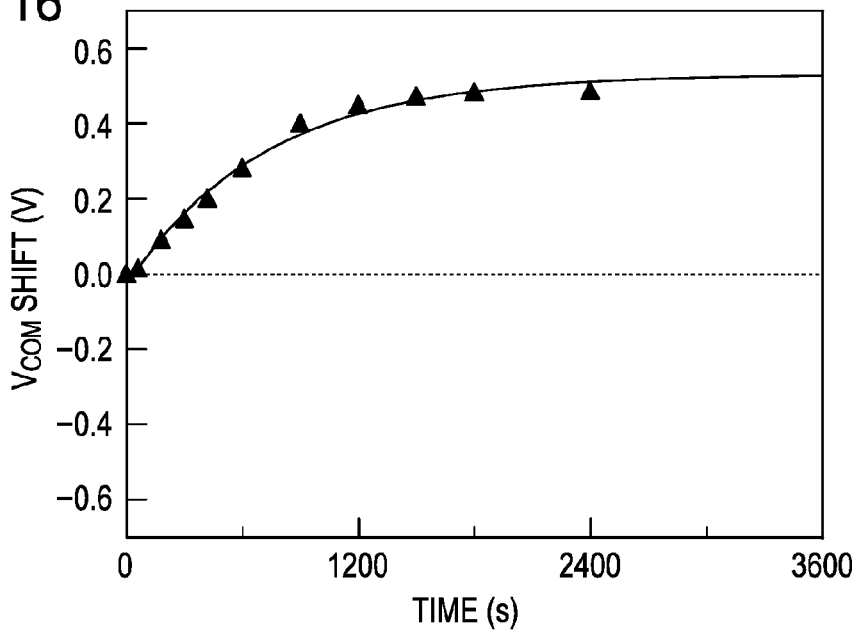
FIG. 16 is a diagram illustrating a relationship between time passage and $V_{COM}$ shift in the third embodiment.

FIG. 16 is a diagram illustrating a relationship between time passage and $V_{COM}$ shift which could be obtained through the experiments performed by the inventors. Furthermore, in FIG. 16, the horizontal axis represents the passage of time, and the vertical axis represents the $V_{COM}$ shift. Here, the $V_{COM}$ shift is defined as a difference between the counter electrode potential $V_{COM1}$ before the shift and the counter electrode potential $V_{COM2}$ after the shift, that is, a value of $V_{COM2}-V_{COM1}$. Further, in FIG. 16, "▲" represents a state (Ta1>Ta2) in which the film thickness Ta1 (300 nm) of the first dielectric film 38A on the element substrate 10 side is more than the film thickness Ta2 (75 nm) of the second dielectric film 38B on the counter substrate 20 side. Further, when the $V_{COM}$ shift is 0, it represents a state (Ta1=Ta2) in which the film thickness Ta1 of the first dielectric film 38A and the film thickness Ta2 of the second dielectric film 38B are equal to each other. Further, in FIG. 7, the $V_{COM}$ shift, which is obtained when the rectangular waves of which the amplitude is 5V are applied, is measured.

As shown in FIG. 16, in the state which is indicated by "▲", that is, in the state in which the film thickness Ta1 of the first dielectric film 38A on the element substrate 10 side is more than the film thickness Ta2 of the second dielectric film 38B on the counter substrate 20 side, the amount of the $V_{COM}$ shift increases as the passage of time increases. The slope of the increase in the $V_{COM}$ shift becomes gentle as the passage of time increases. Further, the amount of the $V_{COM}$ shift becomes equal to about +0.5V in the state the slope of the increase becomes gentle. The direction of the $V_{COM}$ shift is the positive direction in the entire range of the passage of time as compared with the state in which the film thickness Ta1 of the first dielectric film 38A on the element substrate 10 side is the same as the film thickness Ta2 of the second dielectric film 38B on the counter substrate 20 side (the $V_{COM}$ shift is 0).

When the $V_{COM}$ shift becomes larger than a certain level, the difference in the modulation effect of the liquid crystal layer increases between the duration on the low potential side and the duration on the high potential side. Then, in the displayed image, the difference between the amount of light modulated in the duration on the low potential side and the amount of light modulated in the duration on the high potential side is visible, thereby causing flicker of the image.

From the result of the study based on the finding obtained from the experimental data, the inventor noticed that it is effective to perform correction by separating the correction for the first phenomenon from the correction for the second phenomenon. Specifically, in the method of correcting the first phenomenon, a constant correction voltage is applied without regard to the driving voltage, and in the method of correcting the second phenomenon, in response to the magnitude and the direction of the DC voltage component based on the characteristic difference, the ratio of the length of the duration during which the positive polarity is retained is set to be larger than the ratio of the length of the duration during which the negative polarity is retained.

On the other hand, in order to search for the ratio between the durations of polarities at which the temporal change of flicker is minimized (hereinafter simply referred to as a search), a huge amount of time is necessary. For example, the conduction duration of about 10 to 60 minutes per one measurement point is necessary for the adjustment at the time of the search.

However, the inventors found the following fact. The first alignment base film (the first dielectric film) 38A, which has a film thickness less than that of the liquid crystal layer and is made of silicon oxide ($SiO_2$) having a specific resistance higher than that of the liquid crystal layer, is disposed between the first alignment film 13 and the pixel electrode 12 on the element substrate 10 side, and the second alignment base film (the second dielectric film) 38B, which has a film thickness less than that of the first dielectric film and is made of silicon oxide ($SiO_2$) having a specific resistance higher than that of the liquid crystal layer, is disposed between the second alignment film 23 and the counter electrode 22 on the counter substrate 20 side, whereby $V_{COM}$ is shifted in the positive direction. On the basis of this finding, it is possible to shorten the time necessary for the search.

Figure 17:
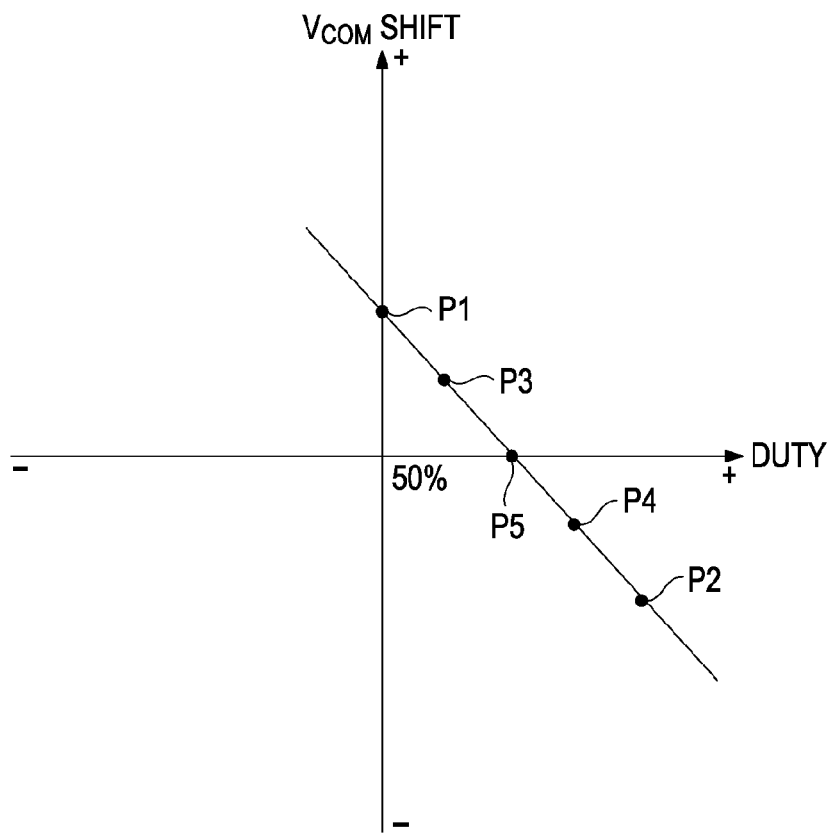
FIG. 17 is a diagram illustrating a relationship between a time ratio and the $V_{COM}$ shift in the third embodiment.

FIG. 17 is a diagram illustrating a relationship between the $V_{COM}$ shift and a time ratio (a duty) which could be obtained by the search performed by the inventors. Furthermore, in FIG. 17, the horizontal axis represents the duty (the ratio between the application time of the positive voltage and the application time of the negative voltage), and the vertical axis represents the $V_{COM}$ shift ($V_{COM2}$-$V_{COM1}$). Here, the intersection point between the horizontal axis and the vertical axis is set to a duty of 50:50, and the right side of the horizontal axis is set as a direction of increasing the application time of the positive voltage. Further, the upper side of the vertical axis is set as a direction in which the $V_{COM}$ shift is positive. Further, in FIG. 17, the reference sign P1 represents a first (initial) measurement point, the reference sign P2 represents a second measurement point, the reference sign P3 represents a third measurement point, the reference sign P4 represents a fourth measurement point, and the reference sign P5 represents a fifth (final) measurement point. Further, in FIG. 17, the search is performed through a total of five measurements, but the number of measurements is not limited to this, and may be changed as necessary.

As shown in FIG. 17, the first measurement point P1 is set in the area in which the duty is 50% or more. In this point, on the basis of the above-mentioned experimental result, it is apparent that, when the above-mentioned dielectric film is disposed between the first alignment film 13 and the pixel electrode 12 on the element substrate 10 side, the $V_{COM}$ shift is shifted in the positive direction. That is, since the line is downward to the right and the fifth measurement point increases more than the duty of 50%, it is preferable that the measurement is performed at least in the range (the range in which the duty is equal to 50% or more) except the area in which the duty is smaller than 50%. Hence, it becomes unnecessary that the first measurement point P1 is set in the area in which the duty is smaller than 50%, and thus it is possible to reduce measurement frequency.

Next, the second measurement point P2 is set in the area, in which the duty is larger than that of the first measurement point P1, with the horizontal axis located therebetween. As described above, it is possible to determine the positive or negative direction which changes the parameter (the duty) in accordance with the first measurement result. That is, it becomes unnecessary to set the second measurement point P2 on the side on which the duty is smaller than that of the first measurement point P1, and thus it is possible to reduce the measurement frequency. Further, by plotting the first measurement point P1 and the second measurement point P2, it is possible to approximately calculate the slope of the right-downward line.

Next, the third measurement point P3 is set between the first measurement point P1 and the horizontal axis in accordance with the approximately calculated slope. Further, the fourth measurement point P4 is set between the second measurement point P2 and the horizontal axis in accordance with the approximately calculated slope. As described above, while the value of ($V_{COM2}$-$V_{COM1}$) at which the $V_{COM}$ shift is equal to approximately 0 is estimated, the search range is narrowed. By plotting the third measurement point P3 and the fourth measurement point P4, it is possible to approximately calculate the $V_{COM}$ shift corresponding to the allowable limit of flicker.

Then, the fifth measurement point P5 is set on the horizontal axis. Specifically, the fifth measurement point P5 is set as an intersection point between the horizontal axis and the line which approximately connects the measurement point P1 to P4. In the above-mentioned manner, it is possible to calculate the ratio between the durations of polarities at which the temporal change of flicker is minimized. As a result, according to the adjustment method, it is possible to shorten the time necessary for the search by reducing the measurement frequency.

Method of Driving Liquid Crystal Device

Hereinafter, a method of driving the liquid crystal device will be described. The driving method was made through the study and ingenuity of the inventors in order to realize the idea mentioned above.

Figure 18:
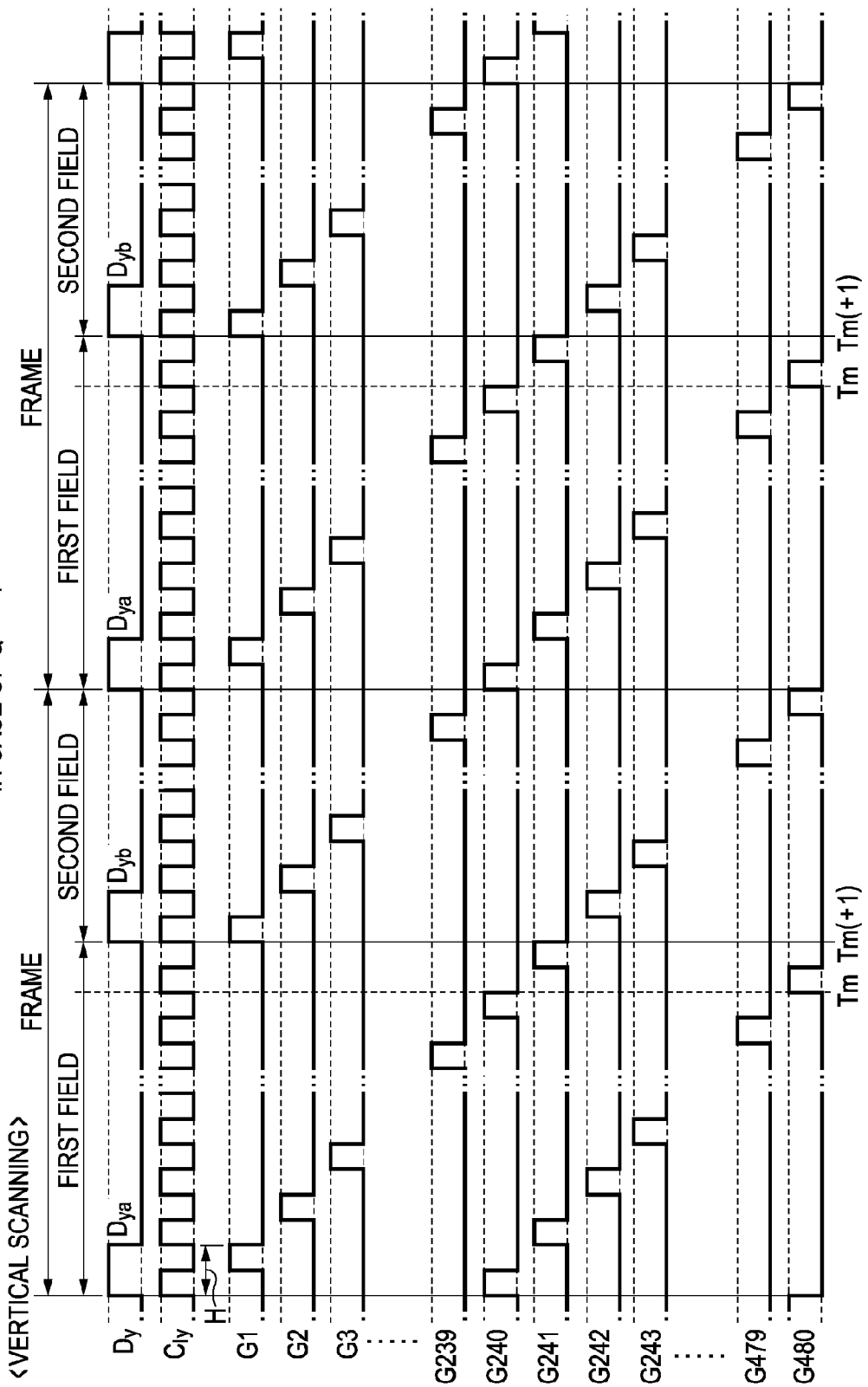
FIG. 18 is a diagram illustrating a timing chart of a scan signal system in a case where a designated value is "+1".

FIG. 18 is a diagram illustrating a timing chart of a scan signal system in a case where a designated value Q is "+1". Further, in the embodiment, the plurality of scan lines 61 are divided into the first scan line group and the second scan line group, any one scan line 61 of the first scan line group and any one scan line 61 of the second scan line group are alternately selected in one frame, and each scan line 61 is selected twice in one frame. That is, a so-called double-speed area scan inversion drive is used.

First, a method of driving the scan lines 61 will be described. FIG. 18 is a timing chart indicating the scan signals G1 to G480, which are output by the scan line driving circuit 130, in terms of the relationship between the start pulse and the clock signal. Here, the frame is defined as a duration necessary to display a single image on the liquid crystal panel 100A. Further, in the duration of one frame (a predetermined duration), the duration from when the first start pulse $D_{ya}$ is output to when the second start pulse $D_{yb}$ is output is set as a first field (a first duration), and the duration from when the second start pulse $D_{yb}$ is output to when the subsequent first start pulse $D_{ya}$ is output is set as a second field (a second duration). Further, one scan line 61 is selected once for each field, that is, selected twice in the duration of one frame.

In the embodiment, the vertical synchronization signal $V_s$ has a frequency of 120 Hz as described above. Therefore, the duration of one frame is also fixed at 8.33 milliseconds. The control circuit 152 (refer to FIG. 1) outputs a clock signal of which the duty ratio is 50% by an amount of 480 cycles equal to the number of the scan lines 61 corresponding to the duration of one frame. Furthermore, the duration corresponding to a single cycle of the clock signal is represented as H.

Further, the control circuit 152 outputs the start pulses with a pulse width corresponding to the single cycle of the clock signal at the H-level rising edges of the clock signal as follows. That is, the control circuit 152 outputs the first start pulse $D_{ya}$ at the beginning (the beginning of the first field) of the duration of one frame. On the other hand, since the designated value Q is positive, the control circuit 152 outputs the second start pulse $D_{yb}$ with a delay of "Q×H" from the timing Tm at which 240 cycles of the clock signal have been output after the first start pulse $D_{ya}$ is output.

Accordingly, as shown in FIG. 18, in the case where the designated value Q is "+1", the second start pulse $D_{yb}$ is output at the timing Tm (+1) which is delayed from the timing Tm by an amount of the single cycle of the clock signal.

Here, the start pulses are alternately output, while the output timing of the first start pulse $D_{ya}$ is not changed without regard to the designated value Q. Hence, when the first start pulse $D_{ya}$ which is output for each one frame (8.33 milliseconds) is specified, essentially it is also possible to specify the second start pulse $D_{yb}$ which defines the start of the second field.

The scan line driving circuit 130 outputs the following operation signals from the start pulse and the clock signal. That is, when the first start pulse $D_{ya}$ is supplied, the scan line driving circuit 130 sequentially sets the scan signals G1 to G480 to the H level whenever the clock signal changes to the L level. On the other hand, when the second start pulse $D_{yb}$ is supplied, the scan line driving circuit 130 sequentially sets the scan signals G1 to G480 to the H level whenever the clock signal changes to the H level.

The first start pulse $D_{ya}$ is supplied at the beginning of the duration of one frame (the first field). Therefore, the selection of the scan line 61 triggered by the supply of the first start pulse $D_{ya}$ is not changed by the designated value Q. Further, the selection of the scan line 61 triggered by the supply of the first start pulse $D_{ya}$ is performed in the duration during which the clock signal is set the L level. Therefore, in the range of the first field and second field, each selection proceeds from the scan line 61 of the first row as a start point toward the lower side of the screen in order of 2, 3, 4, ..., and 480th row with the duration of a half cycle of the clock signal.

On the other hand, the second start pulse $D_{yb}$ is supplied at the beginning of the second field. Therefore, the selection of the scan line 61 triggered by the start pulse is shifted back or forth as a whole in accordance with the designated value Q. That is, the selection of the scan line 61 triggered by the supply of the second start pulse $D_{yb}$ is performed in the duration in which the clock signal is at the H level. Therefore, in the range of the second field of a certain frame to the first field of the subsequent frame, each selection proceeds from the scan line 61 of the first row as a start point toward the lower side of the screen in order of 2, 3, 4, ..., and 480th row in the interval between the selections triggered by the supply of the first start pulse $D_{ya}$. That is, for example, when the designated value Q is "+1", all the selections of 1 to 240th row in the second field of a certain frame are delayed by the amount of one cycle of the clock signal from the timing Tm.

Figure 19:
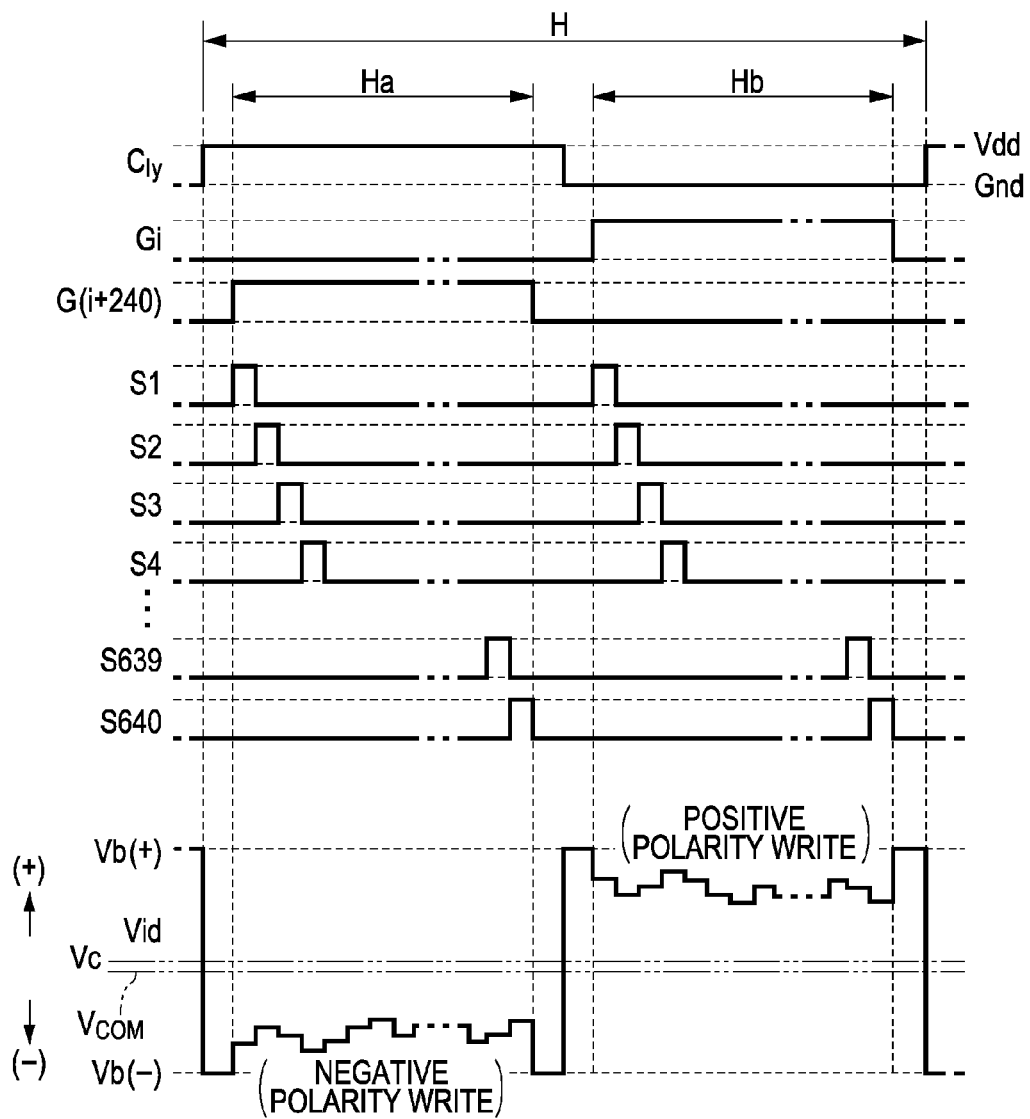
FIG. 19 is a diagram illustrating a timing chart of a first field of a data signal system.
Figure 20:
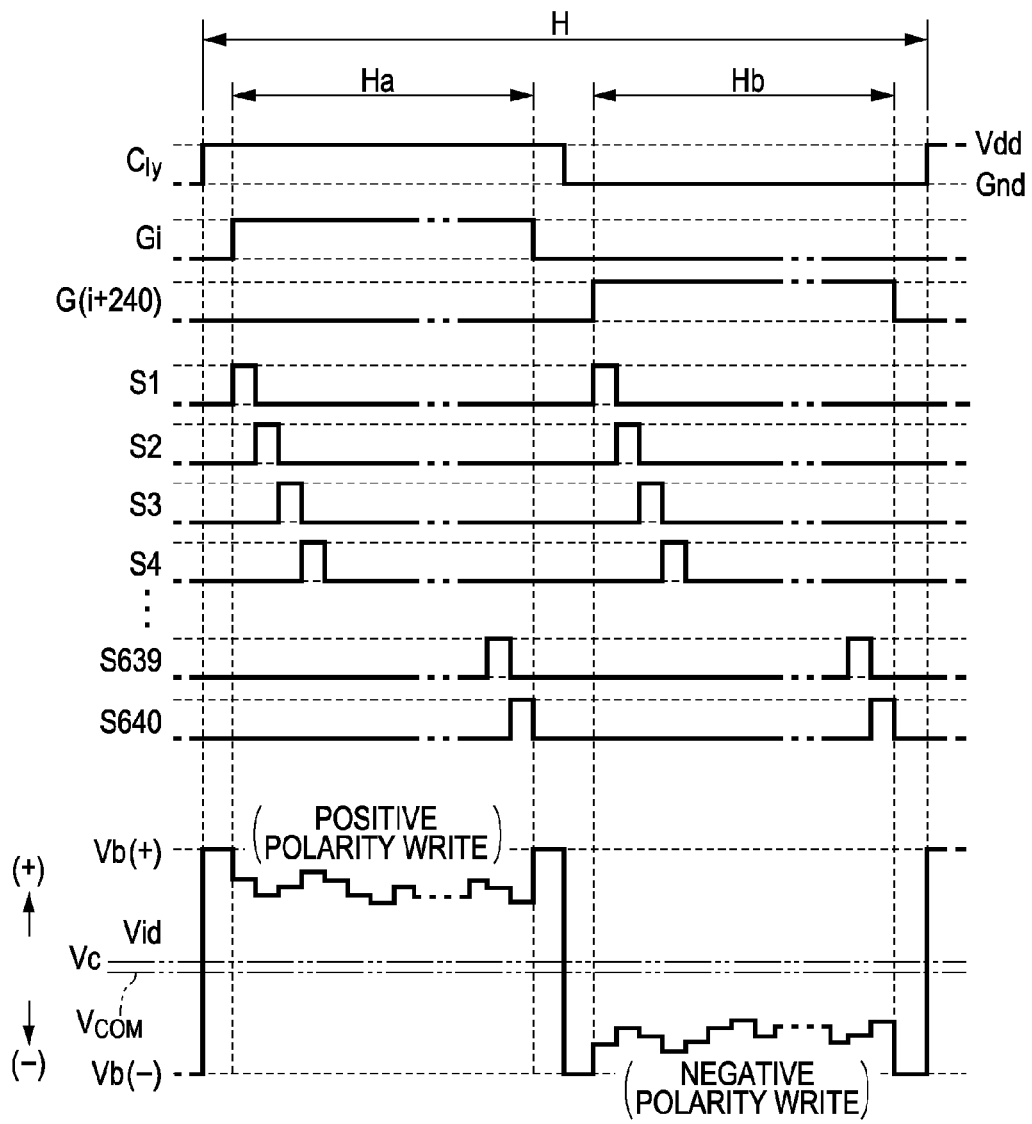
FIG. 20 is a diagram illustrating a timing chart of a second field of a data signal system.

FIG. 19 is a timing chart in the first field of the data signal Vid. FIG. 20 is a timing chart in the second field of the data signal Vid. Subsequently, a method of driving the data line 62 will be described with reference to FIGS. 19 and 20.

The sampling signal output circuit 142 of the data line driving circuit 140 outputs, to the respective data lines 62, sampling signals S1, S2, S3, ..., and S640 which exclusively go to the H level one after another throughout the duration during which any one scan line 61 is selected in accordance with the control signal by the control circuit 152 and the operation signal supplied to the scan line 61 is at the H level. Furthermore, the control signal practically means the start pulse or the clock signal, but the description thereof is omitted.

The duration during which the scan signal is at the H level can be slightly narrowed, in practice, as compared with the duration of the half cycle of the clock signal. In this case, as shown in FIG. 19, in the first field, the scan signal G(i+240) goes to the H level, and thereafter the scan signal G1 goes to the H level.

Further, as shown in FIG. 20, in the second field, the scan signal G1 goes to the H level, and thereafter the scan signal G(i+240) goes to the H level.

Further, the display data processing circuit 156 (refer to FIG. 10) converts the display data Video, which corresponds to a single row of the pixels in the selected scan line 61, into the data signal Vid with the following polarity in accordance with the outputs of the sampling signals S1 to S640 from the sampling signal output circuit 142. That is, the display data processing circuit 156 changes the data signal Vid of the pixels at the pixel row, which is selected when the clock signal is at the L level, into positive polarity (+), and changes the data signal Vid of the pixels at the pixel row, which is selected when the clock signal is at the H level, into negative polarity (−). In other words, the display data processing circuit 156 changes the data signal Vid of the pixels at the pixel row, which is selected when the first start pulse $D_{ya}$ is supplied, into positive polarity (+), and changes the data signal Vid of the pixels at the pixel row, which is selected when the second start pulse $D_{yb}$ is supplied, into negative polarity (−).

Here, regarding the positive polarity (+) and the negative polarity (−), the higher potential side than the reference voltage Vc is set as the positive polarity (+) side, and the lower potential side is set as the negative polarity (−) side. Further, here the reference potential is set to 0V, but is not limited to this.

Further, the counter electrode potential $V_{COM}$ is set to be shifted to the negative polarity (−) side from the reference voltage Vc. Specifically, the counter electrode potential $V_{COM}$ is set to, for example, a voltage value in the range of about −0.1V to −0.2V. The reason is that, since the amount of change in voltage caused by the above-mentioned first phenomenon (the field-through) ranges from −0.1V to −0.2V, the setting value of the counter electrode potential $V_{COM}$ is shifted from the reference voltage Vc on the basis of the amount of change in voltage as the correction voltage. That is, the counter electrode potential $V_{COM}$ is shifted such that it is possible to reduce the effect of the first phenomenon.

Further, it is preferable to find the correction voltage for the first phenomenon by separately performing the measurement for each liquid crystal panel 100A. Specifically, when the positive and negative driving voltage corresponding to the same gray scale are alternately applied, the counter electrode potential $V_{COM}$ at which flicker is sufficiently small is calculated, and the correction voltage is calculated from the difference between the potential and the reference voltage Vc. Further, in this case, it is preferable that the driving voltage should be a voltage corresponding to the intermediate gray scale at which flicker is quite visible.

In such a manner, the correction voltage is obtained, and is set in the control circuit 152 (refer to FIG. 11) or the voltage generating circuit 160. Then, the voltage generating circuit 160 generates the counter electrode potential $V_{COM}$, which is shifted by the correction voltage, and supplies the potential to the counter electrode 22 of the liquid crystal panel 100A.

Subsequently, the overall driving method will be described.

First, in FIG. 10, the control circuit 152 stores the display data Video, which is supplied from the external apparatus, in the frame memory 157. Thereafter, when the scan line 61 of a certain pixel row in the liquid crystal panel 100A is selected, the display data Video of the pixel row is read out at a speed twice the storage speed. Then, the data is converted into the analog data signal Vid through the DA converter 158. With this, the sampling signal output circuit 142 is controlled through the control signal such that, in accordance with the reading of the display data Video, the sampling signals S1 to S640 sequentially go to the H level.

As shown in FIG. 18, when the designated value Q is for example "+1", the second start pulse $D_{yb}$ is output at the timing which is time-delayed by one cycle of the clock signal from the timing Tm. Hence, when the designated value Q is "+1", the duration of the first field corresponds to 241 cycles of the clock signal, while the duration of the second field corresponds to 239 cycles of the clock signal.

Further, in the first field, the scan lines 61 are selected in order of 240, 1, 241, 2, 242, 3, ..., and 480th rows. Hence, the control circuit 152 controls the scan line driving circuit 130 so as to select the scan line 61 of the 240th row first. On the other hand, the control circuit 152 causes the display data processing circuit 156 to read the display data Video, which corresponds to the 240th row stored in the frame memory 157, at the double speed. Then, the control circuit 152 causes the DA converter 158 to generate the negative data signal Vid from the display data Video, and in conjunction with the reading of the data signal Vid, as shown in FIG. 19, controls the sampling signal output circuit 142 such that the sampling signals S1 to S640 exclusively go to the H level one after another. When the sampling signals S1 to S640 go to the H level one after another, the TFTs 40 are sequentially turned on, and the data signal Vid supplied to the image signal line is sampled in the 1st-to-640th data lines 62.

On the other hand, when the scan line 61 is selected, the scan signal G240 goes to the H level. Therefore, all the TFTs 40 of the pixels positioned in 240th row are turned on. Hence, the negative voltage of the data signal Vid sampled in the data lines 62 is directly applied to the pixel electrodes 12. Thereby, in each liquid crystal capacitances 120 of the pixels of 240th row and 1, 2, 3, 4, . . . , 639, and 640th columns, the negative voltages corresponding to the gray scales designated by the display data Video are written and retained. Hereinafter, in the first field, the same voltage writing operations are performed in order of 1, 241, 2, 242, 3, . . . , and 480th rows. Thereby, in the pixels of 1st to 241st rows, the positive voltages corresponding to the gray scales are written, and in the pixels of 242nd to 480th rows, the negative voltages corresponding to the gray scales are written, and those are respectively retained therein.

On the other hand, in the second field, the scan lines 61 are selected in order of 1, 242, 2, 243, 3, 244, . . . , 239, and 480th rows, and the writing polarities in the same row are inverted. Hence, in the pixels of 1st to 241st rows, the negative voltages corresponding to the gray scales are written, and in the pixels of the 242nd to 480th rows, the positive voltages corresponding to the gray scales are written, and those are respectively retained therein.

FIG. 21 is a diagram illustrating writing states of respective rows with passage of time in the range of successive frames in the case where the designated value Q is "+1". Furthermore, the time point of performing the writing on the scan line 61 at the top, that is, the time point of the start of the duration during which the positive polarity is retained is precisely at the timing which is delayed by the half cycle of the clock signal after the first start pulse $D_{ya}$ is supplied. However, in FIG. 21, for simplification, the time point is adjusted to the first start pulse $D_{ya}$.

As shown in FIG. 21, in the first field, the negative polarity is written in the pixels of 240, 241, 242, . . . , and 480th rows, the positive polarity is written in the pixels of the 1, 2, 3, . . . , and 239th rows, and those are retained until the subsequent writing. On the other hand, in the second field, the negative polarity is written in the pixels of the 1, 2, 3, . . . , and 239th rows, the positive polarity is written in the pixels of 240, 241, 242, . . . , and 480th rows, and likewise, those are retained until the subsequent writing. Consequently, it can be observed that, in the respective fields, there are two selected scan lines of the scan line 61 in which the positive polarity is written and the scan line 61 in which the negative polarity is written.

As described above, in the case where the designated value Q is "+1", the output timing of the second start pulse $D_{yb}$ is delayed. Hence, the time of retaining the negative voltage, which is written by the selection triggered by the supply of the second start pulse $D_{yb}$, becomes shorter than the time of retaining the positive voltage which is written by the selection triggered by the supply of the first start pulse $D_{ya}$. That is, when the designated value Q is positive, as the absolute value thereof increases, the time of retaining the negative voltage, which is written by the selection triggered by the supply of the second start pulse $D_{yb}$, becomes shorter than the time of retaining the positive voltage which is written by the selection triggered by the supply of the first start pulse $D_{ya}$. Hence, the effective value of the negative voltage applied to the liquid crystal capacitance 120 is lower than the effective value of the positive voltage.

That is, the first field in which the positive voltage is applied becomes longer than the second field in which the negative voltage is applied. Accordingly, in a single frame, the application time of the positive voltage is set to be longer than the application time of the negative voltage, and thus it is possible to effectively perform the correction corresponding to the $V_{COM}$ shift.

Method of Determining Time Ratio

It can be inferred that the $V_{COM}$ shift occurs since the electric potential difference is caused by accumulation of electric charges due to the polarity difference in current. The relational expression between the amount of accumulated electric charges and current (voltage, resistance) is represented by the following Expressions (8) and (9), where the time ratio of the application of the positive voltage is (1+X), the time ratio of the application of the negative voltage is (1−X), and the application time is T. Here, it is assumed that the amount of accumulated positive charges is $q_+$, the amount of accumulated negative charges is $q_-$, the current is i, the voltage is v, and the resistance is R.

$$q_+ = \int_0^{(1+x)T} i\, dt = \frac{1}{R}\int_0^{(1+x)T} v\, dt \qquad \text{Expression (8)}$$

$$q_- = \int_0^{(1-x)T} i\, dt = \frac{1}{R}\int_0^{(1-x)T} v\, dt \qquad \text{Expression (9)}$$

According to the method, by controlling the amount of accumulated electric charges per unit time, it is possible to prevent the $V_{COM}$ shift. From the rectangular wave amplitude at the time of applying current and the $V_{COM}$ shift at that time, it is possible to estimate an optimum time share ratio. In order to establish the relationship of $q_+ = q_-$, the application time ratio of the positive voltage is assumed as (1+X), and the application time ratio of the negative voltage is assumed as (1−X). Then, the following Expressions (10) and (11) can be obtained. Here, it is assumed that the rectangular wave amplitude is E and the $V_{COM}$ shift is δv. Furthermore, the $V_{COM}$ shift is defined as a difference between the counter electrode potential $V_{COM1}$ before the shift and the counter electrode potential $V_{COM2}$ after the shift, that is, a value of $V_{COM2} - V_{COM1}$.

$$(E-\delta V/2)(1+x) = (E+\delta V/2)(1-x) \qquad \text{Expression (10)}$$

$$\therefore x = \delta V/2E \qquad \text{Expression (11)}$$

For example, when the amplitude of the rectangular waves applied to the pixel electrode 12 is ±5V and the $V_{COM}$ shift is +0.5V, X=0.05. Hence, when the application time of the positive voltage:the application time of the negative voltage=55:45, the shift of $V_{COM}$ does not occur.

From the experimental result of the inventors, it is empirically known that, in a case where the frame rate is 120 fps, the $V_{COM}$ shift corresponding to the allowable limit of flicker is ±0.15V. Hence, actually it is preferable that X=0.035 to 0.065. Accordingly, when a ratio of the film thickness Ta1 (300 nm) of the first dielectric film 38A to the film thickness Ta2 (75 nm) of the second dielectric film 38B is 1/4, it is preferable that a ratio of the length of the first field to the length of the second field should be in the range of 43.5/56.5 or more to 46.5/53.5 or less. That is, it is preferable that the application time of the positive voltage:the application time of the negative voltage=53.5:46.5 to 56.5:43.5. When the frame rate is 120 fps, the duration of the single frame is 8.3 milliseconds. Therefore, the application time of the positive voltage:the application time of the negative voltage=8.42 milliseconds:8.25 milliseconds to 8.92 milliseconds:7.75 milliseconds.

According to the liquid crystal device 100 of the embodiment, the counter electrode potential $V_{COM}$ is shifted and set in advance so as to reduce flicker caused by the parasitic capacitance of the switching element. Hence, the first phenomenon can be corrected. Further, the length of the first duration is set to be longer than the length of the second duration during the predetermined durations. Hence, the second phenomenon can also be corrected. The correction is based on the following fact which is found by the inventors. The first alignment base film (the first dielectric film) 38A, which has a film thickness less than that of the liquid crystal layer and is made of silicon oxide ($SiO_2$) having a specific resistance higher than that of the liquid crystal layer, is disposed between the first alignment film 13 and the pixel electrode 12 on the element substrate 10 side, and the second alignment base film (the second dielectric film) 38B, which has a film thickness less than that of the first dielectric film 38A and is made of silicon oxide ($SiO_2$) having a specific resistance higher than that of the liquid crystal layer, is disposed between the second alignment film 23 and the counter electrode 22 on the counter substrate 20 side, whereby effective voltage waveform is shifted in the positive direction in electric potential. This fact is also seen from the results of experiments performed by the inventors. That is, the first dielectric film 38A, which has the film thickness more than that of the second dielectric film 38B between the second alignment film 23 and the counter electrode 22 on the counter substrate 20 side, is disposed between the first alignment film 13 and the pixel electrode 12 on the element substrate 10 side. In such a manner, as compared with the case where the film thickness Ta1 of the first dielectric film 38A is equal to the film thickness Ta2 of the second dielectric film 38B, it becomes apparent that $V_{COM}$ is shifted in the positive direction (the counter electrode potential $V_{COM2}$ after the shift is shifted in the positive direction from the counter electrode potential $V_{COM1}$ before the shift). As described above, the shift direction of the $V_{COM}$ shift is specified in advance. Therefore, as compared with the case where the shift direction is not specified as in the related art, it is possible to accurately correct the $V_{COM}$ shift. As a result, it is possible to provide the liquid crystal device 100 capable of improving display quality by suppressing the occurrence of the display defects such as flicker.

Further, according to the configuration, as compared with the case where the pixel electrode 12 and the counter electrode 22 are made of the same material (for example, ITO), it becomes apparent that $V_{COM}$ is shifted in the positive direction. Thus, asymmetry property in characteristics of the element substrate 10 and the counter substrate 20 becomes remarkable. This fact is also seen from the results of experiments performed by the inventors. For this reason, as compared with the case where the pixel electrode 12 and the counter electrode 22 are made of for example ITO, the DC voltage component, which is caused by the characteristic difference between the element substrate 10 and the counter substrate 20 holding the liquid crystal layer interposed therebetween, remarkably occurs. As a result, it is possible to improve display quality by suppressing the occurrence of the display defects such as flicker.

According to the method of driving the liquid crystal device 100 of the embodiment, the counter electrode potential $V_{COM}$ is shifted and set in advance so as to reduce flicker caused by the parasitic capacitance of the switching element. Hence, the first phenomenon can be corrected. Further, the length of the first duration is set to be longer than the length of the second duration during the predetermined durations. Hence, the second phenomenon can also be corrected. The correction is based on the following fact which is found by the inventors. The first alignment base film (the first dielectric film) 38A, which has a film thickness less than that of the liquid crystal layer and is made of silicon oxide ($SiO_2$) having a specific resistance higher than that of the liquid crystal layer, is disposed between the first alignment film 13 and the pixel electrode 12 on the element substrate 10 side, and the second alignment base film (the second dielectric film) 38B, which has a film thickness less than that of the first dielectric film and is made of silicon oxide ($SiO_2$) having a specific resistance higher than that of the liquid crystal layer, is disposed between the second alignment film 23 and the counter electrode 22 on the counter substrate 20 side, whereby effective voltage waveform is shifted in the positive direction in electric potential. This fact is also seen from the results of experiments performed by the inventors. Accordingly, it is possible to improve display quality by suppressing the occurrence of the display defects such as flicker.

Further, according to the method of driving the liquid crystal device 100, the ratio is an optimum time share ratio corresponding to the allowable limit of flicker. Therefore, it is possible to effectively perform the correction for the second phenomenon. In contrast, when the ratio of the length of the first duration to the length of the second duration is smaller than 43.5/56.5, the length of the first duration is too long, and thus it may be difficult to perform effective correction. Further, when the ratio of the length of the first duration to the length of the second duration is larger than 46.5/53.5, the length of the first duration is too short, and thus it may be difficult to perform effective correction.

Furthermore, in the embodiment, the description was given of the exemplary case where the first dielectric film 38A, which has the film thickness more than that of the second dielectric film 38B between the second alignment film 23 and the counter electrode 22 on the counter substrate 20 side, is disposed between the first alignment film 13 and the pixel electrode 12 on the element substrate 10 side. However, the invention is not limited to this case. Hereinafter, the liquid crystal panel having a different dielectric film from that in the embodiment will be described with reference to FIG. 22.

Fourth Embodiment

FIG. 22 is a sectional view illustrating a schematic configuration of a liquid crystal panel 100B according to a fourth embodiment. Furthermore, FIG. 22 is a sectional view illustrating the schematic configuration of the liquid crystal panel 100B corresponding to FIG. 14. In the liquid crystal panel 100B according to the embodiment, the first dielectric film 138A, which has the film thickness less than that of the second dielectric film 138B between the second alignment film 23 and the counter electrode 22 on the counter substrate 20A side, is disposed between the first alignment film 13 and the pixel electrode 12 on the element substrate 10A side. In this point, the liquid crystal panel 100B according to the embodiment is different from the liquid crystal panel 100A according to the first embodiment. In FIG. 22, the elements common to those of FIG. 14 is represented by the same reference signs and numerals, and a detailed description thereof will be omitted. In addition, in FIG. 22, the reference sign Tb1 represents a film thickness of a first alignment base film (the first dielectric film) 138A, and the reference sign Tb2 represents a film thickness of a second alignment base film (the second dielectric film) 138B.

As shown in FIG. 22, the liquid crystal panel 100B includes the element substrate 10A, the counter substrate 20A which is disposed to be opposed thereto, and a liquid crystal layer which is sandwiched therebetween. The element substrate 10A includes a substrate main body 11 which is made of a transparent material such as glass or quartz, the TFTs 40 and the pixel electrodes 12 which are formed inside the substrate main body 11 (on the liquid crystal layer side), and the first alignment base film 138A and a first alignment film 13 which cover the pixel electrode 12. On the other hand, the counter substrate 20A includes a substrate main body 21 which is made of a transparent material such as glass or quartz, a light blocking film 24 which are formed inside the substrate main body 21 (on the liquid crystal layer side), a counter electrode 22 which covers the light blocking film 24, and the second alignment base film 138B and a second alignment film 23 which covers the counter electrode 22.

The pixel electrodes 12 are provided on the element substrate 10A side, and the first alignment film 13 is provided thereon. Each pixel electrode 12 is made of, for example, a conductive film such as aluminum (Al). The thickness of the pixel electrode 12 is, for example, 180 nm or more and 220 nm or less. Further, the film thickness of the first alignment film 13 is, for example, 40 nm or more and 80 nm or less.

On the other hand, the counter electrode 22 is provided over the entire surface of the counter substrate 20A side, and the second alignment film 23 is provided thereon. The counter electrode 22 is made of, for example, a transparent conductive film such as an ITO film. The thickness of the counter electrode 22 is, for example, 120 nm or more and 160 nm or less. Further, the film thickness of the second alignment film 23 is, for example, 40 nm or more and 80 nm or less.

The first alignment base film 138A (the first dielectric film) is formed on the pixel electrodes 12 on the element substrate 10A side. The first alignment base film 138A has a film thickness less than that of the liquid crystal layer, and is a dielectric film which has a specific resistance higher than that of the liquid crystal layer and is made of silicon oxide ($SiO_2$). The film thickness Tb1 of the first alignment base film 138A is, for example; 60 nm or more and 90 nm or less (75 nm in the embodiment). Further, the first alignment film 13 is formed on the first alignment base film 138A.

On the other hand, on the counter substrate 20A side, the second alignment base film 138B (the second dielectric film) is formed between the counter electrode 22 and the second alignment film 23. The second alignment base film 138B has a film thickness more than that of the first alignment base film 138A, and is a dielectric film which has a specific resistance higher than that of the liquid crystal layer and is made of silicon oxide ($SiO_2$). The film thickness Tb2 of the second alignment base film 138B is, for example, 240 nm or more and 360 nm or less (300 nm in the embodiment) (Tb2>Tb1).

Figure 23A:
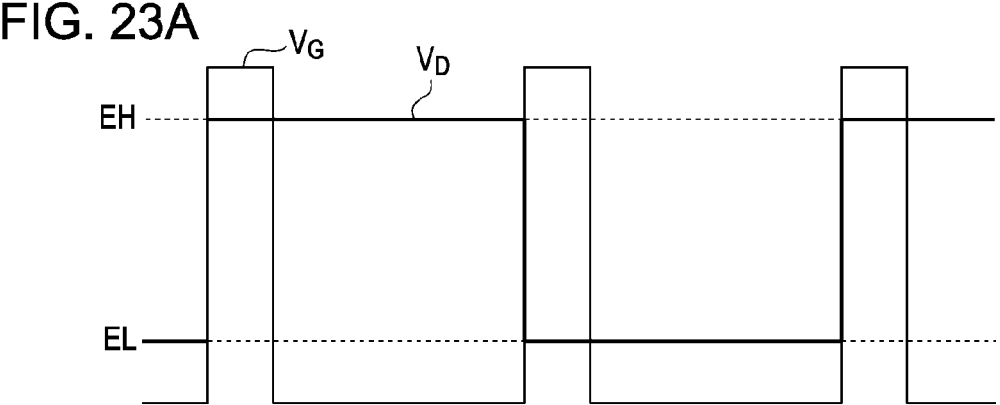
FIG. 23A is a chart illustrating gate voltage and driving voltage waveforms in the fourth embodiment.
Figure 23B:
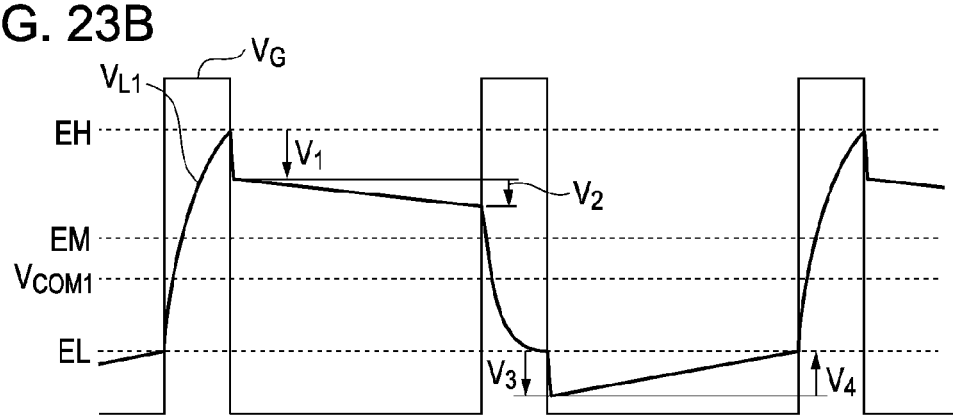
FIG. 23B is a chart illustrating an effective voltage waveform of the liquid crystal layer.
Figure 23C:
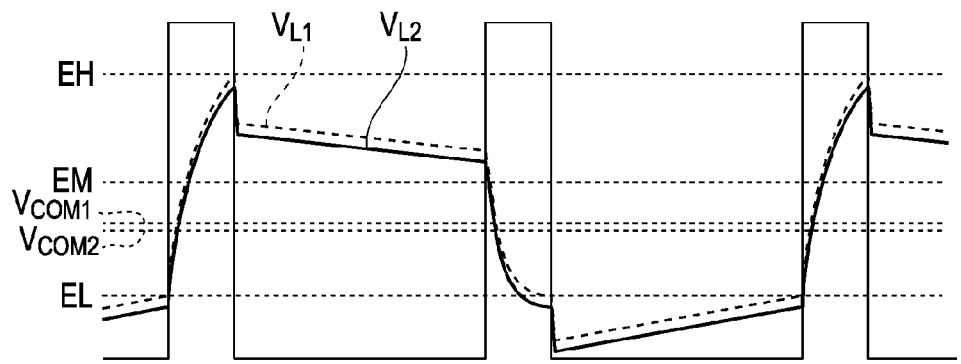
FIG. 23C is a chart illustrating the effective voltage waveform of the liquid crystal layer after a certain drive time passes from the time of FIG. 23B.

FIGS. 23A to 23C are charts illustrating the gate voltages and the driving voltage waveforms in the fourth embodiment. Further, FIG. 23A is a chart, corresponding to FIG. 15A, illustrating the gate voltage and the driving voltage waveforms. FIG. 23B is a chart, corresponding to FIG. 15B, illustrating an effective voltage waveform of the liquid crystal layer. FIG. 23C is a chart, corresponding to FIG. 15C, illustrating the effective voltage waveform of the liquid crystal layer after a certain drive time passes from the time of FIG. 23B. In the embodiment, the effective voltage waveform of the liquid crystal layer is shifted in the positive direction in electric potential after a certain drive time passes. In this point, the waveform is different from the effective voltage waveform of the liquid crystal layer in the first embodiment. In FIGS. 23A to 23C, the elements common to those of FIGS. 15A to 15C is represented by the same reference signs and numerals, and a detailed description thereof will be omitted. Furthermore, in FIGS. 23A to 23C, the horizontal axis represents the passage of time, and the vertical axis represents the electric potential.

As shown in FIG. 23A, the electric potential of the driving voltage waveform $V_D$ is alternately switched, in synchronization with the rising edge of the gate voltage $V_G$, between the high potential EH (for example, 12V) and the low potential EL (for example, 2V).

As shown in FIG. 23B, when the gate voltage $V_G$ rises, the switching element is turned on, and the pixel electrode 12 is charged. The electric potential of the effective voltage waveform $V_{L1}$ of the liquid crystal layer rises from approximately the low potential EL to the high potential EH.

As shown in FIG. 23C, the effective voltage waveform $V_{L2}$, which is obtained after the liquid crystal layer is driven only for a certain amount of duration, is shifted by a large amount from the effective voltage waveform $V_{L1}$ which is obtained right after the start of the driving. Furthermore, in some cases, the effective voltage waveform $V_{L2}$ may be shifted in either one of the positive and negative directions in the electric potential. However, FIG. 23C shows a state in which the waveform is shifted in the negative direction. For the shifted effective voltage waveform $V_{L2}$, the counter electrode potential $V_{COM2}$, which is optimized to achieve the balance between positive and negative, is considered. The counter electrode potential $V_{COM2}$ after the shift is shifted in the negative direction from the counter electrode potential $V_{COM1}$ before the shift.

Here, in the related art, it is uncertain whether the effective voltage waveform $V_{L2}$ is shifted in the positive direction or the negative direction in electric potential. That is, it is uncertain whether the counter electrode potential $V_{COM2}$ after shift is shifted from the counter electrode potential $V_{COM1}$ before the shift in the positive direction or the negative direction.

However, the inventors found the following fact. The first alignment base film (the first dielectric film) 138A, which has a film thickness less than that of the liquid crystal layer and is made of silicon oxide ($SiO_2$) having a specific resistance higher than that of the liquid crystal layer, is disposed between the first alignment film 13 and the pixel electrode 12 on the element substrate 10A side, and the second alignment base film (the second dielectric film) 138B, which has a film thickness more than that of the first dielectric film 138A and is made of silicon oxide ($SiO_2$) having a specific resistance higher than that of the liquid crystal layer, is disposed between the second alignment film 23 and the counter electrode 22 on the counter substrate 20A side, whereby the effective voltage waveform $V_{L2}$, which is optimized to achieve the balance between positive and negative, is shifted in the negative direction of the electric potential ($V_{COM}$ is shifted in the negative direction). This fact is also seen from the results of experiments performed by the inventors.

Figure 24:
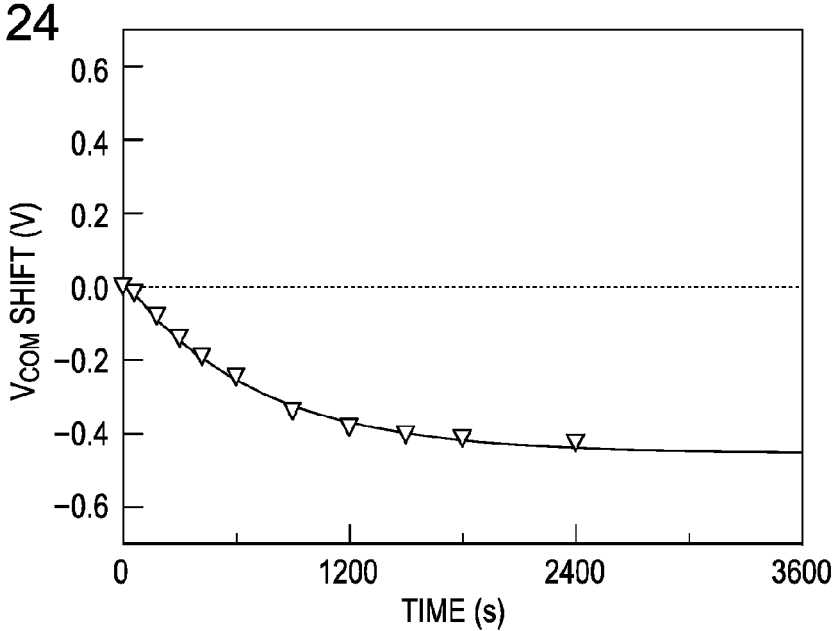
FIG. 24 is a diagram illustrating a relationship between time passage and $V_{COM}$ shift in the fourth embodiment.

FIG. 24 is a diagram illustrating a relationship between time passage and $V_{COM}$ shift which could be obtained through the experiments performed by the inventors. Furthermore, in FIG. 24, the horizontal axis represents the passage of time, and the vertical axis represents the $V_{COM}$ shift. Here, the $V_{COM}$ shift is defined as a difference between the counter electrode potential $V_{COM1}$ before the shift and the counter electrode potential $V_{COM2}$ after the shift, that is, a value of $V_{COM2}-V_{COM1}$. Further, in FIG. 24, "Δ" represents a state (Tb1<Tb2) in which the film thickness Tb1 (75 nm) of the first dielectric film 138A on the element substrate 10A side is less than the film thickness Tb2 (300 nm) of the second dielectric film 138B on the counter substrate 20A side. Further, when the $V_{COM}$ shift is 0, it represents a state (Tb1=Tb2) in which the film thickness Tb1 of the first dielectric film 138A and the film thickness Tb2 of the second dielectric film 138B are equal to each other. Further, in FIG. 24, the $V_{COM}$ shift, which is obtained when the rectangular waves of which the amplitude is 5V are applied, is measured.

As shown in FIG. 24, in the state which is indicated by "Δ", that is, in the state in which the film thickness Tb1 of the first dielectric film 138A on the element substrate 10A side is less than the film thickness Tb2 of the second dielectric film 138B on the counter substrate 20A side, the amount of the $V_{COM}$ shift decreases as the passage of time increases. The slope of the decrease in the $V_{COM}$ shift becomes gentle as the passage of time increases. Further, the amount of the $V_{COM}$ shift becomes equal to about −0.5V in the state the slope of the decrease becomes gentle. The direction of the $V_{COM}$ shift is the negative direction in the entire range of the passage of time as compared with the state in which the film thickness Tb1 of the first dielectric film 138A is the same as the film thickness Tb2 of the second dielectric film 138B (the $V_{COM}$ shift is 0).

When the $V_{COM}$ shift becomes equal to or larger than a certain level, the difference in the modulation effect of the liquid crystal layer increases between the duration on the low potential side and the duration on the high potential side. Then, in the displayed image, the difference between the amount of light modulated in the duration on the low potential side and the amount of light modulated in the duration on the high potential side is visible, thereby causing flicker of the image.

From the result of the study based on the finding obtained from the experimental data, the inventor noticed that it is effective to perform correction by separating the correction for the first phenomenon from the correction for the second phenomenon. Specifically, in the method of correcting the first phenomenon, a constant correction voltage is applied without regard to the driving voltage, and in the method of correcting the second phenomenon, in response to the magnitude and the direction of the DC voltage component based on the characteristic difference, the ratio of the length of the duration during which the positive polarity is retained is set to be smaller than the ratio of the length of the duration during which the negative polarity is retained.

On the other hand, in order to search for the ratio between the durations of polarities at which the temporal change of flicker is minimized (hereinafter simply referred to as a search), a huge amount of time is necessary. For example, the conduction duration of about 10 to 60 minutes per one measurement point is necessary for the adjustment at the time of the search.

However, the inventors found the following fact. The first alignment base film (the first dielectric film) 138A, which has a film thickness less than that of the liquid crystal layer and is made of silicon oxide ($SiO_2$) having a specific resistance higher than that of the liquid crystal layer, is disposed between the first alignment film 13 and the pixel electrode 12 on the element substrate 10A side, and the second alignment base film (the second dielectric film) 138B, which has a film thickness more than that of the first dielectric film 138A and is made of silicon oxide ($SiO_2$) having a specific resistance higher than that of the liquid crystal layer, is disposed between the second alignment film 23 and the counter electrode 22 on the counter substrate 20A side, whereby the effective voltage waveform $V_{L2}$ is shifted in the negative direction in electric potential. On the basis of this finding, it is possible to shorten the time necessary for the search.

Figure 25:
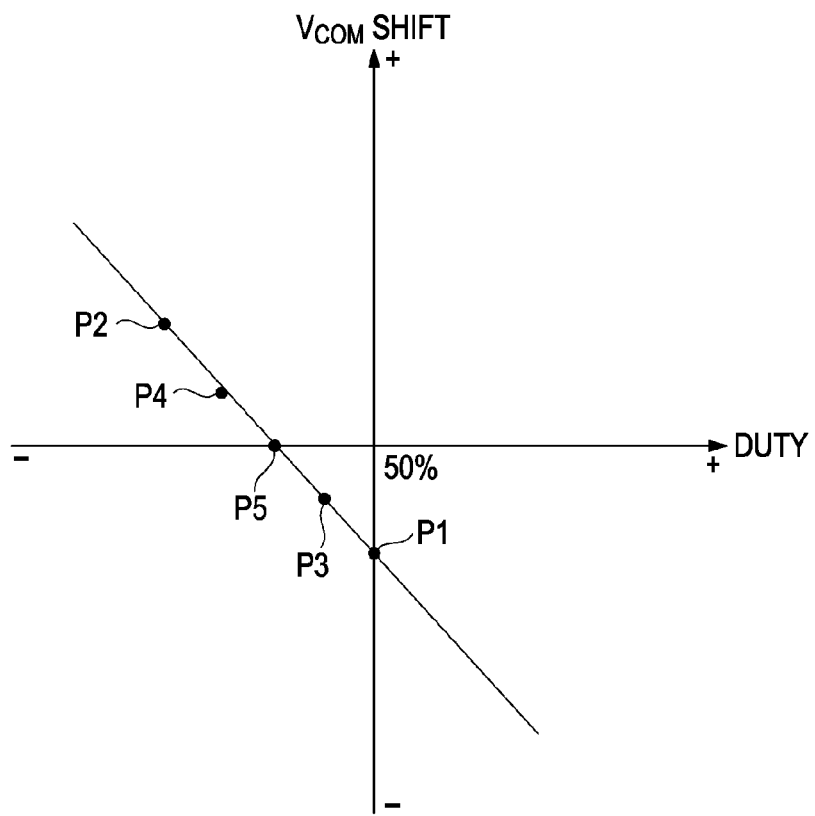
FIG. 25 is a diagram illustrating a relationship between a time ratio and the $V_{COM}$ shift in the fourth embodiment.

FIG. 25 is a diagram illustrating a relationship between the $V_{COM}$ shift and a time ratio (a duty) which could be obtained by the search performed by the inventors. Furthermore, in FIG. 25, the horizontal axis represents the duty (the ratio between the application time of the positive voltage and the application time of the negative voltage), and the vertical axis represents the $V_{COM}$ shift ($V_{COM2}-V_{COM1}$). Here, the intersection point between the horizontal axis and the vertical axis is set to a duty of 50:50, and the right side of the horizontal axis is set as a direction of increasing the application time of the positive voltage. Further, the upper side of the vertical axis is set as a direction in which the $V_{COM}$ shift is positive. Further, in FIG. 25, the reference sign P1 represents a first (initial) measurement point, the reference sign P2 represents a second measurement point, the reference sign, P3 represents a third measurement point, the reference sign P4 represents a fourth measurement point, and the reference sign P5 represents a fifth (final) measurement point. Further, in FIG. 25, the search is performed through a total of five measurements, but the number of measurements is not limited to this, and may be changed as necessary.

As shown in FIG. 25, the first measurement point P1 is set in the area in which the duty is equal to 50% or less. In this point, on the basis of the above-mentioned experimental result, it is apparent that, when the above-mentioned dielectric film is disposed between the second alignment film 23 and the counter electrode 22 on the counter substrate 20A side, the $V_{COM}$ shift is shifted in the negative direction. That is, since the line is downward to the right and the fifth measurement point P5 becomes smaller than the duty of 50%, it is preferable that the measurement is performed at least in the range (the range in which the duty is equal to 50% or less) except the area in which the duty is larger than 50%. Hence, it becomes unnecessary that the first measurement point P1 is set in the area in which the duty is larger than 50%, and thus it is possible to reduce measurement frequency.

Next, the second measurement point P2 is set on the side in which the duty is smaller than that of the first measurement point P1, with the horizontal axis located therebetween. As described above, it is possible to determine the positive or negative direction which changes the parameter (the duty) in accordance with the first measurement result. That is, it becomes unnecessary to set the second measurement point P2 on the side on which the duty is larger than that of the first measurement point P1, and thus it is possible to reduce the measurement frequency. Further, by plotting the first measurement point P1 and the second measurement point P2, it is possible to approximately calculate the slope of the right-downward line.

Next, the third measurement point P3 is set between the first measurement point P1 and the horizontal axis in accordance with the approximately calculated slope. Further, the fourth measurement point P4 is set between the second measurement point P2 and the horizontal axis in accordance with the approximately calculated slope. As described above, while the value of ($V_{COM2}-V_{COM1}$) at which the $V_{COM}$ shift is equal to approximately 0 is estimated, the search range is narrowed. By plotting the third measurement point P3 and the fourth measurement point P4, it is possible to approximately calculate the $V_{COM}$ shift corresponding to the allowable limit of flicker.

Then, the fifth measurement point P5 is set on the horizontal axis. Specifically, the fifth measurement point P5 is set as an intersection point between the horizontal axis and the line which approximately connects the measurement point P1 to P4. In the above-mentioned manner, it is possible to calculate the ratio between the durations of polarities at which the temporal change of flicker is minimized. As a result, according to the adjustment method, it is possible to shorten the time necessary for the search by reducing the measurement frequency.

Method of Driving Liquid Crystal Device

Hereinafter, a method of driving the liquid crystal device will be described. The driving method was made through the study and ingenuity of the inventors in order to embody the idea mentioned above.

Figure 26:
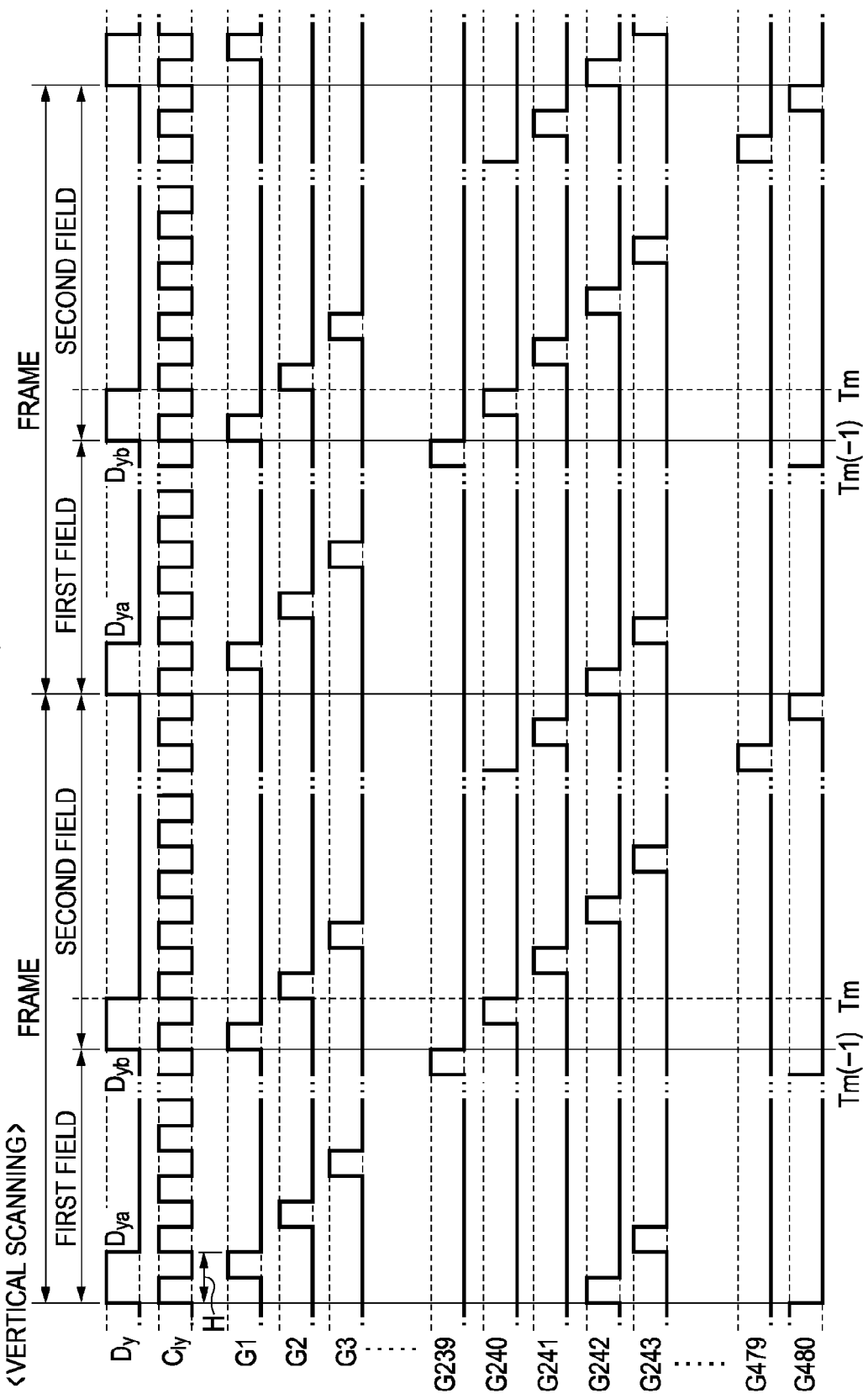
FIG. 26 is a diagram illustrating a timing chart of a scan signal system in a case where the designated value is "−1".

FIG. 26 is a timing chart of a scan signal system in a case where a designated value Q is "−1". Further, in the embodiment, the plurality of scan lines 61 are divided into the first scan line group and the second scan line group, any one scan line 61 of the first scan line group and any one scan line 61 of the second scan line group are alternately selected in one frame, and each scan line 61 is selected twice in one frame. That is, a so-called double-speed area scan inversion drive is used. Furthermore, in the embodiment, the operator 170 (refer to FIG. 10) is operated by, for example, a user or the like, and the designated value Q corresponding to the operation is output, for example, in the range of "−10" to "0".

First, a method of driving the scan lines 61 will be described. FIG. 26 is a timing chart indicating the scan signals G1 to G480, which are output by the scan line driving circuit 130, in terms of the relationship between the start pulse and the clock signal. Here, the frame is defined as a duration necessary to display a single image on the liquid crystal panel 100B. Further, in the duration of one frame (a predetermined duration), the duration from when the first start pulse $D_{ya}$ is output to when the second start pulse $D_{yb}$ is output is set as a first field (a first duration), and the duration from when the second start pulse $D_{yb}$ is output to when the subsequent first start pulse $D_{ya}$ is output is set as a second field (a second duration). Further, one scan line 61 is selected once for each field, that is, selected twice in the duration of one frame.

In the embodiment, the vertical synchronization signal $V_s$ has a frequency of 120 Hz as described above. Therefore, the duration of one frame is also fixed at 8.33 milliseconds. The control circuit 152 (refer to FIG. 10) outputs a clock signal of which the duty ratio is 50% by an amount of 480 cycles equal to the number of the scan lines 61 corresponding to the duration of one frame. Furthermore, the duration corresponding to a single cycle of the clock signal is represented as H.

Further, the control circuit 152 outputs the start pulses with a pulse width corresponding to the single cycle of the clock signal at the H-level rising edges of the clock signal as follows. That is, the control circuit 152 outputs the first start pulse $D_{ya}$ at the beginning (the beginning of the first field) of the duration of one frame. On the other hand, since the designated value Q is negative, the control circuit 152 outputs the second start pulse $D_{yb}$ at a timing earlier by "Q×H" than the timing Tm at which 240 cycles of the clock signal have been output after the first start pulse $D_{ya}$ is output.

Accordingly, as shown in FIG. 26, in the case where the designated value Q is "−1", the second start pulse $D_{yb}$ is output at the timing Tm (−1) which is earlier than the timing Tm by an amount of the single cycle of the clock signal.

Here, the start pulses are alternately output, while the output timing of the first start pulse $D_{ya}$ is not changed without regard to the designated value Q. Hence, when the first start pulse $D_{ya}$ which is output for each one frame (8.33 milliseconds) is specified, essentially it is also possible to specify the second start pulse $D_{yb}$ which defines the start of the second field.

The scan line driving circuit 130 outputs the following operation signals from the start pulse and the clock signal. That is, when the first start pulse $D_{ya}$ is supplied, the scan line driving circuit 130 sequentially sets the scan signals G1 to G480 to the H level whenever the clock signal changes to the L level. On the other hand, when the second start pulse $D_{yb}$ is supplied, the scan line driving circuit 130 sequentially sets the scan signals G1 to G480 to the H level whenever the clock signal changes to the H level.

The first start pulse $D_{ya}$ is supplied at the beginning of the duration of one frame (the first field). Therefore, the selection of the scan line 61 triggered by the supply of the first start pulse $D_{ya}$ is not changed by the designated value Q. Further, the selection of the scan line 61 triggered by the supply of the first start pulse $D_{ya}$ is performed in the duration during which the clock signal is set to the L level. Therefore, in the range of the first field and second field, each selection proceeds from the scan line 61 of the first row as a start point toward the lower side of the screen in order of 2, 3, 4, ..., and 480th row with the duration of a half cycle of the clock signal.

On the other hand, the second start pulse $D_{yb}$ is supplied at the beginning of the second field. Therefore, the selection of the scan line 61 triggered by the start pulse is shifted back or forth as a whole in accordance with the designated value Q. That is, the selection of the scan line 61 triggered by the supply of the second start pulse $D_{yb}$ is performed in the duration in which the clock signal is at the H level. Therefore, in the range of the second field of a certain frame to the first field of the subsequent frame, each selection proceeds from the scan line 61 of the first row as a start point toward the lower side of the screen in order of 2, 3, 4, ..., and 480th row in the interval between the selections triggered by the supply of the first start pulse $D_{ya}$. That is, for example, when the designated value Q is "−1", all the selections of 1 to 240th row in the second field of a certain frame are advanced by the amount of one cycle of the clock signal from the timing Tm.

Furthermore, a method of driving the data line 62 is the same as that of the third embodiment, and a detailed description thereof will be omitted (refer to FIGS. 19 and 20).

Subsequently, the overall driving method will be described.

First, in FIG. 10, the control circuit 152 stores the display data Video, which is supplied from the external apparatus, in the frame memory 157. Thereafter, when the scan line 61 of a certain pixel row in the liquid crystal panel 100A is selected, the display data Video of the pixel row is read out at a speed twice the storage speed. Then, the data is converted into the analog data signal Vid through the DA converter 158. With this, the sampling signal output circuit 142 is controlled through the control signal such that, in accordance with the reading of the display data Video, the sampling signals S1 to S640 sequentially go to the H level.

As shown in FIG. 26, when the designated value Q is for example "−1", the second start pulse $D_{yb}$ is output at the timing which is time-advanced by one cycle of the clock signal from the timing Tm. Hence, when the designated value Q is "−1", the duration of the first field corresponds to 239 cycles of the clock signal, while the duration of the second field corresponds to 241 cycles of the clock signal.

Further, in the first field, the scan lines 61 are selected in order of 242, 1, 243, 2, 244, 3, ..., 480, and 239th rows. Hence, the control circuit 152 controls the scan line driving circuit 130 so as to select the scan line 61 of the 242nd row first. On the other hand, the control circuit 152 causes the display data processing circuit 156 to read the display data Video, which corresponds to the 242nd row stored in the frame memory 157, at the double speed. Then, the control circuit 152 causes the DA converter 158 to generate the negative data signal Vid from the display data Video, and in conjunction with the reading of the data signal Vid, as shown in FIG. 19, controls the sampling signal output circuit 142 such that the sampling signals S1 to S640 exclusively go to the H level one after another. When the sampling signals S1 to S640 go to the H level one after another, the TFTs 40 are sequentially turned on, and the data signal Vid supplied to the image signal line is sampled in the 1st-to-640th data lines 62.

On the other hand, when the scan line 61 is selected, the scan signal G242 goes to the H level. Therefore, all the TFTs 40 of the pixels positioned in 242nd row are turned on. Hence, the negative voltage of the data signal Vid sampled in the data lines 62 is directly applied to the pixel electrodes 12. Thereby, in each liquid crystal capacitances 120 of the pixels of 242nd row and 1, 2, 3, 4, ..., 639, and 640th columns, the negative voltages corresponding to the gray scales designated by the display data Video are written and retained. Hereinafter, in the first field, the same voltage writing operations are performed in order of 1, 243, 2, 244, 3, ..., 480, and 239th rows. Thereby, in the pixels of 1st to 239th rows, the positive voltages corresponding to the gray scales are written, and in the pixels of 240th to 480th rows, the negative voltages corresponding to the gray scales are written, and those are respectively retained therein.

On the other hand, in the second field, the scan lines 61 are selected in order of 1, 240, 2, 241, 3, 242, ..., 241, and 480th rows, and the writing polarities in the same row are inverted. Hence, in the pixels of 1st to 239th rows, the negative voltages corresponding to the gray scales are written, and in the pixels of the 242nd to 480th rows, the positive voltages corresponding to the gray scales are written, and those are respectively retained therein.

Figure 27:
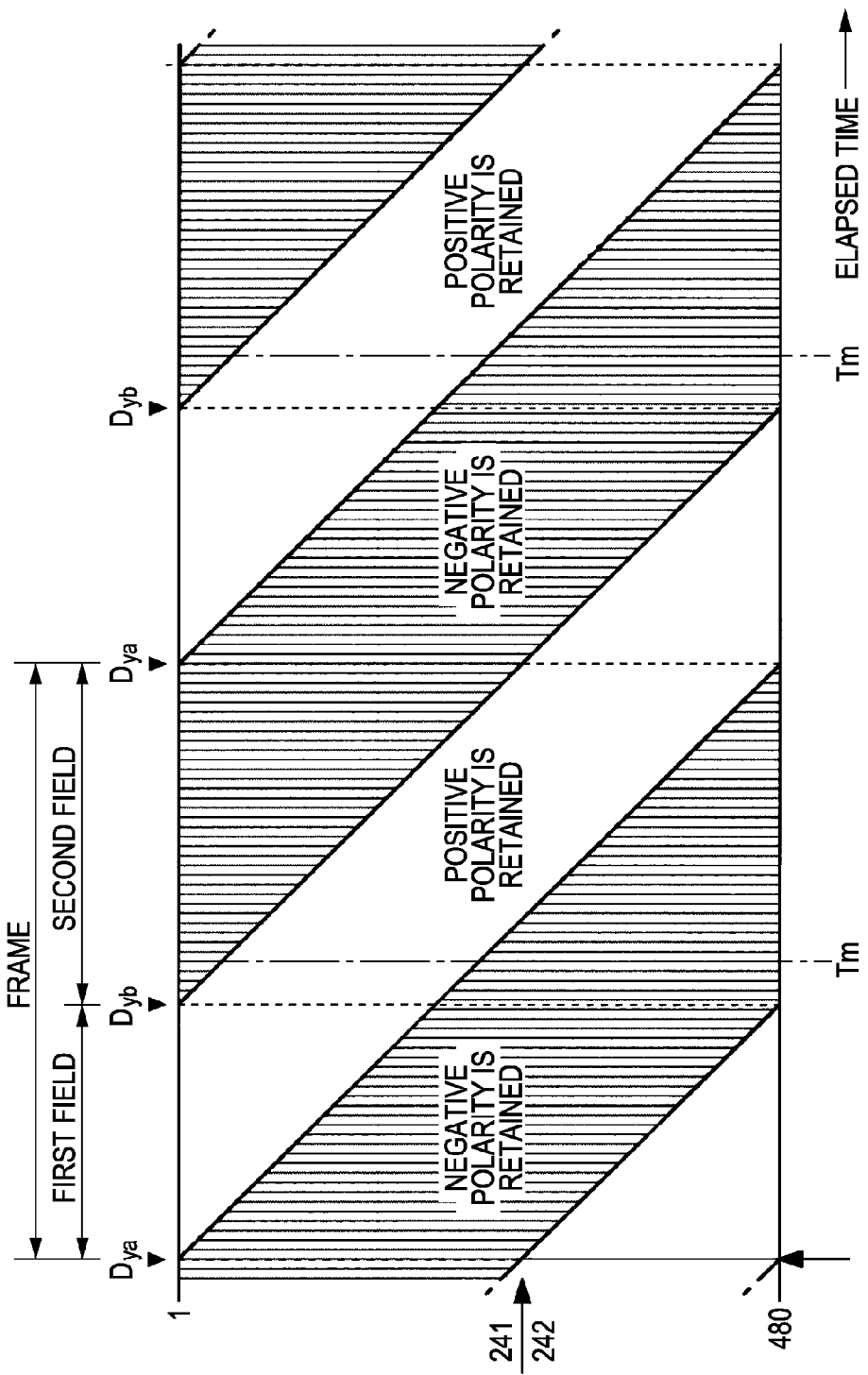
FIG. 27 is a diagram illustrating writing states of respective rows with passage of time in the range of successive frames in the case where the designated value is "−1".

FIG. 27 is a diagram illustrating writing states of respective rows with passage of time in the range of successive frames in the case where the designated value Q is "−1". Furthermore, the time point of performing the writing on the scan line 61 at the top, that is, the time point of the start of the duration during which the positive polarity is retained is precisely at the timing which is advanced by the half cycle of the clock signal after the first start pulse $D_{ya}$ is supplied. However, in FIG. 27, for simplification, the time point is adjusted to the first start pulse $D_{ya}$.

As shown in FIG. 27, in the first field, the negative polarity is written in the pixels of 242, 243, 244, ..., and 480th rows, the positive polarity is written in the pixels of 1, 2, 3, ..., and 241st rows, and those are retained until the subsequent writing. On the other hand, in the second field, the negative polarity is written in the pixels of the 1, 2, 3, ..., and 241st rows, the positive polarity is written in the pixels of 242, 243, 244, ..., and 480th rows, and likewise, those are retained until the subsequent writing. Consequently, it can be observed that, in the respective fields, there are two selected scan lines of the scan line 61 in which the positive polarity is written and the scan line 61 in which the negative polarity is written.

As described above, in the case where the designated value Q is "−1", the output timing of the second start pulse $D_{yb}$ is advanced. Hence, the time of retaining the negative voltage, which is written by the selection triggered by the supply of the second start pulse $D_{yb}$, becomes longer than the time of retaining the positive voltage which is written by the selection triggered by the supply of the first start pulse $D_{ya}$. That is, when the designated value Q is positive, as the absolute value thereof increases, the time of retaining the negative voltage, which is written by the selection triggered by the supply of the second start pulse $D_{yb}$, becomes longer than the time of retaining the positive voltage which is written by the selection triggered by the supply of the first start pulse $D_{ya}$. Hence, the effective value of the negative voltage applied to the liquid crystal capacitance 120 is higher than the effective value of the positive voltage.

That is, the first field in which the positive voltage is applied becomes shorter than the second field in which the negative voltage is applied. Accordingly, in a single frame, the application time of the positive voltage is set to be shorter than the application time of the negative voltage, and thus it is possible to effectively perform the correction corresponding to the $V_{COM}$ shift.

Method of Determining Time Ratio

On the basis of Expression (11), for example, when the amplitude of the rectangular waves applied to the pixel electrode 12 is ±5V and the $V_{COM}$ shift is −0.5V, X=−0.05. Hence, when the application time of the positive voltage:the application time of the negative voltage=45:55, the shift of $V_{COM}$ does not occur.

From the experimental result of the inventors, it is empirically known that, in a case where the frame rate is 120 fps, the $V_{COM}$ shift corresponding to the allowable limit of flicker is ±0.15V. Hence, actually it is preferable that X=−0.065 to −0.035. Accordingly, when a ratio of the film thickness Tb1 (75 nm) of the first dielectric film 138A to the film thickness Tb2 (300 nm) of the second dielectric film 138B is 4/1, it is preferable that a ratio of the length of the first field to the length of the second field should be in the range of 53.5/46.5 or more to 56.5/43.5 or less. That is, it is preferable that the application time of the positive voltage:the application time of the negative voltage=43.5:56.5 to 56.5:53.5. When the frame rate is 120 fps, the duration of the single frame is 8.3 milliseconds. Therefore, the application time of the positive voltage:the application time of the negative voltage=8.42 milliseconds:8.25 milliseconds to 8.92 milliseconds:7.75 milliseconds.

According to the liquid crystal device of the embodiment, the counter electrode potential $V_{COM}$ is shifted and set in advance so as to reduce flicker caused by the parasitic capacitance of the switching element. Hence, the first phenomenon can be corrected. Further, the length of the first duration is set to be shorter than the length of the second duration during the predetermined durations. Hence, the second phenomenon can also be corrected. The correction is based on the following fact which is found by the inventors. The first alignment base film (the first dielectric film) 138A, which has a film thickness less than that of the liquid crystal layer and is made of silicon oxide ($SiO_2$) having a specific resistance higher than that of the liquid crystal layer, is disposed between the first alignment film 13 and the pixel electrode 12 on the element substrate 10A side, and the second alignment base film (the second dielectric film) 138B, which has a film thickness more than that of the first dielectric film 138A and is made of silicon oxide ($SiO_2$) having a specific resistance higher than that of the liquid crystal layer, is disposed between the second alignment film 23 and the counter electrode 22 on the counter substrate 20A side, whereby effective voltage waveform is shifted in the negative direction in electric potential. This fact is also seen from the results of experiments performed by the inventors. That is, the first dielectric film 138A, which has the film thickness less than that of the second dielectric film 138B between the second alignment film 23 and the counter electrode 22 on the counter substrate 20A side, is disposed between the first alignment film 13 and the pixel electrode 12 on the element substrate 10A side. In such a manner, as compared with the case where the film thickness Tb1 of the first dielectric film 138A is equal to the film thickness Tb2 of the second dielectric film 138B, it becomes apparent that $V_{COM}$ is shifted in the negative direction (the counter electrode potential $V_{COM2}$ after the shift is shifted in the negative direction from the counter electrode potential $V_{COM1}$ before the shift). As described above, the shift direction of the $V_{COM}$ shift is specified in advance. Therefore, as compared with the case where the shift direction is not specified as in the related art, it is possible to accurately correct the $V_{COM}$ shift. As a result, it is possible to provide the liquid crystal device capable of improving display quality by suppressing the occurrence of the display defects such as flicker.

Further, according to the configuration, as compared with the case where the pixel electrode 12 and the counter electrode 22 are made of the same material (for example, ITO), it becomes apparent that $V_{COM}$ is shifted in the negative direction. Thus, asymmetry property in characteristics of the element substrate 10A and the counter substrate 20A becomes remarkable. This fact is also seen from the results of experiments performed by the inventors. For this reason, as compared with the case where the pixel electrode 12 and the counter electrode 22 are made of for example ITO, the DC voltage component, which is caused by the characteristic difference between the element substrate 10A and the counter substrate 20A holding the liquid crystal layer interposed therebetween, remarkably occurs. As a result, it is possible to improve display quality by suppressing the occurrence of the display defects such as flicker.

According to the method of driving the liquid crystal device of the embodiment, the counter electrode potential $V_{COM}$ is shifted and set in advance so as to reduce flicker caused by the parasitic capacitance of the switching element. Hence, the first phenomenon can be corrected. Further, the length of the first duration is set to be shorter than the length of the second duration during the predetermined durations. Hence, the second phenomenon can also be corrected. The correction is based on the following fact which is found by the inventors. The first alignment base film (the first dielectric film) 138A, which has a film thickness less than that of the liquid crystal layer and is made of silicon oxide (SiO$_2$) having a specific resistance higher than that of the liquid crystal layer, is disposed between the first alignment film 13 and the pixel electrode 12 on the element substrate 10A side, and the second alignment base film (the second dielectric film) 138B, which has a film thickness more than that of the first dielectric film 138A and is made of silicon oxide (SiO$_2$) having a specific resistance higher than that of the liquid crystal layer, is disposed between the second alignment film 23 and the counter electrode 22 on the counter substrate 20A side, whereby effective voltage waveform is shifted in the negative direction in electric potential. This fact is also seen from the results of experiments performed by the inventors. Accordingly, it is possible to improve display quality by suppressing the occurrence of the display defects such as flicker.

Further, according to the method of driving the liquid crystal device, the ratio is an optimum time share ratio corresponding to the allowable limit of flicker. Therefore, it is possible to effectively perform the correction for the second phenomenon. In contrast, when the ratio of the length of the first duration to the length of the second duration is smaller than 53.5/46.5, the length of the first duration is too long, and thus it may be difficult to perform effective correction. Further, when the ratio of the length of the first duration to the length of the second duration is larger than 56.5/43.5, the length of the first duration is too short, and thus it may be difficult to perform effective correction.

Further, in the embodiment, regarding the pixels along the scan line 61 of a certain single row, by sequentially sampling the voltages corresponding to the gray scales, that is, the data signals Vid of the 1st to 640th columns, the pixels of the row are written in order of the 1st column to the 640th column. This is a so-called point sequence configuration, but the invention is not limited to this. For example, it may be possible to adopt a configuration which uses in combination so-called phase evolution (referred to as serial-parallel conversion) drive of extending the data signal Vid on the time axis by n (n is an integer of 2 or more) times the length thereof and supplying the signal to n image signal lines (refer to JP-A-2000-112437).

Alternatively, it may be possible to adopt the so-called point sequence configuration in which the data signal Vid is integrally supplied to all the data lines 62.

Such driving methods also have the same effects as that of the embodiment.

Further, in the embodiment, the description was given of the form to which either one of the normally-black mode of displaying black in a non-voltage-application state or the normally-white mode of displaying white in the non-voltage-application state is applied as a liquid crystal mode. However, it is also possible to apply the form to other liquid crystal modes.

Next, referring to FIG. 28, an example of an electronic apparatus to which the liquid crystal device according to the embodiment of the invention will be described.

Figure 28:
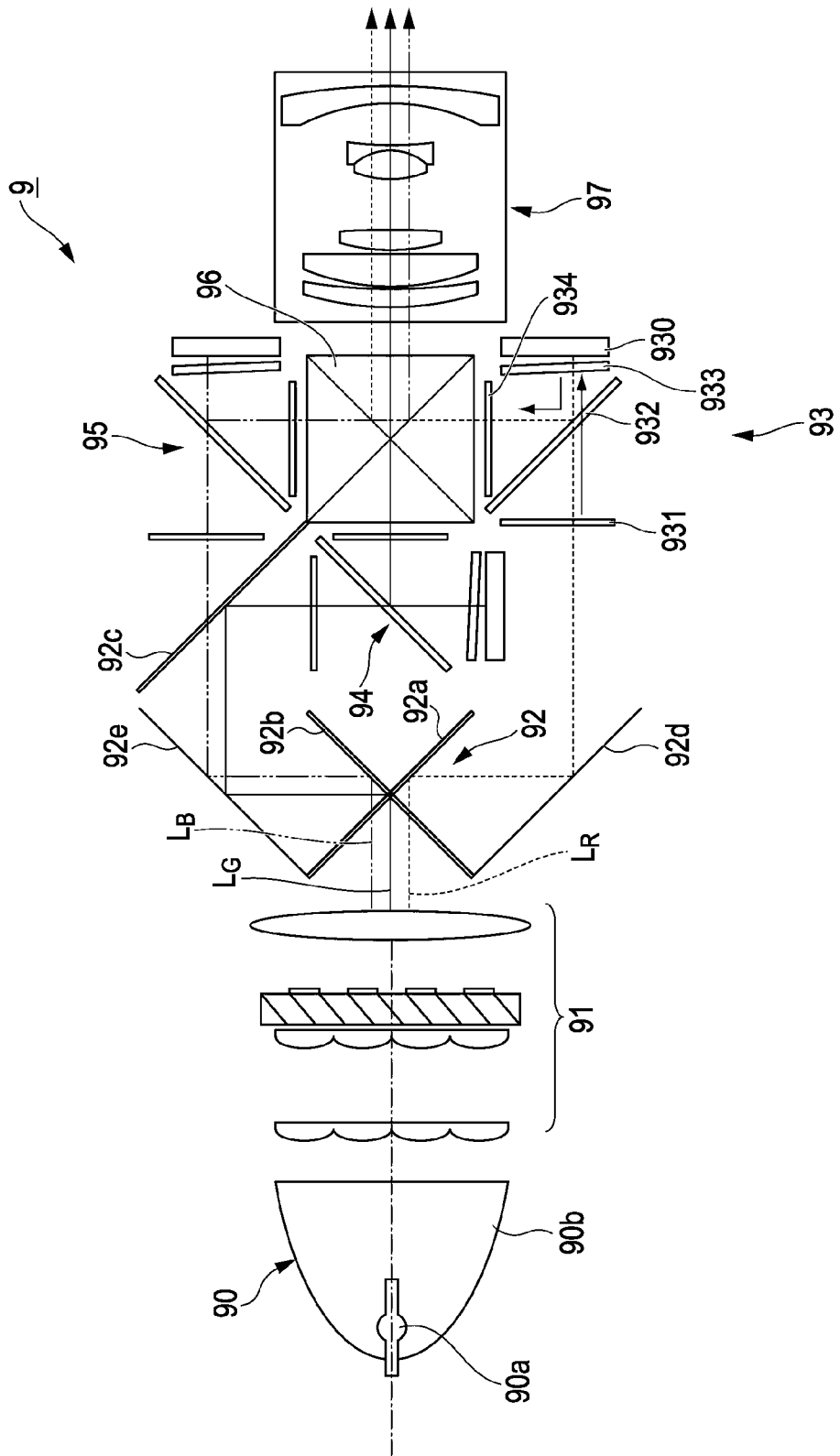
FIG. 28 is a diagram illustrating a frame format of a projector which is an example of an electronic apparatus.

FIG. 28 is a diagram illustrating a frame format of a projector which is an example of an electronic apparatus.

A projector 9 shown in FIG. 28 includes a light source 90, an integrator optical system 91, a color separation optical system 92, three-type image formation systems 93 to 95, a color synthesis element 96, and a projection optical system 97. The three-type image formation systems 93 to 95 respectively include the liquid crystal devices according to the embodiments of the invention.

The source light, which is emitted from the light source 90, is incident to the integrator optical system 91. The source light, which is incident to the integrator optical system 91, is emitted such that illumination intensity thereof can be uniformized and the polarization state thereof can be adjusted. The source light, which is incident to the integrator optical system 91, is separated into red light $L_R$, green light $L_G$, and blue light $L_B$ by the color separation optical system 92, and is incident to the image formation system 93 to 95 each of which has a different type for each colored light. The image formation system 93 forms a red image, the image formation system 94 forms a green image, and the image formation system 95 forms a blue image. That is, the colored light, which is incident to each image formation system, is modulated to form an image on the basis of the image data of the image to be displayed. The three-color image light, which is emitted from the three-type image formation systems 93 to 95, is synthesized by the color synthesis element 96, and is thereafter projected on the target projection surface (not shown in the drawing) such as a screen through the projection optical system 97. Thereby, a full-color image is displayed on the target projection surface.

Next, the components of the projector 9 will be described in detail.

The light source 90 has a light source lamp 90a and a parabolic reflector 90b. The light, which is emitted from the light source lamp 90a, is reflected in one direction by the parabolic reflector 90b, is changed into a bundle of rays, and is incident as source light to the integrator optical system 91. The light source lamp 90a is formed by, for example, a metal halide lamp, a xenon lamp, a high-pressure mercury lamp, a halogen lamp, or the like. Further, instead of the parabolic reflector 90b, the reflector may be formed by an ellipsoidal reflector, a spherical reflector, or the like. In accordance with the shape of the reflector, a collimator lens for collimating the light which is emitted from the reflector may be used.

The integrator optical system 91 has, a first lens array, a second lens array, an incident-side aperture diaphragm, a polarization conversion element, and a superimposing lens. The optical axis of the integrator optical system 91 substantially coincides with the optical axis of the light source 90, the center positions of the respective components of the integrator optical system 91 are disposed to be lined up on the optical axis of the integrator optical system 91.

The color separation optical system 92 has first to third dichroic mirrors 92a, 92b, and 92c having wavelength selection surfaces and first and second reflection mirrors 92d and 92e. The first dichroic mirror 92a has characteristics that reflects red light and transmits green light and blue light. The second dichroic mirror 92b has characteristics that transmits red light and reflects green light and blue light. The third dichroic mirror 92c has characteristics that reflects green light and transmits blue light. The first and second dichroic mirrors 92a and 92b are disposed such that the respective wavelength selection surfaces thereof is substantially orthogonal to each other and the respective wavelength selection surfaces thereof forms an angle of approximately 45° with respect to the optical axis of the integrator optical system 91.

The red light $L_R$, the green light $L_G$, and the blue light $L_B$ included in the source light, which is incident to the color separation optical system 92, are separated as follows, and are incident to the image formation systems 93 to 95 corresponding to the separated colored light beams.

The light $L_R$ is transmitted through the second dichroic mirror 92b, is reflected by the first dichroic mirror 92a, is then reflected by the first reflection mirror 92d, and is incident to the first image formation system 93.

The light $L_G$ is transmitted through the first dichroic mirror 92a, is reflected by the second dichroic mirror 92b, is then reflected by the second reflection mirror 92e, is subsequently reflected by the third dichroic mirror 92c, and is incident to the second image formation system 94.

The light $L_B$ is transmitted through the first dichroic mirror 92a, is reflected by the second dichroic mirror 92b, is reflected by the second reflection mirror 92e, is subsequently transmitted through the third dichroic mirror 92c, and is incident to the third image formation system 95.

All the three-type image formation systems 93 to 95 have the same configuration, and here a configuration of the image formation system 93 for red image will be representatively described.

The image formation system 93 includes a liquid crystal device 930, an incident-side polarization plate 931, a polarization separation element 932, an optical compensating plate 933, and an exit-side polarization plate 934. The incident-side polarization plate 931 transmits light which is P-polarized with respect to the red light polarization separation element 932. The red light transmitted through the polarization separation element 932 is incident to the liquid crystal device 930 through the optical compensating plate 933, is modulated to become light including the polarization components (light which is S-polarized with respect to polarization separation element 932) representing an image.

The light, which is emitted from the liquid crystal device 930, is incident to the polarization separation element 932 through the optical compensating plate 933. The S-polarized light among the light modulated in the liquid crystal device 930 is reflected by the polarization separation element 932, and is incident to the exit-side polarization plate 934. The exit-side polarization plate 934 is configured to pass the S-polarized light. The light traveling through the exit-side polarization plate 934 is incident to the color synthesis element 96, is synthesized as described above, and is then projected.

The projector 9 of the embodiment forms an image through the liquid crystal device to which the embodiment of the invention is applied. Therefore, it is possible to display a high-quality image by suppressing occurrence of flicker and image persistence.

Furthermore, other examples of electronic apparatuses include a personal computer, a video camera monitor, a car navigation apparatus, a pager, an electronic diary, an electronic calculator, a word processor, a workstation, a video phone, a POS terminal, a digital still camera, an electronics having a touch panel, and the like. The liquid crystal device according to the embodiments of the invention can be applied to such electronic apparatuses.

What is claimed is:

1. A liquid crystal device comprising:
   an element substrate which has a plurality of scan lines and a plurality of data lines, and has a pixel electrode and a switching element provided to correspond to an intersection point between the scan line and the data line;
   a counter substrate which is disposed to be opposed to the element substrate and has a counter electrode;
   a liquid crystal layer which is sandwiched between the element substrate and the counter substrate;
   a first alignment film which is provided on a side of the element substrate close to the liquid crystal layer;
   a second alignment film which is provided on a side of the counter substrate close to the liquid crystal layer;
   a first dielectric film which is provided between the pixel electrode and the first alignment film, has a film thickness less than that of the liquid crystal layer, has a specific resistance higher than that of the liquid crystal layer, and is made of $SiO_2$; and
   a second dielectric film which is provided between the counter electrode and the second alignment film, has a film thickness less than that of the first dielectric film, has a specific resistance higher than that of the liquid crystal layer, and is made of $SiO_2$,
   wherein a counter electrode potential, which is set to reduce flicker caused by a parasitic capacitance of the switching element, is applied to the counter electrode,
   wherein a positive voltage and a negative voltage are alternately applied to the pixel electrode when the positive voltage is a high-potential voltage and the negative voltage is a low-potential voltage relative to the counter electrode potential as a reference, and
   wherein in predetermined durations such as a first duration during which the positive voltage is applied and a second duration during which the negative voltage is applied, the length of the first duration is set to be longer than the length of the second duration.

2. The liquid crystal device according to claim 1, wherein the pixel electrode is made of aluminum, and the counter electrode is made of indium tin oxide.

3. An electronic apparatus comprising the liquid crystal device according to claim 1.

4. A liquid crystal device comprising:
   an element substrate which has a plurality of scan lines and a plurality of data lines, and has a pixel electrode and a switching element provided to correspond to an intersection point between the scan line and the data line;

a counter substrate which is disposed to be opposed to the element substrate and has a counter electrode;

a liquid crystal layer which is sandwiched between the element substrate and the counter substrate;

a first alignment film which is provided on a side of the element substrate close to the liquid crystal layer;

a second alignment film which is provided on a side of the counter substrate close to the liquid crystal layer;

a first dielectric film which is provided between the pixel electrode and the first alignment film, has a film thickness less than that of the liquid crystal layer, has a specific resistance higher than that of the liquid crystal layer, and is made of $SiO_2$; and a second dielectric film which is provided between the counter electrode and the second alignment film, has a film thickness less than that of the first dielectric film, has a specific resistance higher than that of the liquid crystal layer, and is made of $SiO_2$, wherein the liquid crystal device is configured such that a counter electrode potential, which is set to reduce flicker caused by a parasitic capacitance of the switching element, is applicable to the counter electrode, wherein the liquid crystal device is configured such that a positive voltage and a negative voltage are alternately applied to the pixel electrode when the positive voltage is a high-potential voltage and the negative voltage is a low-potential voltage relative to the counter electrode potential as a reference, and wherein the liquid crystal device is configured such that in predetermined durations such as a first duration during which the positive voltage is applied and a second duration during which the negative voltage is applied, the length of the first duration is set to be longer than the length of the second duration.

\* \* \* \* \*